(12) United States Patent
Kurauchi et al.

(10) Patent No.: US 11,791,736 B2
(45) Date of Patent: Oct. 17, 2023

(54) POWER CONVERSION APPARATUS

(71) Applicant: DENSO CORPORATION, Kariya (JP)

(72) Inventors: Shuji Kurauchi, Kariya (JP); Yuichi Handa, Kariya (JP); Seiji Iyasu, Nisshin (JP); Yuji Hayashi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/078,772

(22) Filed: Dec. 9, 2022

(65) Prior Publication Data

US 2023/0104121 A1    Apr. 6, 2023

Related U.S. Application Data

(60) Division of application No. 17/686,079, filed on Mar. 3, 2022, which is a continuation of application No. 16/587,319, filed on Sep. 30, 2019, now abandoned.

(30) Foreign Application Priority Data

Oct. 5, 2018   (JP) .................................. 2018-189866
Feb. 1, 2019   (JP) .................................. 2019-016630

(51) Int. Cl.
*H02M 3/335* (2006.01)
*H02M 1/00* (2006.01)
(Continued)

(52) U.S. Cl.
CPC ......... *H02M 3/33584* (2013.01); *B60L 8/003* (2013.01); *B60L 50/60* (2019.02);
(Continued)

(58) Field of Classification Search
CPC ......... H02M 3/33584; H02M 3/33573; H02M 3/33576; H02M 1/009; B60L 8/003; B60L 50/60; B60L 53/22; B60L 2210/30; B60L 2210/40; H02J 7/02; H02J 7/35; H02J 2207/20; H02J 2310/48
See application file for complete search history.

(56) References Cited

U.S. PATENT DOCUMENTS 5,029,064 A    7/1991   Ball
5,946,206 A    8/1999   Shimizu et al.
(Continued)

FOREIGN PATENT DOCUMENTS

CN   105680488 A    6/2016
JP   S62247758 A    10/1987
JP   6140602 B2     5/2017

OTHER PUBLICATIONS

U.S. Appl. No. 16/587,319, filed Sep. 30, 2019 in the name of Shuji Kurauchi et al.
(Continued)

*Primary Examiner* — Toan T Vu
(74) *Attorney, Agent, or Firm* — Oliff PLC

(57) ABSTRACT

A power conversion apparatus connected to three or more voltage units, includes three or more power conversion circuits connected to respective units of the three or more voltage units; and a multiport transformer connected to the three or more power conversion circuits at mutually different ports, in which at least one voltage unit of the three or more voltage units is an electrical load.

7 Claims, 37 Drawing Sheets

(51) Int. Cl.
  *H02J 7/35* (2006.01)
  *B60L 8/00* (2006.01)
  *B60L 53/22* (2019.01)
  *B60L 50/60* (2019.01)
  *H02J 7/02* (2016.01)

(52) U.S. Cl.
  CPC ............ *B60L 53/22* (2019.02); *H02J 7/02* (2013.01); *H02J 7/35* (2013.01); *H02M 3/33573* (2021.05); *H02M 3/33576* (2013.01); *B60L 2210/30* (2013.01); *B60L 2210/40* (2013.01); *H02J 2207/20* (2020.01); *H02J 2310/48* (2020.01); *H02M 1/009* (2021.05)

(56) References Cited

U.S. PATENT DOCUMENTS

| | | | |
|---|---|---|---|
| 6,205,036 | B1 | 3/2001 | Anzawa |
| 7,449,798 | B2 | 11/2008 | Suzuki et al. |
| 9,129,743 | B1 | 9/2015 | Hunter et al. |
| 2008/0316774 | A1 | 12/2008 | Ito et al. |
| 2012/0092903 | A1 | 4/2012 | Nania et al. |
| 2013/0003423 | A1* | 1/2013 | Song .................. H02M 3/3378 363/21.02 |
| 2016/0016479 | A1 | 1/2016 | Khaligh et al. |
| 2018/0222333 | A1 | 8/2018 | Khaligh et al. |
| 2020/0112258 | A1 | 4/2020 | Kurauchi et al. |
| 2021/0094441 | A1 | 4/2021 | Sampson et al. |
| 2021/0155100 | A1 | 5/2021 | Khaligh et al. |
| 2022/0190733 | A1 | 6/2022 | Kurauchi et al. |

OTHER PUBLICATIONS

U.S. Appl. No. 17/239,839, filed Apr. 26, 2021 in the name of Shuji Kurauchi et al.
U.S. Appl. No. 17/686,079, filed Mar. 3, 2022 in the name of Shuji Kurauchi et al.
U.S. Appl. No. 17/685,957, filed Mar. 3, 2022 in the name of Shuji Kurauchi et al.
U.S. Appl. No. 17/697,487, filed Mar. 17, 2022 in the name of Shuji Kurauchi et al.

* cited by examiner

POWER CONVERSION APPARATUS

CROSS-REFERENCE TO RELATED APPLICATION

This application is a divisional of U.S. application Ser. No. 17/686,079 filed Mar. 3, 2022, which is a continuation of U.S. application Ser. No. 16/587,319 filed Sep. 30, 2019, which is based on and claims the benefit of priority from earlier Japanese Patent Application Nos. 2018-189866 filed Oct. 5, 2018, and 2019-016630 filed Feb. 1, 2019, the descriptions of which are incorporated herein by reference.

BACKGROUND

Technical Field

The present disclosure relates to a power conversion apparatus.

Description of the Related Art

A power conversion apparatus provided with a plurality of batteries, and AC power input/output terminals is known. As an example of such an apparatus, a power conversion apparatus provided with a transformer including three coils is disclosed.

SUMMARY

The present disclosure provides a power conversion apparatus connected to three or more voltage units, including: three or more power conversion circuits connected to respective units of the three or more voltage units; and a multiport transformer connected to the three or more power conversion circuits at mutually different ports, in which at least one voltage unit of the three or more voltage units is an electrical load.

DETAILED DESCRIPTION OF THE PREFERRED EMBODIMENTS

Figure 1:
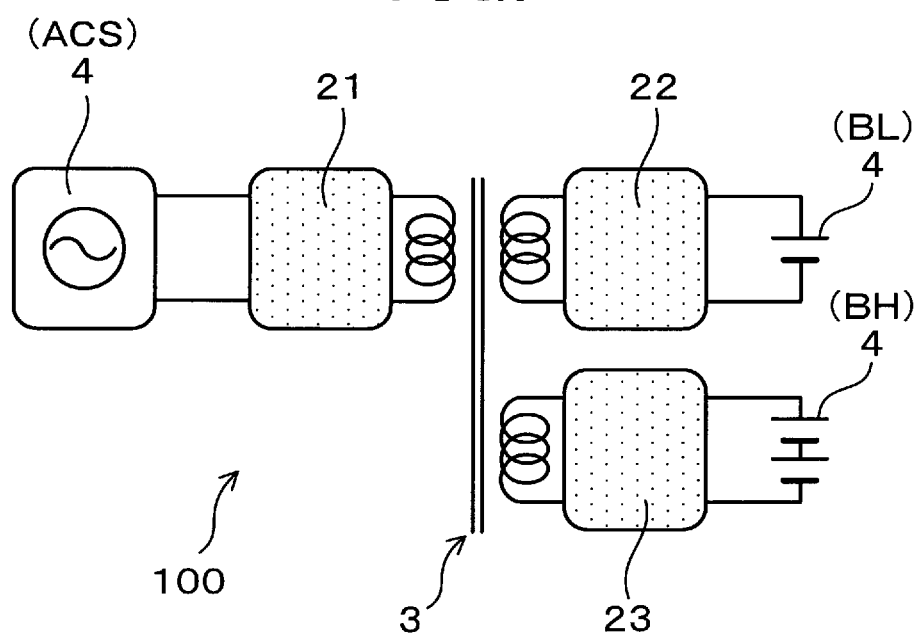
FIG. 1 is a circuit configuration of a power conversion apparatus according to a first reference.

As an example of a power conversion apparatus, Japanese Patent Number 6140602 discloses a power conversion apparatus provided with a first battery and a second battery and AC power input/output terminals, and a transformer including three coils which are magnetically coupled to each other (hereinafter also referred to as a multiport transformer). However, for the power conversion apparatus according to the above-mentioned patent literature, the configuration of equipment to be connected to the power conversion apparatus is significantly restricted. Hence, it is desired to expand variation in the configuration of equipment connected to the power conversion apparatus utilizing a multiport transformer.

The present disclosure has been achieved in light of the above-described circumstances and provides a power conversion apparatus capable of expanding variation in the configuration of equipment to be connected to the power conversion apparatus.

A first aspect of the present disclosure is a power conversion apparatus connected to three or more voltage units, including: three or more power conversion circuits connected to respective units of the three or more voltage units; and a multiport transformer connected to the three or more power conversion circuits at mutually different ports, in which at least one voltage unit of the three or more voltage units is an electrical load.

A second aspect of the present disclosure is a power conversion apparatus connected to three or more voltage units, including: three or more power conversion circuits connected to respective units of the three or more voltage units; and a multiport transformer connected to the three or more power conversion circuits at mutually different ports, in which the three or more voltage units includes at least a vehicle drive battery, a plurality of power supply units for supplying power to the vehicle drive battery from outside the vehicle.

A third aspect of the present disclosure is a power conversion apparatus connected to four or more voltage units, including four or more power conversion circuits connected to respective units of the four or more voltage units; and a multiport transformer connected to the four or more power conversion circuits at mutually different ports.

A fourth aspect of the present disclosure is a power conversion apparatus including: a plurality of power conversion units each including a multiport transformer, and three or more power conversion circuits each connected to three or more ports of the multiport transformer; and a connection wiring that electrically connects, to be in parallel, between at least one power conversion circuit in one power conversion unit and at least one power conversion circuit in another power conversion unit.

According to the power conversion apparatus of the first aspect, at least one of the three voltage units is an electrical load. Thus, power can be converted between three or more voltage units including the electrical load via a multiport transformer.

According to the power conversion apparatus of the second aspect, the three or more voltage units include at least a vehicle drive battery and a plurality of power supply units. Thus, power can be supplied to the vehicle drive battery from the plurality of power supply units via a single multiport transformer.

The power conversion apparatus of the third aspect is connected to four or more voltage units, and includes four or more power conversion circuits. Thus, power can be mutually converted between four or more voltage units via a single multiport transformer. Thus, power can be converted between a plurality of voltage units via a single multiport transformer with a number of combinations.

The power conversion apparatus according to the fourth aspect includes a plurality of power conversion units and a connection wiring. The connection wiring electrically connects at least one power conversion unit in respective power conversion units in parallel. Therefore, power can be exchanged between the power conversion circuits in a plurality of power conversion units. As a result, even if a fault occurs in some power conversion circuits of some power conversion units, other power conversion circuits are able to perform the function of the failure power conversion circuit instead. Therefore, the level of redundancy of the power conversion apparatus can be higher. Thus, variation in the configuration of equipment which can be connected to the power conversion apparatus can be expanded in each of the above-described power conversion apparatuses according to first, second, third and fourth aspects.

As described, according to the above-described aspects, the operation mode of the power conversion apparatus can be modified in various manners. Note that, the reference numerals in parentheses described in the claims and the means for solving the problems indicate the corresponding relationship between the specific means described in the following embodiments, and do not limit the technical range of the present invention.

In the power conversion apparatus according to the present disclosure, a plurality of power supply units may include at least two power supply units from among an AC power supply unit, a DC power supply unit and a solar power supply unit. In this case, a battery for driving vehicle can be charged by mutually different types of power supply units.

Note that various types of power supply units and electrical loads can be adapted for the voltage unit. For example, at least a part of the plurality of voltage units can be a power source or an electrical load which are mounted on the vehicle.

Hereinafter, with reference to the drawings, embodiments and references of a power conversion apparatus will be described.

First Reference

As shown in FIG. 1, the first reference is an embodiment of a power conversion apparatus 100 including three voltage units 4 connected thereto. The power conversion apparatus includes three power conversion circuits 21, 22 and 23, and a multiport transformer 3. The three power conversion circuits 21, 22 and 23 are connected to respective three voltage units 4. The multiport transformer 3 is connected to the three power conversion circuits 21, 22 and 23 at mutually different ports. According to the present embodiment, the three voltage units 4 are an AC power source ACS, a storage battery BL and a vehicle drive battery BH.

The storage battery BL may be utilized for an auxiliary battery mounted on a vehicle. The voltage of the storage battery BL may be set to be 12 V, for example. However, it is not limited thereto. The voltage of the storage battery BL may be set to be 7V, or 48V, for example. Further, the storage battery BL may be configured of a capacitor or the like.

Also, a plurality of storage batteries (BL1, BL2) may be used and connected to the power conversion apparatus. In this case, for example, the plurality of storage batteries may have the same voltage or mutually different voltages. For example, the voltage of one storage battery BL1 may be set to be 12V, and the voltage of the other storage battery BL2 may be set to be 12V, or a voltage other than 12V.

The vehicle drive battery BH (high voltage battery BH) is mounted on a vehicle such as an electric vehicle or a hybrid vehicle, stores power for driving the vehicle, and outputs the stored power. The vehicle drive battery BH is a high voltage battery of which the voltage is higher than that of the storage battery BL. For example, the voltage may be set to be higher than or equal to 200V. In the following description, the vehicle drive battery is also referred to as a high voltage battery BH.

AC power source ACS is one of power supply units for supplying power to the high voltage battery BH from outside the vehicle. In other words, as the AC power source ACS, for example, AC charger apparatus in a power station or the like is expected. Although illustration is omitted, an AC output port can be connected in parallel to the AC power source ACS. The AC power source ACS and the AC output port is configured, for example, such that the AC power having an effective voltage 100V can be inputted and outputted. Further, the AC output port may include a relay unit capable of switching between conduction and cutoff. In the following embodiments and references, the AC power source ACS refers to a configuration including an AC output port unless otherwise specified.

The power conversion apparatus 100 is mounted on a vehicle such as an electric vehicle or a hybrid vehicle. The high voltage battery BH and the storage battery BL are also mounted on the vehicle together with the power conversion apparatus 100.

The multiport transformer 3 includes three or more coils which are magnetically coupled to each other. Three voltage units 4 are connected to the both terminals of respective three coils.

Each of the power conversion circuits 21, 22 and 23 may include a plurality of power conversion elements. As a power conversion element, for example, a MOSFET (i.e. metal oxide semiconductor (MOS) type field effect transistor) or IGBT (i.e. insulated gate bipolar transistor), or a switching element such as a diode having a switching function may be used. However, it is not limited thereto. In the following description, the power conversion circuits 21, 22 and 23 may be also referred to as switching circuits 21, 22, 23.

Figure 2:
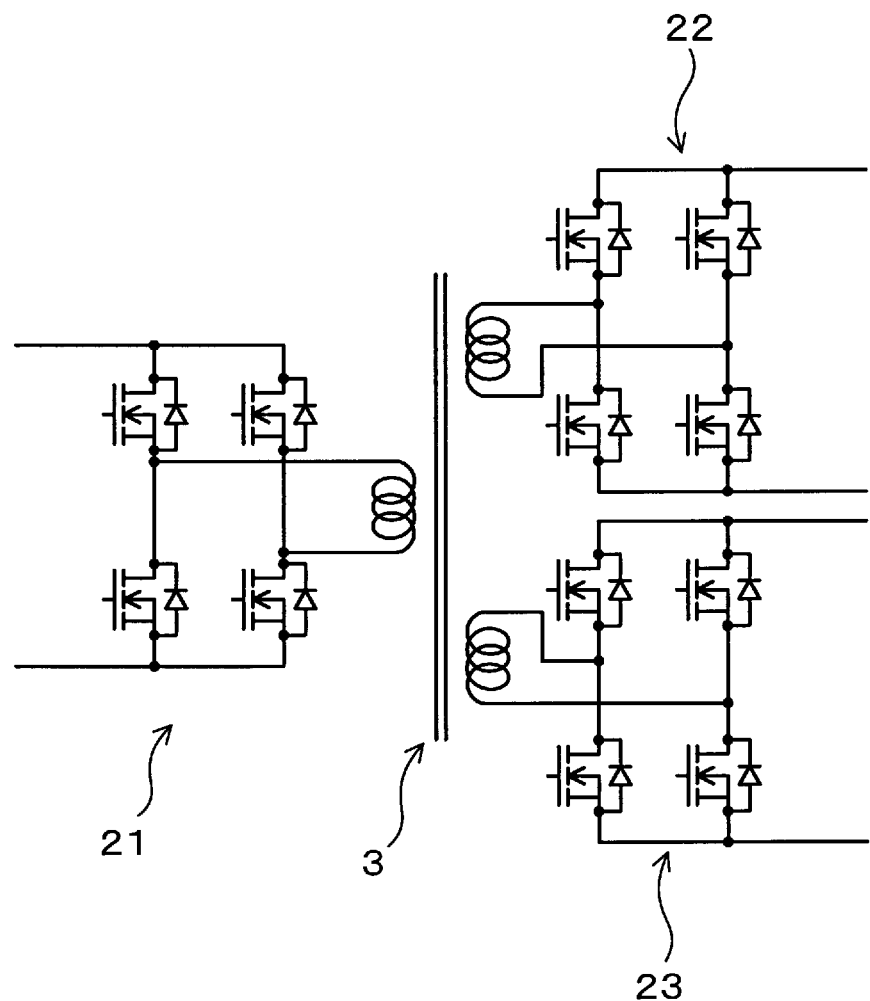
FIG. 2 is a circuit configuration of an example of a multiport transformer and three power conversion circuit.

As shown in FIG. 2, the switching circuits 21, 22 and 23 each include a bridge circuit configuration. In other words, the power conversion apparatus 100 configures MAB (i.e. multiple active bridge) with the multiport transformer 3 and three switching circuits 21, 22 and 23.

For example, as shown in FIG. 2, the switching circuits 21, 22 and 23 may constitute a full bridge circuit. Moreover, these switching circuits 21, 22 and 23 may be configured as a half bridge circuit. Alternatively, a part of three switching circuits 21, 22 and 23 may be configured as a full bridge circuit and the rest part of the switching circuits 21, 22 and 23 may be configured as a full bridge circuit.

According to the present embodiment, a power conversion can be performed between the AC power source ACS, the storage battery BL and the high voltage battery BH. For example, power can be supplied to the AC output port of the AC power source ACS from the high voltage battery BH, while charging the storage battery BL from the high voltage battery BH. Further, the storage battery BL can be charged while charging the high voltage battery BH from the AC power source ACS. Then, the power conversion between the above-described three voltage units 4 can be accomplished with a single multiport transformer 3 which has been made compact and a small scaled switching circuits 21, 22 and 23. Note that the small scale refers to small number of components or a small sized body.

The three voltage units 4 in the first reference may be appropriately modified to be other type of voltage unit, that is, various power sources or loads, thereby constituting embodiments or references. As the voltage unit connected to the power conversion apparatus, other than the vehicle drive battery BH, the AC power source ACS and the storage battery BL as described in the first reference, for example, the following a DC power source DCS, a load LD and a solar power source SS are can be used. Specifically, as described in the latter embodiments or the like, three or more various voltage units are appropriately combined via the power conversion apparatus, whereby the power conversion between a plurality of voltage units can be accomplished via a single multiport transformer.

The solar power source SS is one of power supply units for supplying power to the high voltage battery BH from outside the vehicle. For example, the solar power source SS can be configured as a solar power generator including a solar panel disposed on the roof of the vehicle. The solar power source SS can be configured as a solar power generator provided with MPPT (i.e. maximum power point tracking). The solar power source SS can be also configured as a solar power generator provided with a PWM (pulse width modulation) control function.

Note that since an operational condition of the solar power source SS is limited depending on the time of day, weather or the like, the solar power source SS is often used together with other power sources. Hence, the solar power source SS is configured to be capable of connecting with a plurality of other voltage units via a single multiport transformer, whereby the number of components and the size can be reduced as a whole system such as vehicle power source system.

For example, the load LD is mounted on the vehicle, and can be configured as a heater, for example. The heater may be disposed in the exhaust system in a hybrid vehicle or the like and used for heating an electrically heated catalyst. Further, the heater may be used for heating seats in the vehicle or may be used for heating a battery such as a high voltage battery BH. Alternatively, the heater may be used as a water heating heater for heating cooling water of the high voltage battery. The load LD may be utilized, other than a heater, as an active body control (e.g. suspension), an electrical supercharger, an engine cooling fan, an ai compressor for air conditioner or the like. The voltage of the load LD may be set to be higher than that of the storage battery BL. Also, the voltage of the load may be set to be higher than that of the high voltage battery BH.

The DC power source DCS is one of power supply units for supplying power to the high voltage battery BH from outside the vehicle. The DC power source DCS may be configured as a charger power source capable of charging with a DC power. As the DC power source DCS, for example, a DC charger in a power station or the like is expected.

First Embodiment

Figure 3:
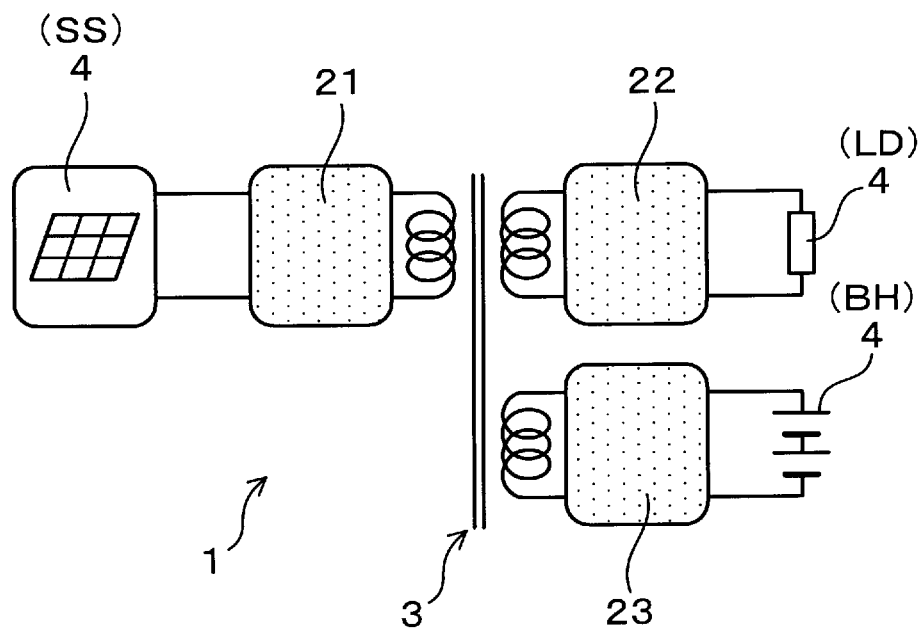
FIG. 3 is a circuit configuration of a power conversion apparatus according to a first embodiment of the present disclosure.

As shown in FIG. 3, a power conversion apparatus 1 according to the first embodiment is connected to three voltage units 4 including a solar power source SS, a load LD and a high voltage battery BH.

According to the present embodiment, a power conversion can be accomplished between three or more voltage units 4 including the load LD via a multiport transformer. For example, the power can be supplied to both of the load LD and the high voltage battery BH from the solar power source SS via the multiport transformer 3. Also, the power can be supplied to the solar power source SS side from the high voltage battery BH.

The first embodiment has configuration and effects and advantages similar to the first reference. In the reference numbers used in embodiments and references after the first embodiment, reference numbers same as those used in existing embodiment indicate the same constituents as those in the existing embodiments or references unless otherwise specified.

Second Embodiment

Figure 4:
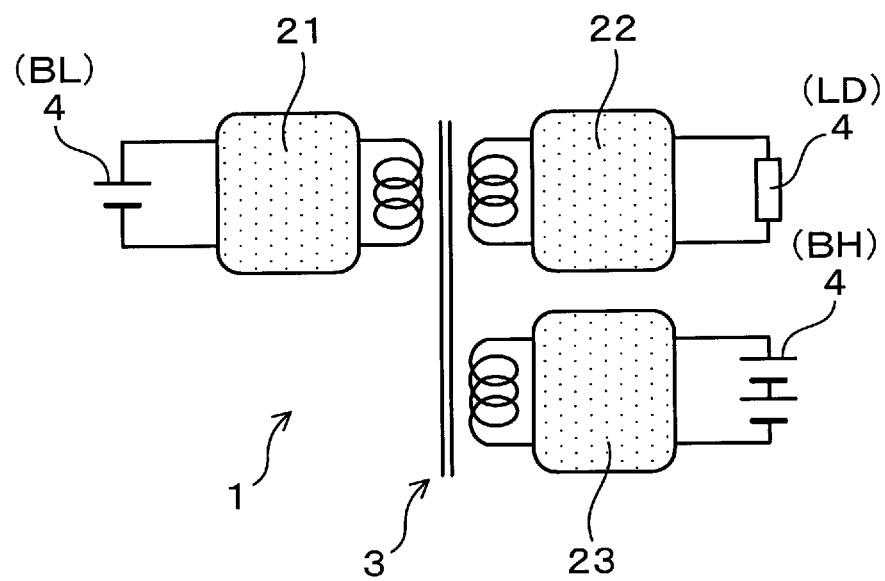
FIG. 4 is a circuit configuration of a power conversion apparatus according to a second embodiment.

As shown in FIG. 4, a power conversion apparatus 1 according to the second embodiment is connected to three voltage units 4 including a storage battery BL, a load LD and a high voltage battery BH. As the storage battery BL, it is not limited to a battery having voltage of 12V, but a battery having other voltage may be used.

According to the present embodiment, power can be supplied to the load LD from both of the storage battery BL and the high voltage battery BH. Also, power can be mutually exchanged between the storage battery BL and the high voltage battery BH. A power arbitration may be performed therebetween. Thereafter, power can be supplied to the load LD from either the storage battery BL or the high voltage battery BH. Hence, energy efficiency is likely to be improved in the whole system through the power conversion apparatus 1. Further, the present embodiment has similar configuration and advantages to those in the first reference.

Second Reference

Figure 5:
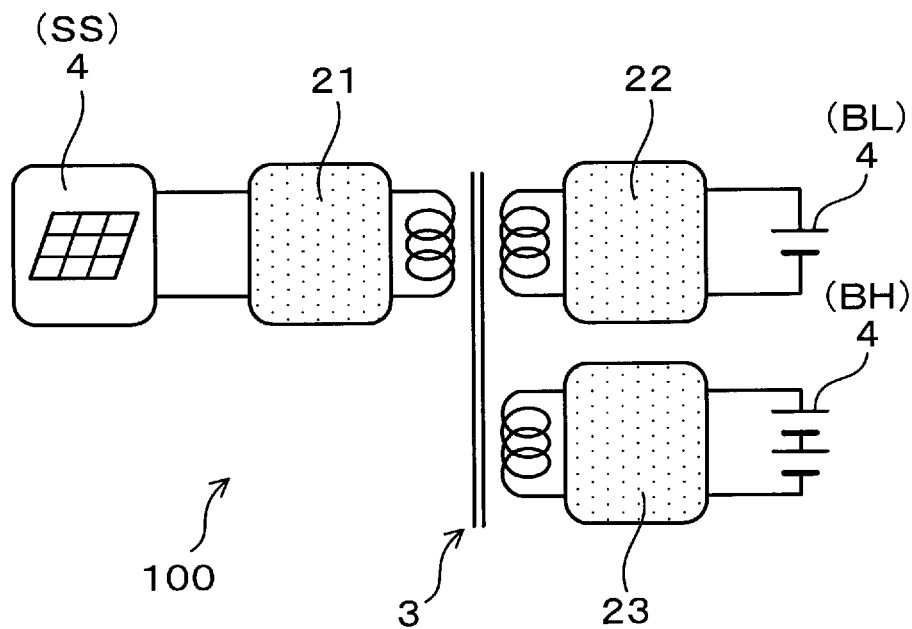
FIG. 5 is a circuit configuration of a power conversion apparatus according to a second reference.

As shown in FIG. 5, a power conversion apparatus 100 according to the second reference is connected to three voltage units 4 including a solar power source SS, a storage battery BL and a high voltage battery BH. According to the second reference, for example, power can be supplied to both of the storage battery BL and the high voltage battery BH from the solar power source SS via the multiport transformer 3. Also, the power can be supplied to the solar power source SS side from the high voltage battery BH.

The power can be mutually exchanged between the storage battery BL and the high voltage battery BH. A power arbitration may be performed therebetween. Thereafter, the power can be supplied to either the storage battery BL or the high voltage battery BH from the solar power source SS. Hence, energy efficiency is likely to be improved in the whole system through the power conversion apparatus 1. Further, the second reference has similar configuration and advantages to those in the first reference.

Third Embodiment

Figure 6:
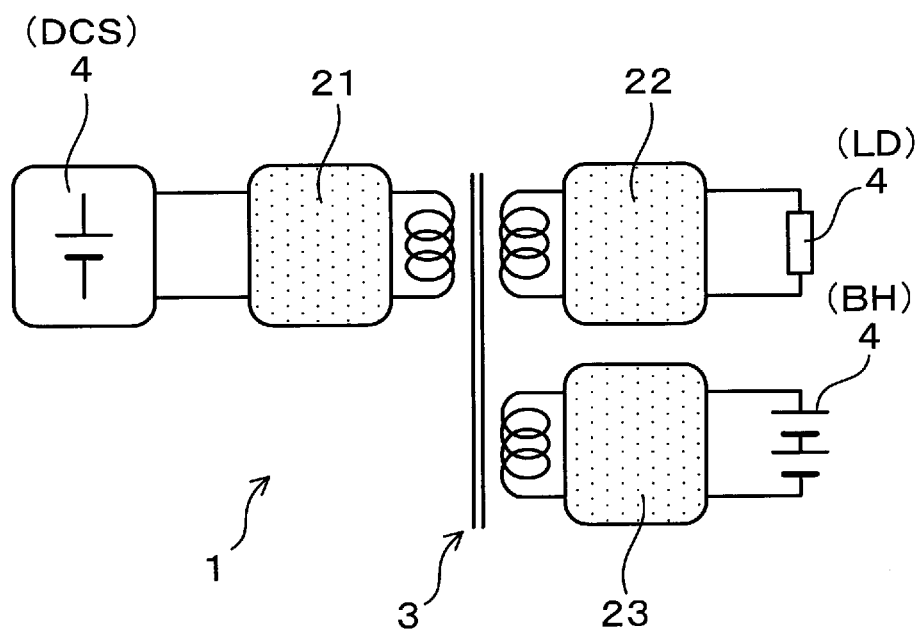
FIG. 6 is a circuit configuration of a power conversion apparatus according to a third embodiment.

As shown in FIG. 6, a power conversion apparatus 1 according to the third embodiment is connected to three voltage units 4 including a DC power source DCS, a load LD and a high voltage battery BH. According to the third embodiment, for example, power can be supplied to both of the load LD and the high voltage battery BH from the DC power source DCS via the multiport transformer 3. In other words, while the high voltage battery BH is being charged by the DC power source DCS, the power can also be supplied to the load LD from the DC power source DCS. Thus, in the case where the load LD is a heater, the heater promptly performs heating operation. In particular, the heater may be heated during the charging of the high voltage battery BH before starting the vehicle, whereby the temperature of the catalyst or the like can be increased. Further, the present embodiment has similar configuration and advantages to those in the first embodiment.

Forth Embodiment

Figure 7:
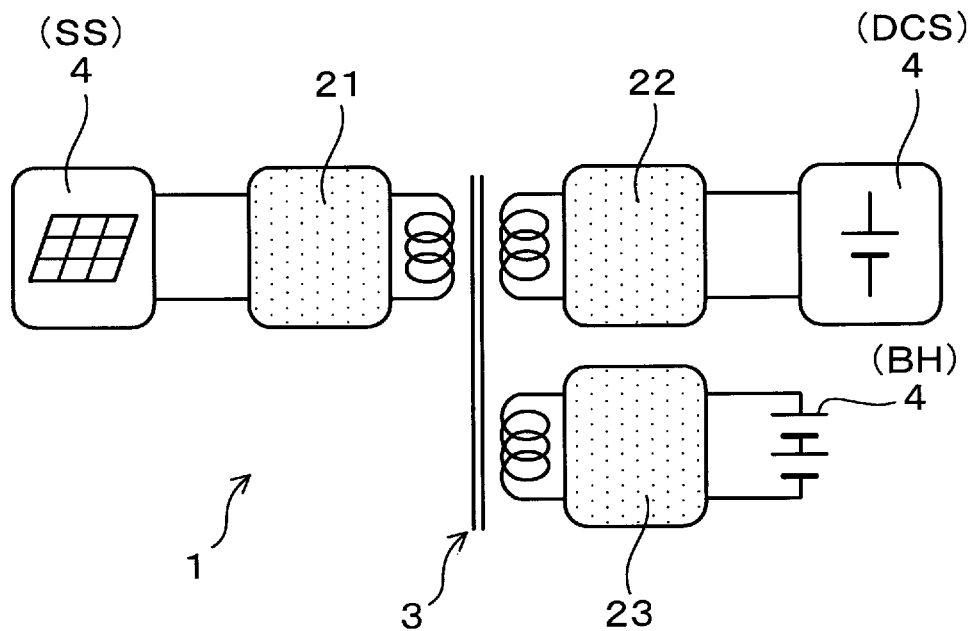
FIG. 7 is a circuit configuration of a power conversion apparatus according to a fourth embodiment.

As shown in FIG. 7, a power conversion apparatus 1 according to the fourth embodiment is connected to three voltage units 4 including a solar power source SS, a DC power source DCS and a high voltage battery BH. In other words, the power conversion apparatus 1 according to the present embodiment includes at least a vehicle drive battery (i.e. high voltage battery BH) and a plurality of power supply units (i.e. DC power source DCS and solar power source SS) for supplying power to the vehicle drive battery from outside the vehicle.

Thus, the power can be supplied to the vehicle drive battery from the plurality of power supply units via the single multiport transformer 3. According to the present embodiment, the power can be supplied to the high voltage battery BH from the solar power source SS while the high voltage battery BH is being charged by the DC power source DCS. Thus, the charging time of the high voltage battery BH can be shortened. Further, the present embodiment has similar configuration and advantages to those in the first embodiment.

Third Reference

Figure 8:
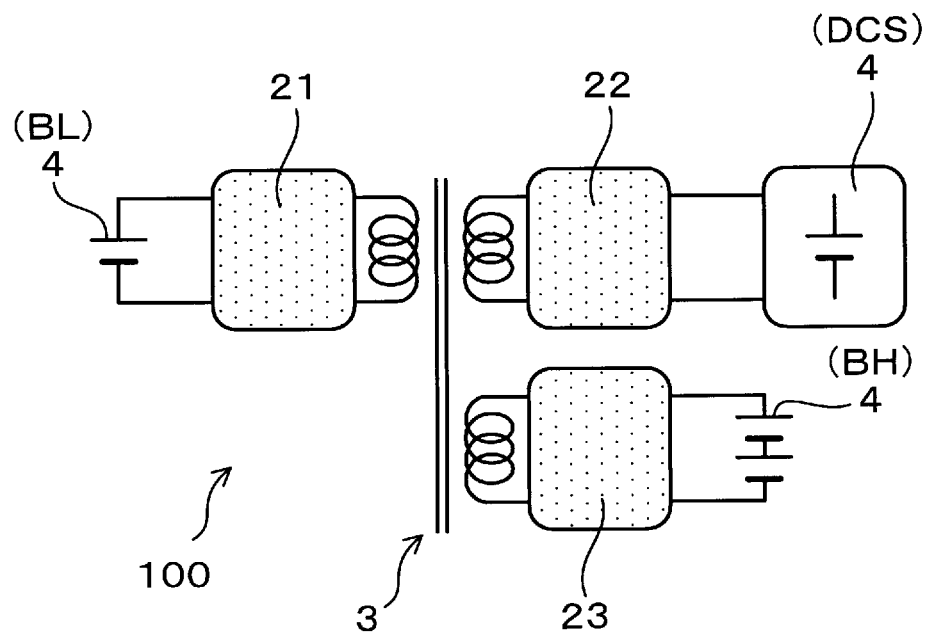
FIG. 8 is a circuit configuration of a power conversion apparatus according to a third reference.

As shown in FIG. 8, a power conversion apparatus 100 according to the third reference is connected to three voltage units 4 including the storage battery BL, the DC power source DCS and the high voltage battery BH. According to the third reference, it is possible to charge the high voltage battery BH by the storage battery BL while the DC power source DCS is charging the high voltage battery BH. Also, power can be supplied to both of the storage battery BL and the high voltage battery BH from the DC power source DCS via a single multiport transformer 3. Further, the third reference has similar configuration and advantages to those in the first reference.

Fifth Embodiment

Figure 9:
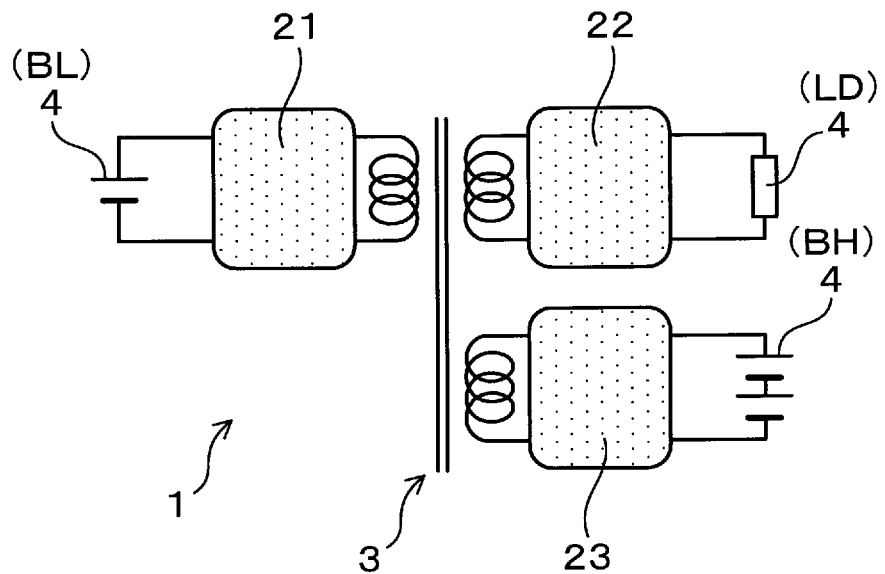
FIG. 9 is a circuit configuration of a power conversion apparatus according to a fifth embodiment.

As shown in FIG. 9, a power conversion apparatus 1 according to the fifth embodiment is connected to three voltage units 4 including a storage battery BL, a load LD and a high voltage battery BH. According to the present embodiment, the storage battery BL can be a storage battery for 12V system.

According to the present embodiment, the power can be supplied to the load LD from both of the storage battery BL and the high voltage battery BH via a single multiport transformer 3. Hence, in the case where the load LD is a heater, for example, a heating period of the heater can be shortened. Also, the power from the storage battery BL can be used for a power controlling the heater. Further, the fifth embodiment has similar configuration and advantages to those in the first embodiment.

Fourth Reference

Figure 10:
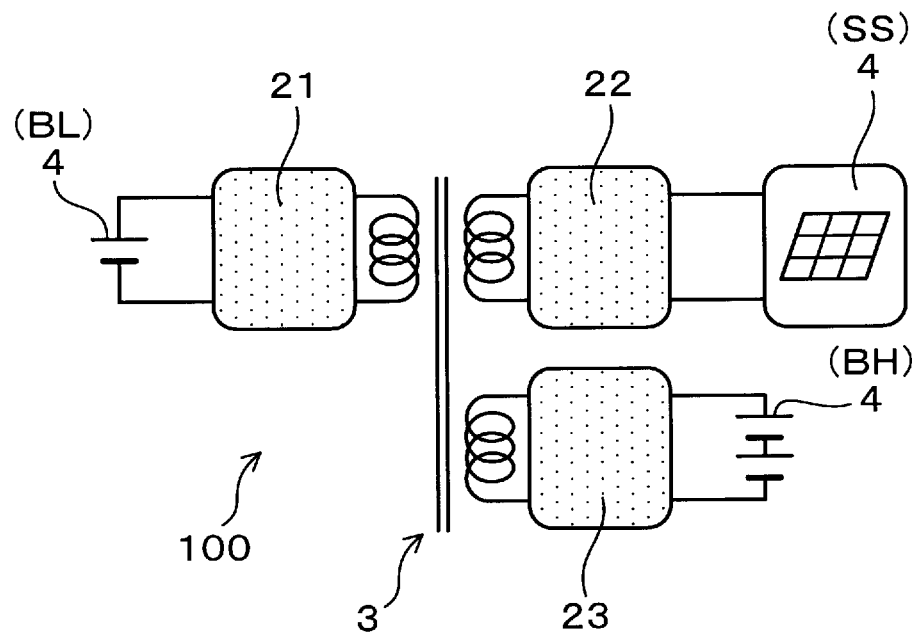
FIG. 10 is a circuit configuration of a power conversion apparatus according to a fourth reference.

As shown in FIG. 10, the power conversion apparatus 100 according to the fourth reference is connected to three voltage units 4 including to a storage battery BL, a solar power source SS and a high voltage battery BH. According to the present embodiment, both of the high voltage battery BH and the storage battery BL can be simultaneously charged via a single multiport transformer 3. Thus, rate of utilization of the solar energy can be improved. Further, deterioration of the storage battery BL used for an auxiliary battery can be suppressed. Also, power from the storage battery BL can be used for a power controlling the heater. Further, the fourth reference has similar configuration and advantages to those in the first embodiment.

Fifth Reference

Figure 11:
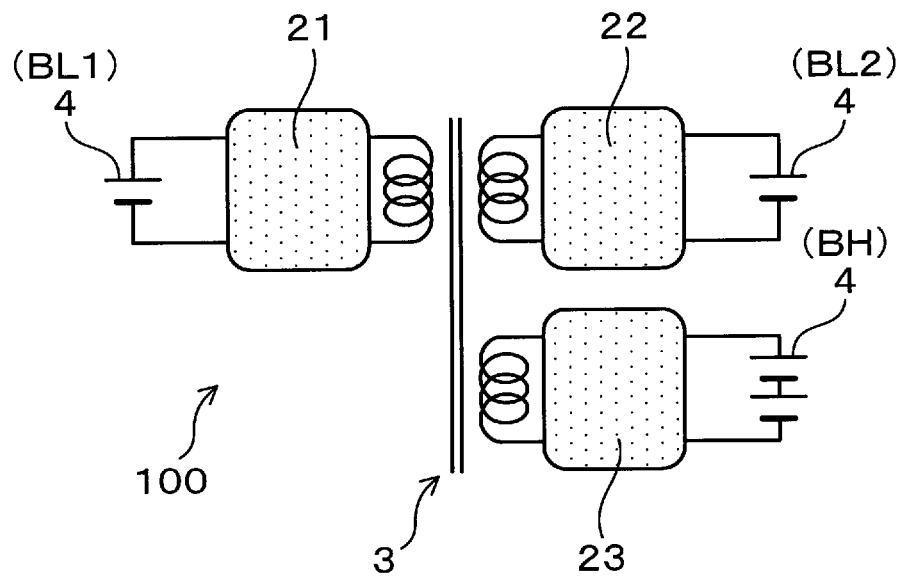
FIG. 11 is a circuit configuration of a power conversion apparatus according to a fifth reference.

As shown in FIG. 11, a power conversion apparatus 100 according the fifth reference is connected to three voltage units 4 including two storage batteries BL1 and BL2, and a high voltage battery BH. According to the present embodiment, the voltage of the storage battery BL1 may be set to be 12V. The voltage of the storage battery BL2 may be the same 12V as that of the storage battery BL1, or may be set to be different voltage such as 7V or 48V.

According to the fifth reference, power can be exchanged between the storage battery BL1, the storage battery BL2 and the high voltage battery BH, via a single multiport transformer 3. Then, a power arbitration can be performed between these storage battery BL1, the storage battery BL2 and the high voltage battery BH. For example, the power of the storage batteries BL1 and BL2 can be supplied to the high voltage BH and used for driving vehicle. Thus, fuel efficiency can be improved. The fifth reference has similar configuration and advantages to those in the first reference.

Sixth Reference

Figure 12:
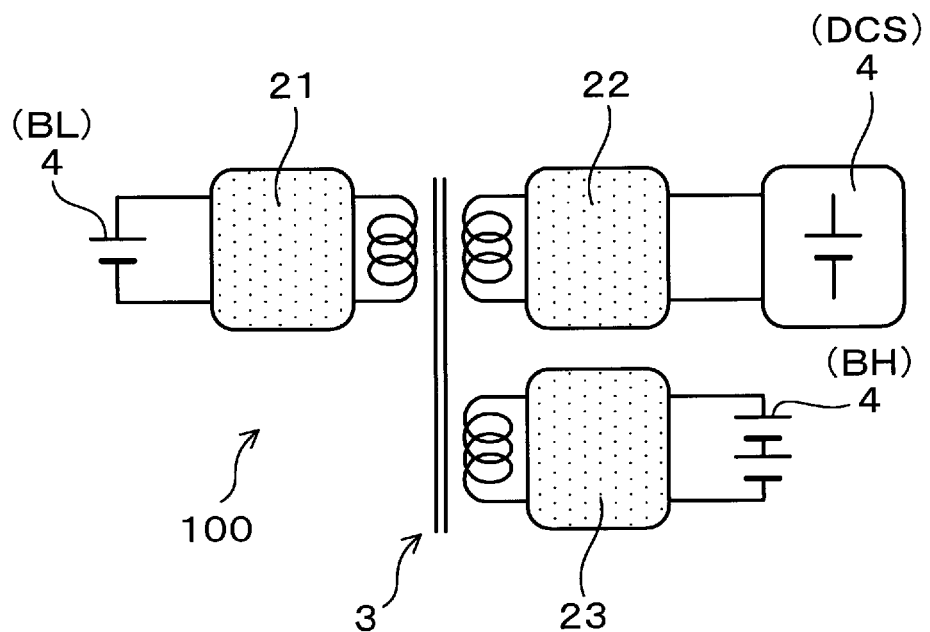
FIG. 12 is a circuit configuration of a power conversion apparatus according to a sixth reference.

As shown in FIG. 12, a power conversion apparatus 100 according to the sixth reference is connected to three voltage units 4 including a storage battery BL, a DC power source DCS and a high voltage battery BH. According to the sixth reference, while charging the high voltage BH from the DC power source DCS, the high voltage battery BH can be supplied with power from the storage battery BL. Thus, the charging time of the high voltage battery BH can be shortened. Also, both of the high voltage BH and storage battery BL can be supplied with power from the DC power source DCS. The sixth reference has similar configuration and advantages to those in the first reference.

Sixth Embodiment

Figure 13:
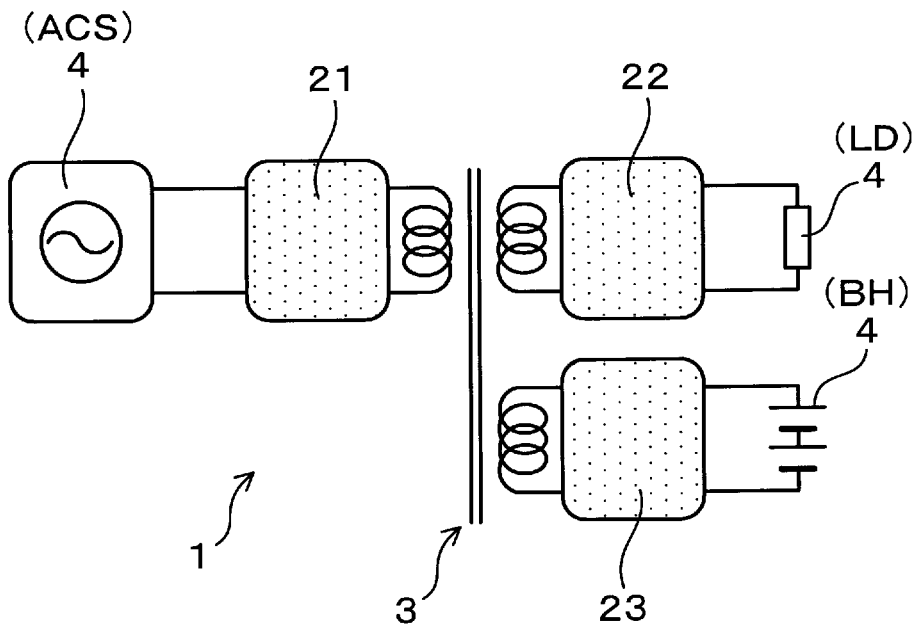
FIG. 13 is a circuit configuration of a power conversion apparatus according to a sixth embodiment.

As shown in FIG. 13, a power conversion apparatus 1 of the sixth embodiment is connected to three voltage units 4 including an AC power source ACS, a load LD and a high voltage battery BH. According to the sixth embodiment, power is supplied to the high voltage battery BH and also the load LD from the AC power source ACS. In other words, the load LD such as a heater can be operated by an AC power ACS while the high voltage battery BH is being charged by an AC power source ACS. Further, the high voltage battery BH is able to supply power to the load LD and an AC output port of the AC power source ACS. The sixth embodiment has similar configuration and advantages to those in the first embodiment.

Seventh Embodiment

Figure 14:
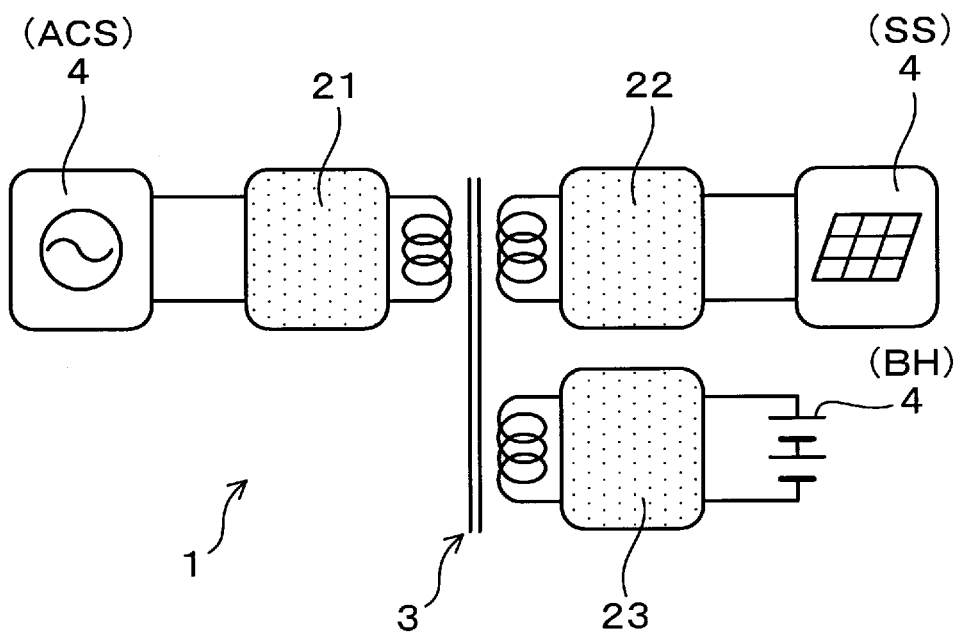
FIG. 14 is a circuit configuration of a power conversion apparatus according to a seventh embodiment.

As shown in FIG. 14, a power conversion apparatus 1 of the seventh embodiment is connected to three voltage units 4 including an AC power source ACS, a solar power source SS and a high voltage battery BH. According to the present embodiment, the solar power source SS is able to charge the high voltage battery BH while the high voltage battery BH is being charged by the AC power source ACS. Thus, the charging time of the high voltage battery BH can be shortened. The seventh embodiment has similar configuration and advantages to those in the fourth embodiment.

Seventh Reference

Figure 15:
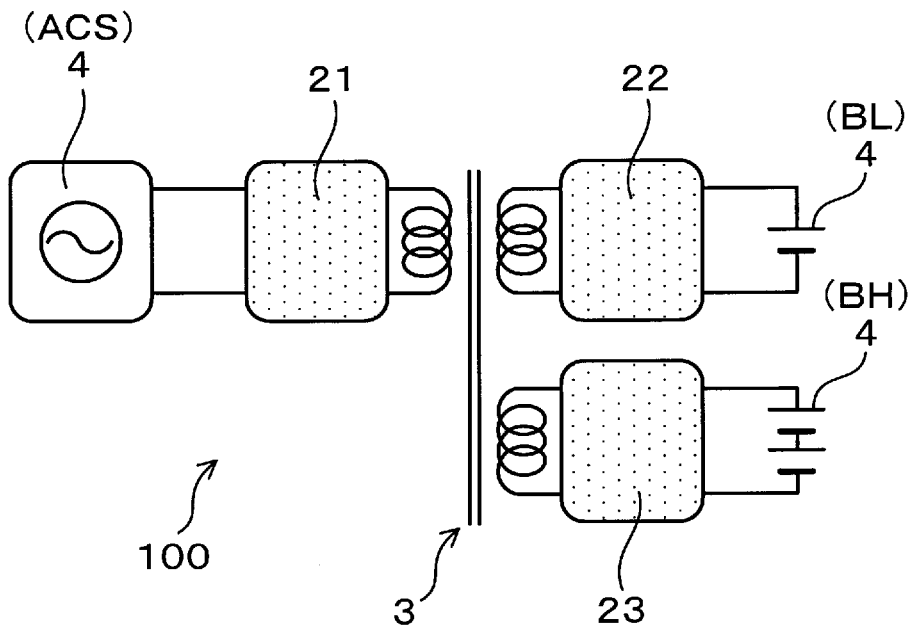
FIG. 15 is a circuit configuration of a power conversion apparatus according to a seventh reference.

As shown in FIG. 15, a power conversion apparatus 1 is connected to three voltage units 4 including an AC power source ACS, a storage battery BL and a high voltage battery BH. Specifically, according to the present seventh reference, as the storage battery BL, a storage battery other than the one of 12 V system can be adopted.

According to the present reference, while charging the high voltage battery BH from the AC power source ACS, the high voltage battery BH can also be charged from the storage battery BL. Thus, the charging time can be shortened.

Eighth Embodiment

Figure 16:
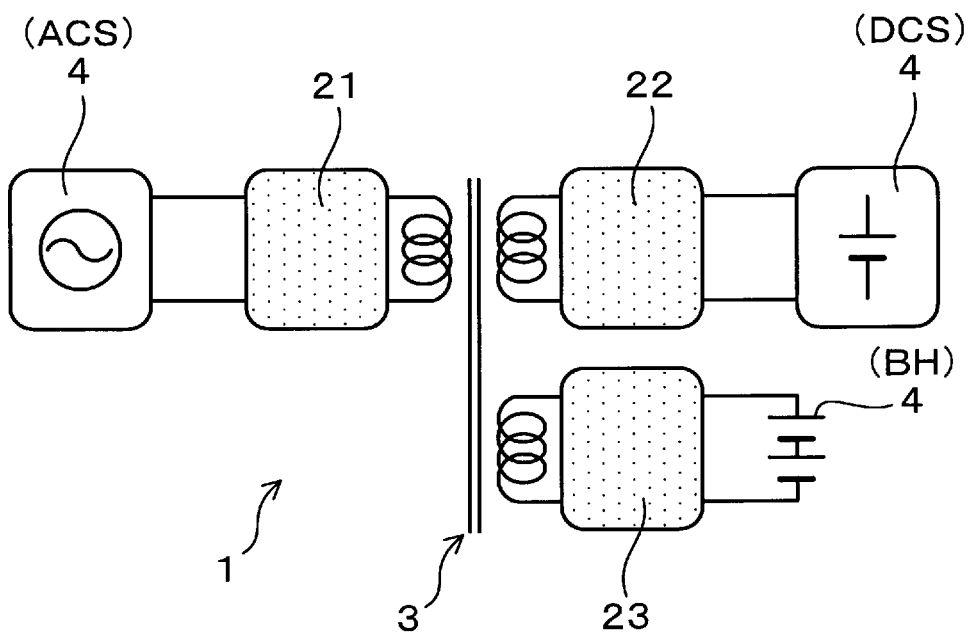
FIG. 16 is a circuit configuration of a power conversion apparatus according to an eighth embodiment.

As shown in FIG. 16, a power conversion apparatus 1 is connected to three voltage units 4 including an AC power source ACS, a DC power source DCS and a high voltage battery BH. According to the eighth embodiment, the high voltage battery BH can be charged from both of the AC power source ACS and the DC power source DCS. Thus, the charging time of the high voltage battery BH can be shortened. The seventh embodiment has similar configuration and advantages to those in the fourth embodiment.

Ninth Embodiment

Figure 17:
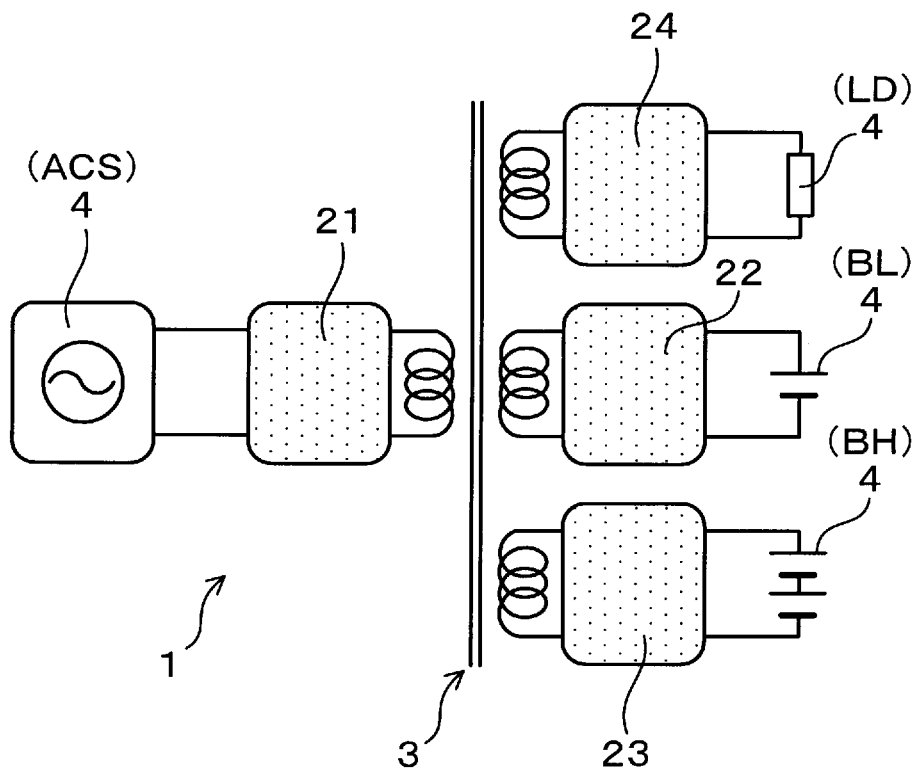
FIG. 17 is a circuit configuration of a power conversion apparatus according to a ninth embodiment.

As shown in FIG. 17, a power conversion apparatus 1 according to the ninth embodiment is connected to four voltage units 4. The power conversion unit 1 includes four power conversion circuits (i.e. switching circuits 21, 22, 23 and 24) connected to respective four voltage units, and a multiport transformer 3 connected to the four switching circuits 21, 22, 23 and 24 at mutually different ports. According to the present embodiment, the multiport transformer 3 has magnetically coupled four coils.

According to the present embodiment, as the four voltage units 4, the AC power source ACS, the load LD, the storage battery BL and the high voltage battery BH are connected to the power conversion apparatus 1.

The power conversion apparatus 1 is connected to the four voltage units 4 and includes four power conversion circuits (i.e. switching circuits 21, 22, 23 and 24). Thus, power can be mutually exchanged between four voltage units 4 via a single multiport transformer 3. Hence, power conversion can be accomplished between a plurality of voltage units 4 via a single multiport transformer 3 with a number of combinations.

Specifically, when four voltage units 4 are present, six combinations are possible for two units as a single pair. Therefore, the power conversion can be accomplished between four voltage units with six combination of units via the single multiport transformer. Therefore, power can be exchanged between the voltage units 4 having a significantly large number of combinations, while suppressing an increase in the number of components and expansion of the size thereof.

Since the AC power source ACS, the load LD, the storage battery BL, and the high voltage battery BH are connected to the power conversion apparatus 1 according to the present embodiment, for example, charging from the AC power source ACS to the high voltage battery BH together with the storage battery BL can be performed, and further, the load LD can be supplied with power. The ninth embodiment has similar configuration and advantages to those in the first embodiment.

Tenth Embodiment

Figure 18:
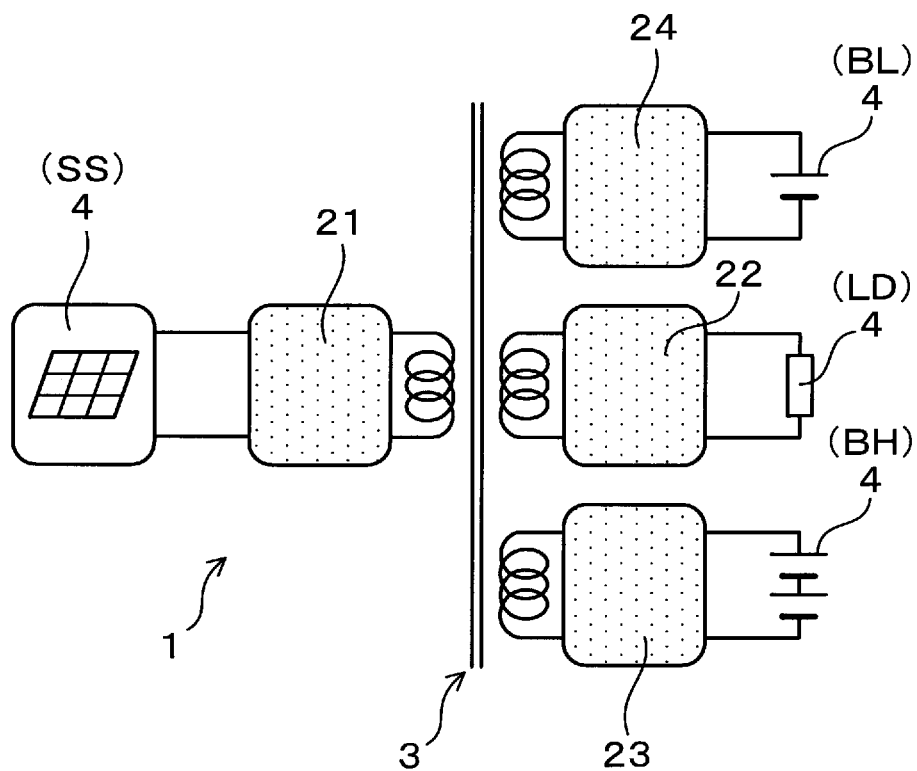
FIG. 18 is a circuit configuration of a power conversion apparatus according to a tenth embodiment.

As shown in FIG. 18, a power conversion apparatus 1 according to the tenth embodiment is connected to four voltage units 4 including a solar power source SS, a storage battery BL, a load LD and a high voltage battery BH. According to the present embodiment, the high voltage battery BH is charged from the solar power source SS and also, power can be supplied to the load LD and the storage battery BL. Also, the power of the solar power source SS, the storage battery BL, and the high voltage battery BH can be supplied to the load LD. Thus, when the load LD is a heater, for example, heating time of the heater can be shortened. The tenth embodiment has similar configuration and advantages to those in the ninth embodiment.

Eleventh Embodiment

Figure 19:
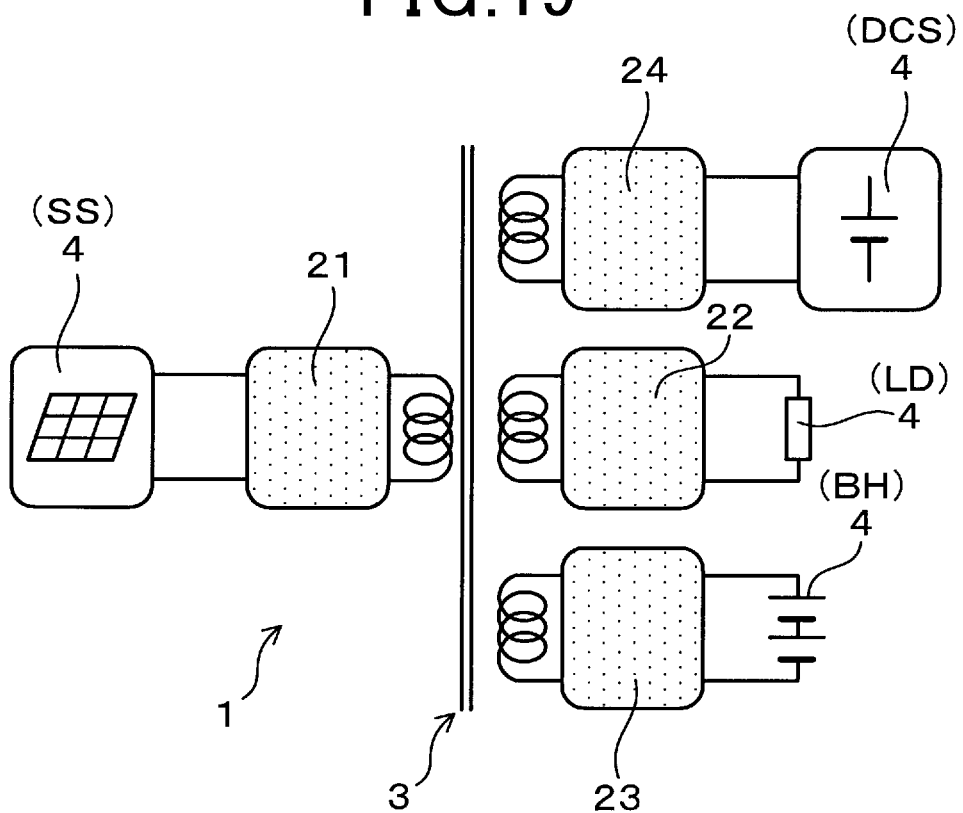
FIG. 19 is a circuit configuration of a power conversion apparatus according to an eleventh embodiment.

As shown in FIG. 19, a power conversion apparatus 1 according to the eleventh embodiment is connected to four voltage units 4 including a solar power source SS, a DC power source DCS, a load LD and a high voltage battery BH. According to the present embodiment, power can be supplied to the load LD from the solar power source SS while charging the high voltage battery BH from the DC power source BH. For example, when the load LD is a heater that heats the high voltage battery BH, the high voltage battery BH can be charged while heating the high voltage battery BH by the heater of the load LD using a power supplied by the solar power source SS. Thus, the charging speed is improved so that the charging time can be shortened. The eleventh embodiment has similar configuration and advantages to those in the ninth embodiment.

Twelfth Embodiment

Figure 20:
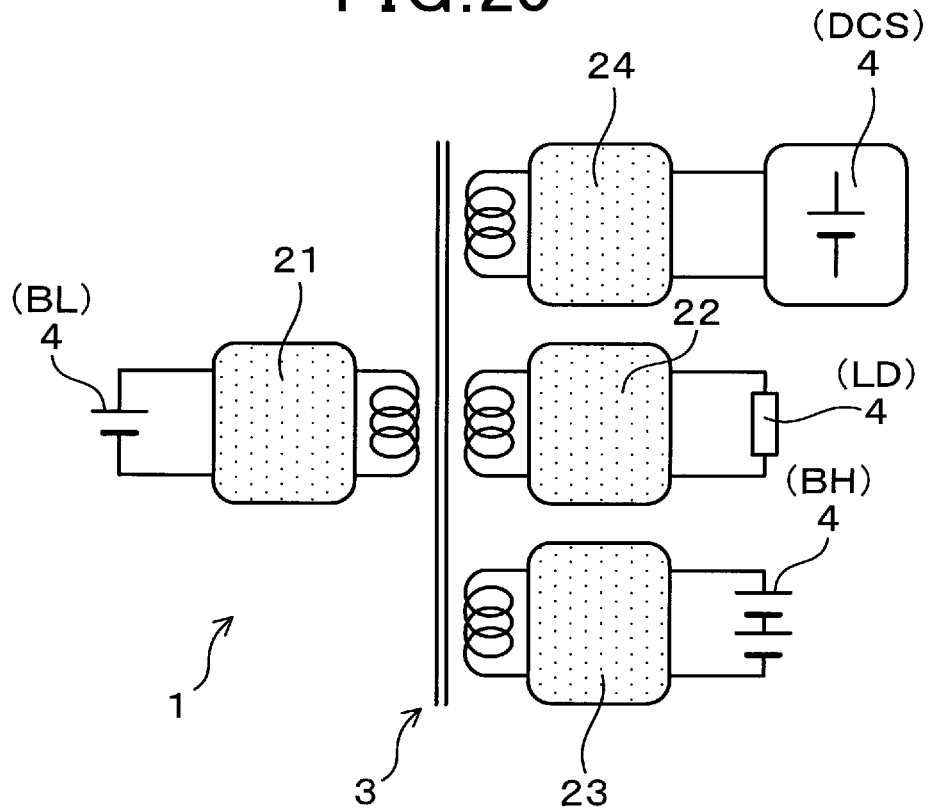
FIG. 20 is a circuit configuration of a power conversion apparatus according to a twelfth embodiment.

As shown in FIG. 20, a power conversion apparatus 1 according to the twelfth embodiment is connected to four voltage units 4 including a storage battery BL, a DC power source DCS, a load LD and a high voltage battery BH. According to the present embodiment, the load LD can be supplied with power from the storage battery BL, while charging the high voltage battery BH from the DC power source DCS. For example, when the load LD is a heater that heats the high voltage battery BH, the high voltage battery BH can be charged, while heating the high voltage battery BH by the heater of the load LD using a power supplied by the storage battery BL. Thus, the charging speed is improved so that the charging time can be shortened. The twelfth embodiment has similar configuration and advantages to those in the ninth embodiment.

Thirteenth Embodiment

Figure 21:
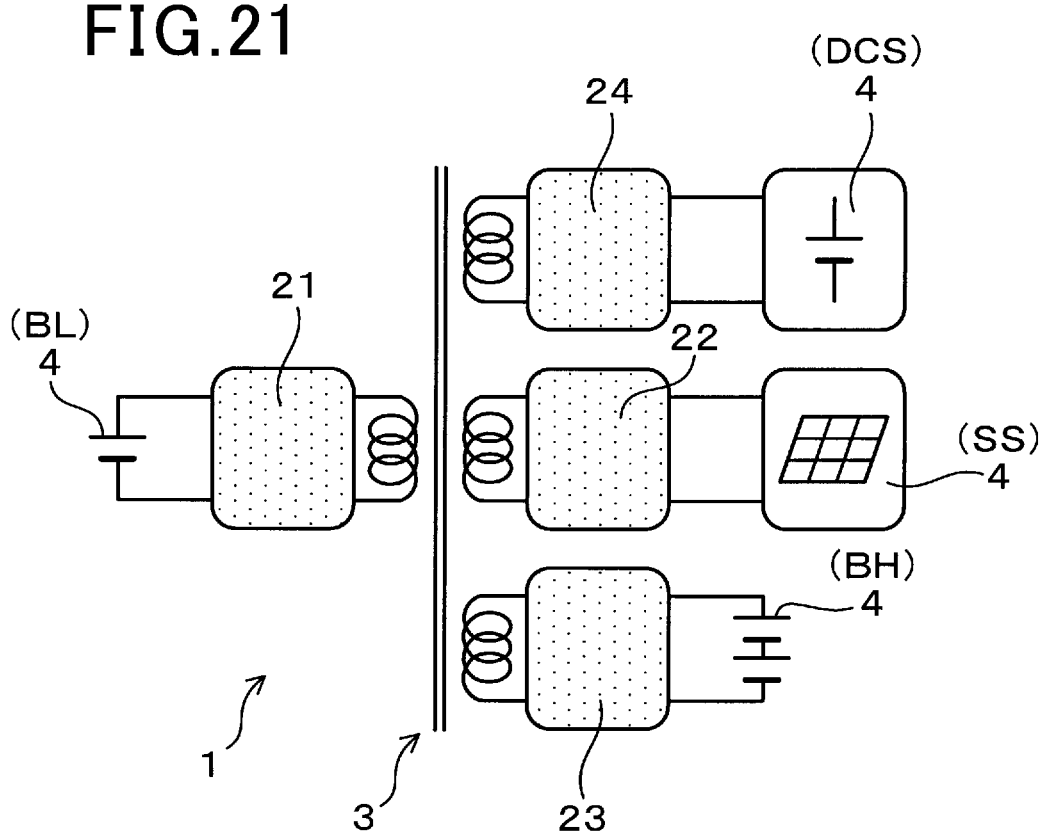
FIG. 21 is a circuit configuration of a power conversion apparatus according to a thirteenth embodiment.

As shown in FIG. 21, a power conversion apparatus 1 according to the thirteenth embodiment is connected to four voltage units 4 including a storage battery BL, a DC power source DCS, a solar power source SS and a high voltage battery BH. According to the present embodiment, the high voltage battery BH can be supplied with power by the storage battery BL and the solar power source SS, while charging the high voltage battery BH from the DC power source DCS. Thus, the high voltage battery BH can be charged in a short period of time. The thirteenth embodiment has similar configuration and advantages to those in the ninth embodiment.

Fourteenth Embodiment

Figure 22:
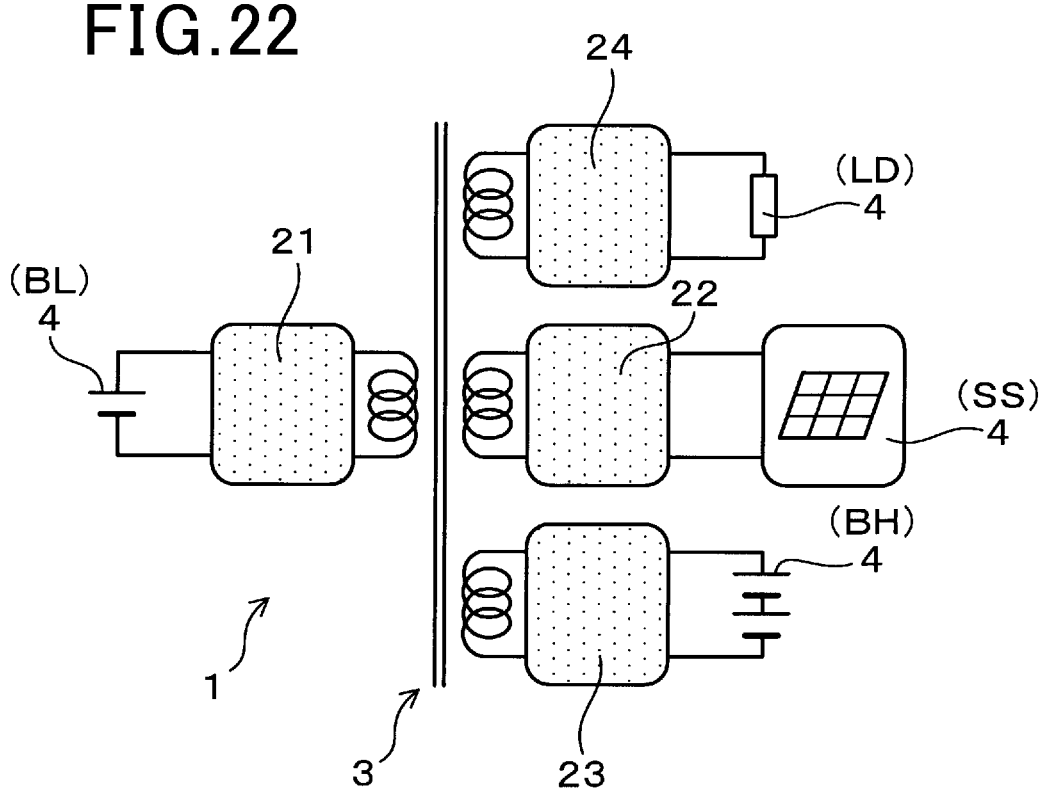
FIG. 22 is a circuit configuration of a power conversion apparatus according to a fourteenth embodiment.

As shown in FIG. 22, a power conversion apparatus 1 according to the fourteenth embodiment is connected to four voltage units 4 including a storage battery BL, a load LD, a solar power source SS and a high voltage battery BH. According to the present embodiment, as the storage battery BL, a 12V system can be used. According to the present embodiment, the storage battery BL and the load LD can be charged from the solar power source SS, while charging the high voltage battery BH from the solar power source SS. The fourteenth embodiment has similar configuration and advantages to those in the ninth embodiment.

Fifteenth Embodiment

Figure 23:
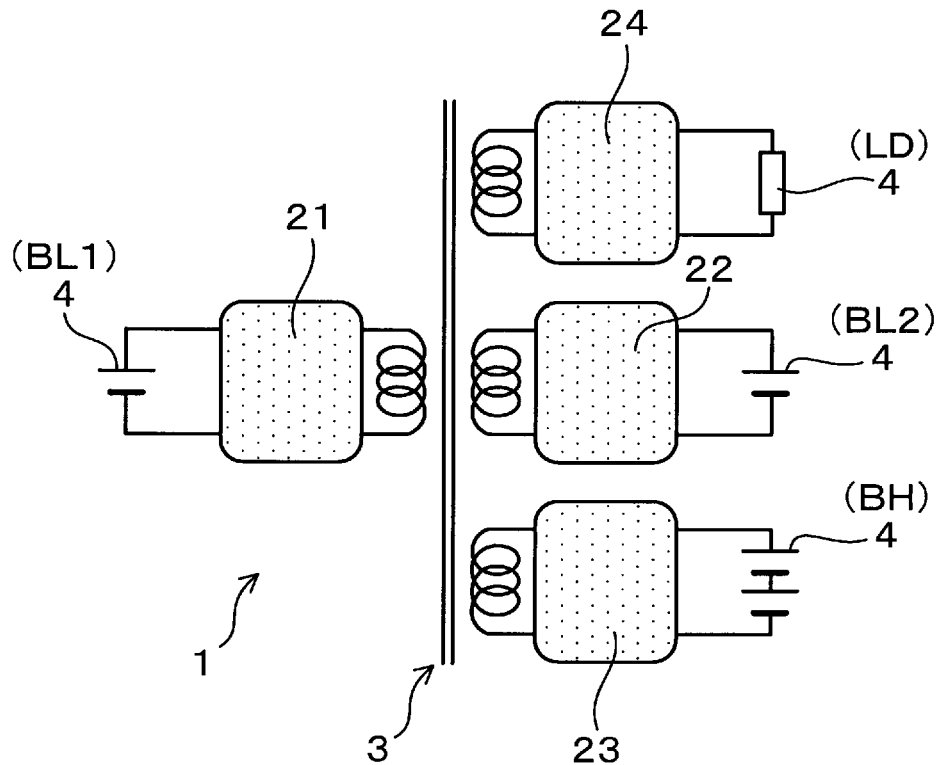
FIG. 23 is a circuit configuration of a power conversion apparatus according to a fifteenth embodiment.

As shown in FIG. 23, a power conversion apparatus 1 according to the fifteenth embodiment is connected to four voltage units 4 including two storage batteries BL1 and BL2, a load LD, and a high voltage battery BH. According to the present embodiment, as one storage battery BL1, a 12V system can be used. For the other storage battery BL, a 12V system or other system can be used.

According to the present embodiment, the load LD can be supplied with power from the two storage batteries BL1 and Bl2, and the high voltage battery BH. Thus, when the load LD is a heater, the heating time of the heater can be shortened. The fifteenth embodiment has similar configuration and advantages to those in the ninth embodiment.

Sixteenth Embodiment

Figure 24:
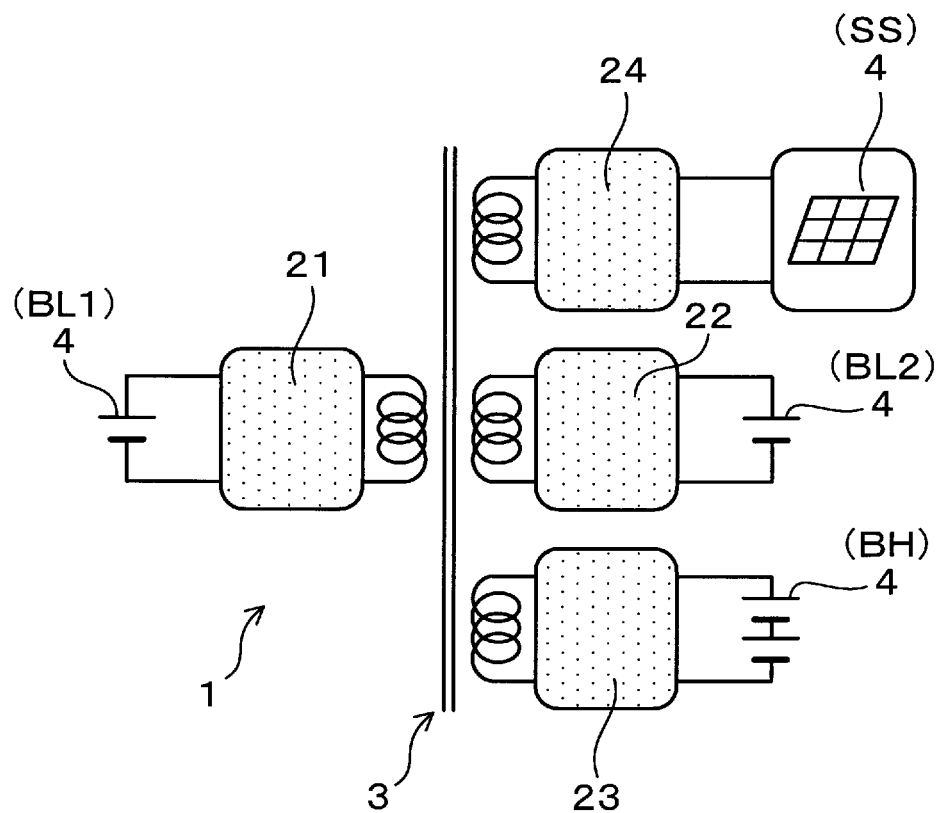
FIG. 24 is a circuit configuration of a power conversion apparatus according to a sixteenth embodiment.

As shown in FIG. 24, a power conversion apparatus 1 according to the sixteenth embodiment is connected to four voltage units 4 including two storage batteries BL1 and BL2, a solar power source SS, and a high voltage battery BH. According to the present embodiment, the two storage batteries BL1 and BL2, and the high voltage battery BH can be charged from the solar power source SS. In other words, the solar power source SS is able to simultaneously supply power to all of the two storage batteries BL1 and BL2, and the high voltage battery BH. Also, the solar power source SS is able to selectively charge one or two units from among these four units. Moreover, the high voltage battery BH can be charged from at least one of the two storage batteries BL1 and BL2, and the solar power source SS. In other words, redundant power source units can be configured. The sixteenth embodiment has similar configuration and advantages to those in the ninth embodiment.

Seventeenth Embodiment

Figure 25:
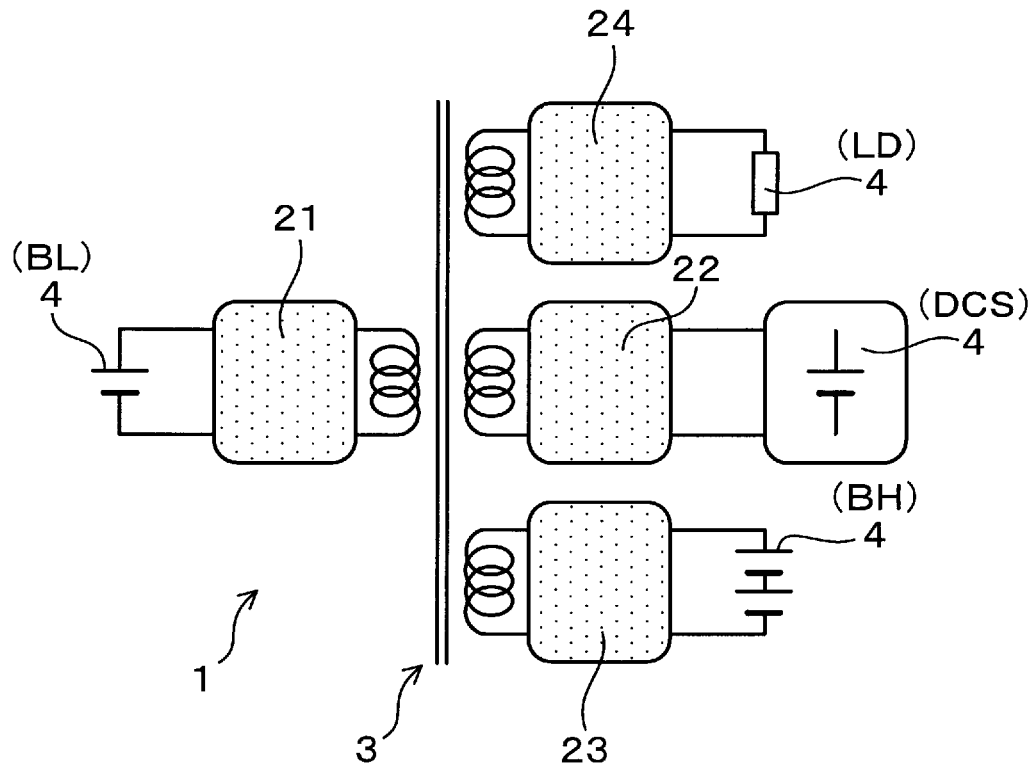
FIG. 25 is a circuit configuration of a power conversion apparatus according to a seventeenth embodiment.

As shown in FIG. 25, a power conversion apparatus 1 according to the seventeenth embodiment is connected to four voltage units 4 including two storage batteries BL1 and BL2, a solar power source SS, and a high voltage battery BH. According to the present embodiment, the load LD can be supplied with power from the storage battery BL, while charging the high voltage battery BH from the DC power source DCS. Moreover, the same effects and advantages as those in the eleventh embodiment can be obtained. The seventeenth embodiment has similar configuration and advantages to those in the ninth embodiment.

Eighteenth Embodiment

Figure 26:
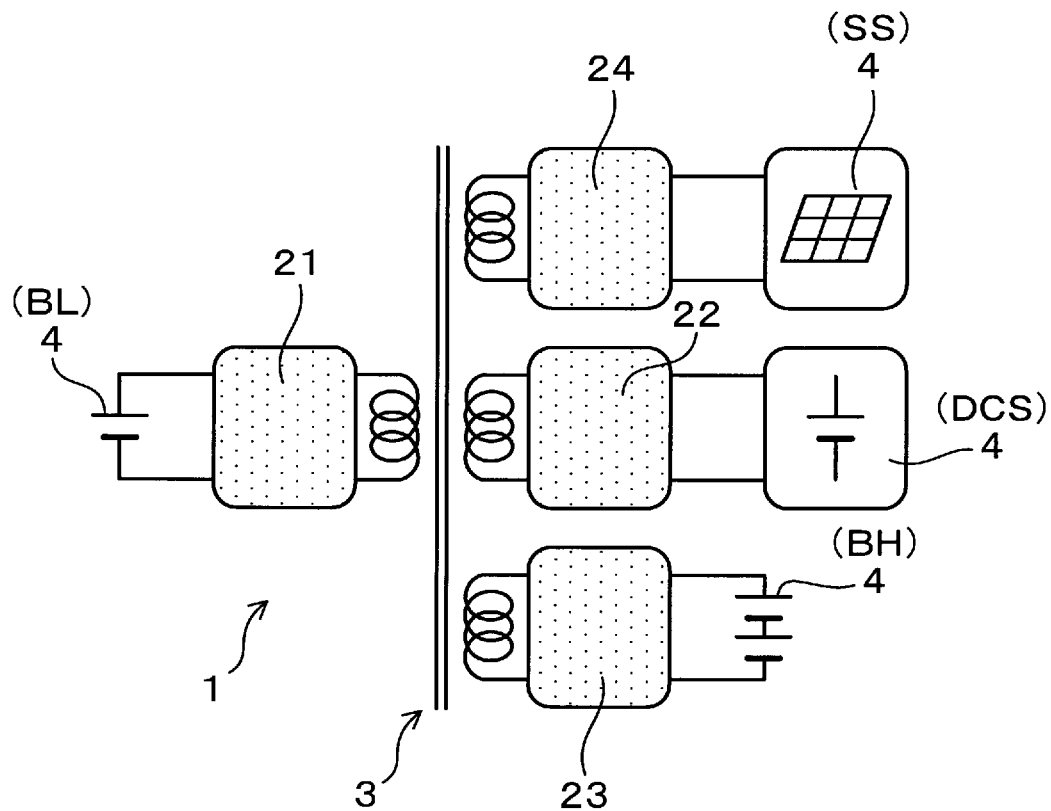
FIG. 26 is a circuit configuration of a power conversion apparatus according to an eighteenth embodiment.

As shown in FIG. 26, a power conversion apparatus 1 according to the eighteenth embodiment is connected to four voltage units 4 including a storage battery BL, a solar power source SS, a DC power source DCS and a high voltage battery BH. According to the present embodiment, the high voltage battery BH can be supplied with power from the solar power source SS, while charging the high voltage battery BH from the DC power source DCS. Thus, the high voltage battery BH can be charged in a short period of time. Moreover, the storage battery BL and the high voltage battery BH can be simultaneously charged. Thus, the high voltage battery BH can be charged faster. Also, the storage battery BL can be charged from the high voltage battery BH, the DC power source DCS and the solar power source SS. The eighteenth embodiment has similar configuration and advantages to those in the ninth embodiment.

Nineteenth Embodiment

Figure 27:
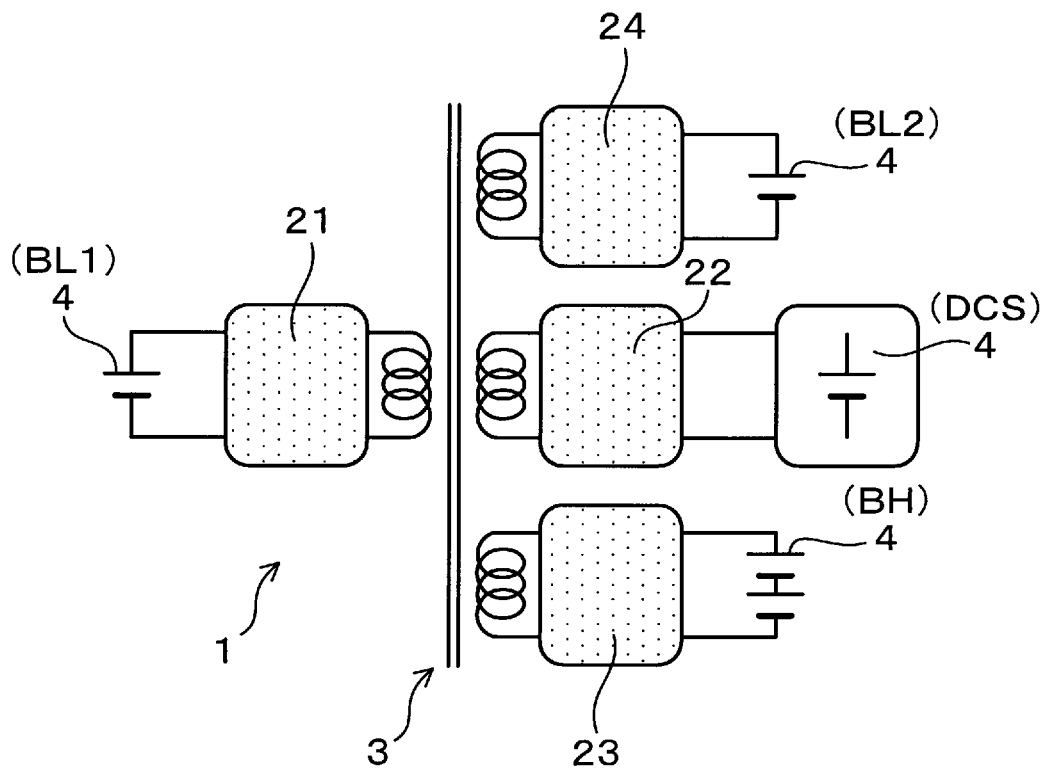
FIG. 27 is a circuit configuration of a power conversion apparatus according to a nineteenth embodiment.

As shown in FIG. 27, a power conversion apparatus 1 according to the nineteenth embodiment is connected to four voltage units 4 including two storage batteries BL1 and BL2, a DC power source DCS and a high voltage battery BH. According to the present embodiment, the high voltage battery BH can be supplied with power from at least one of two storage batteries BL1 and BL2, while charging the high voltage battery BH from the DC power source DCS. Thus, the high voltage battery BH can be charged in a short period of time. Instead of the charging from the DC power source DCS to the high voltage battery BH, charging may be performed from at least one of the two storage batteries BL1 and BL2 to the high voltage battery BH. In other words, redundant power source units can be configured. The nineteenth embodiment has similar configuration and advantages to those in the ninth embodiment.

Twentieth Embodiment

Figure 28:
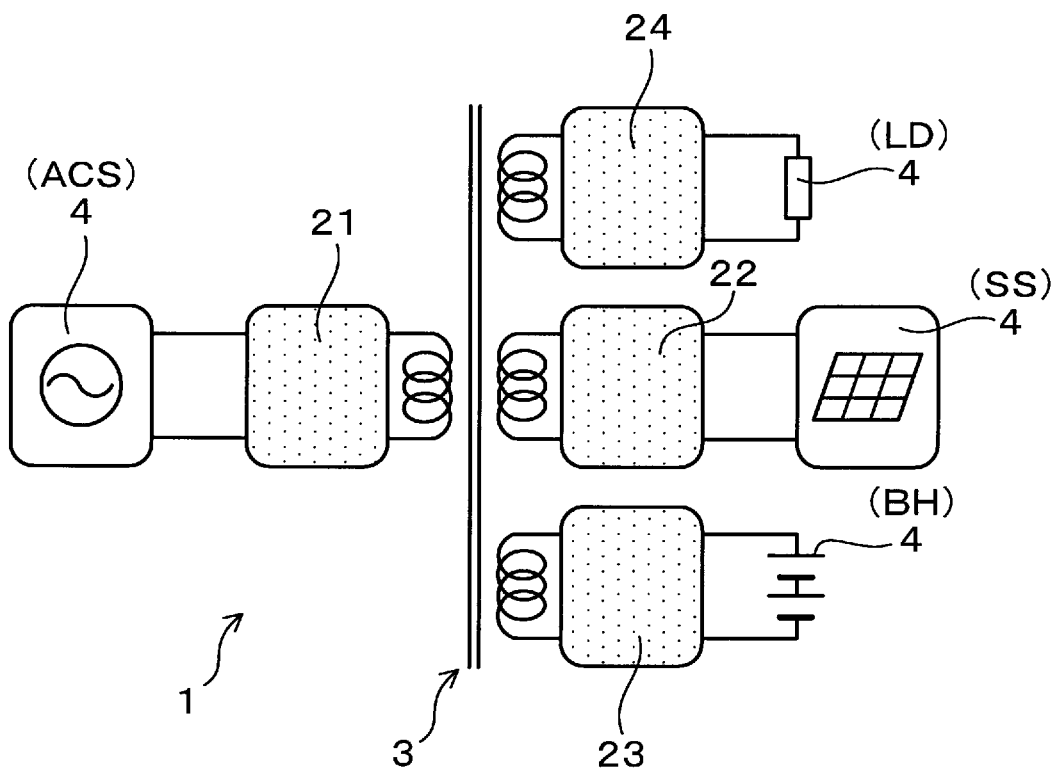
FIG. 28 is a circuit configuration of a power conversion apparatus according to a twentieth embodiment.

As shown in FIG. 28, a power conversion apparatus 1 according to the twentieth embodiment is connected to four voltage units 4 including an AC power source ACS, a load LD, a solar power source SS and a high voltage battery BH. According to the present embodiment, the load LD can be charged by the solar power source SS, while charging the high voltage battery BH from the AC power source ACS. Thus, the same effects and advantages as those in the eleventh embodiment can be obtained. The twentieth embodiment has similar configuration and advantages to those in the ninth embodiment.

Twenty-First Embodiment

Figure 29:
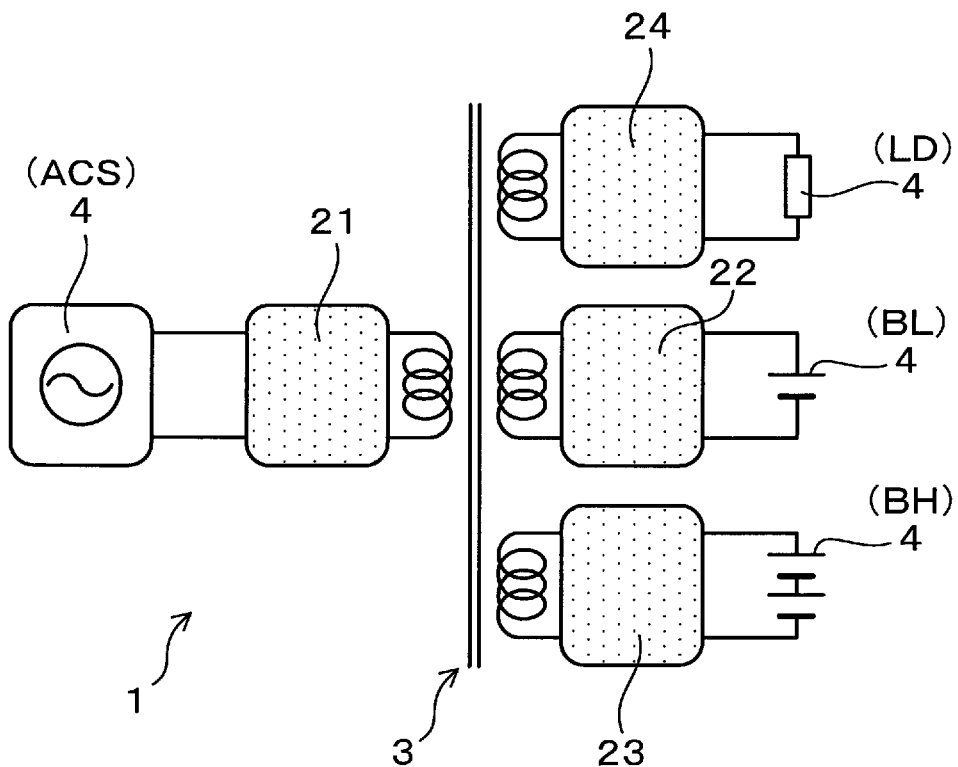
FIG. 29 is a circuit configuration of a power conversion apparatus according to a twenty-first embodiment.

As shown in FIG. 29, a power conversion apparatus 1 according to the twenty-first embodiment is connected to four voltage units 4 including an AC power source ACS, a load LD, a storage battery BL and a high voltage battery BH. According to the present embodiment, the load LD can be supplied with power from the storage battery BL, while charging the high voltage battery BH from the AC power source ACS. Thus, the same effects and advantages as those in the eleventh embodiment can be obtained. The twenty-first embodiment has similar configuration and advantages to those in the ninth embodiment.

Twenty-Second Embodiment

Figure 30:
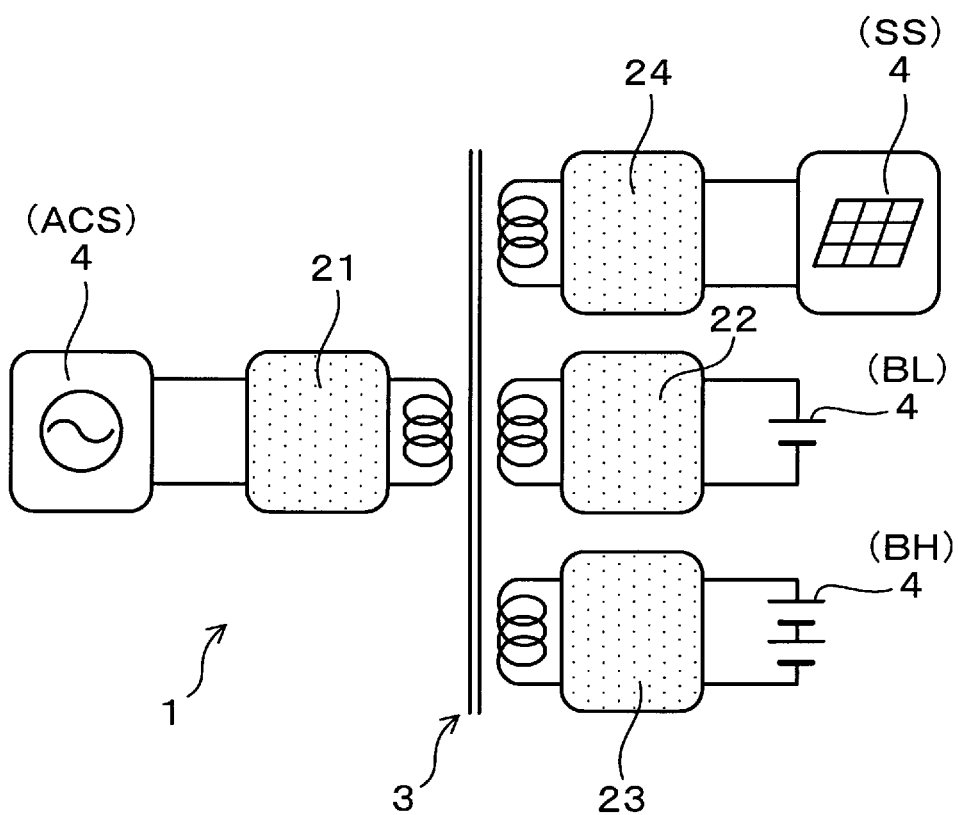
FIG. 30 is a circuit configuration of a power conversion apparatus according to a twenty-second embodiment.

As shown in FIG. 30, a power conversion apparatus 1 according to the twenty-second embodiment is connected to four voltage units 4 including an AC power source ACS, a solar power source SS, a storage battery BL and a high voltage battery BH. According to the present embodiment, at least one of the high voltage battery BH or the storage battery BL can be charged from the solar power source SS, while charging the high voltage battery VH from the AC power source ACS. Also, the storage battery BL can be charged from at least one of the AC power source ACS, the solar power source SS and the high voltage battery BH. The twenty-second embodiment has similar configuration and advantages to those in the ninth embodiment.

Twenty-Third Embodiment

Figure 31:
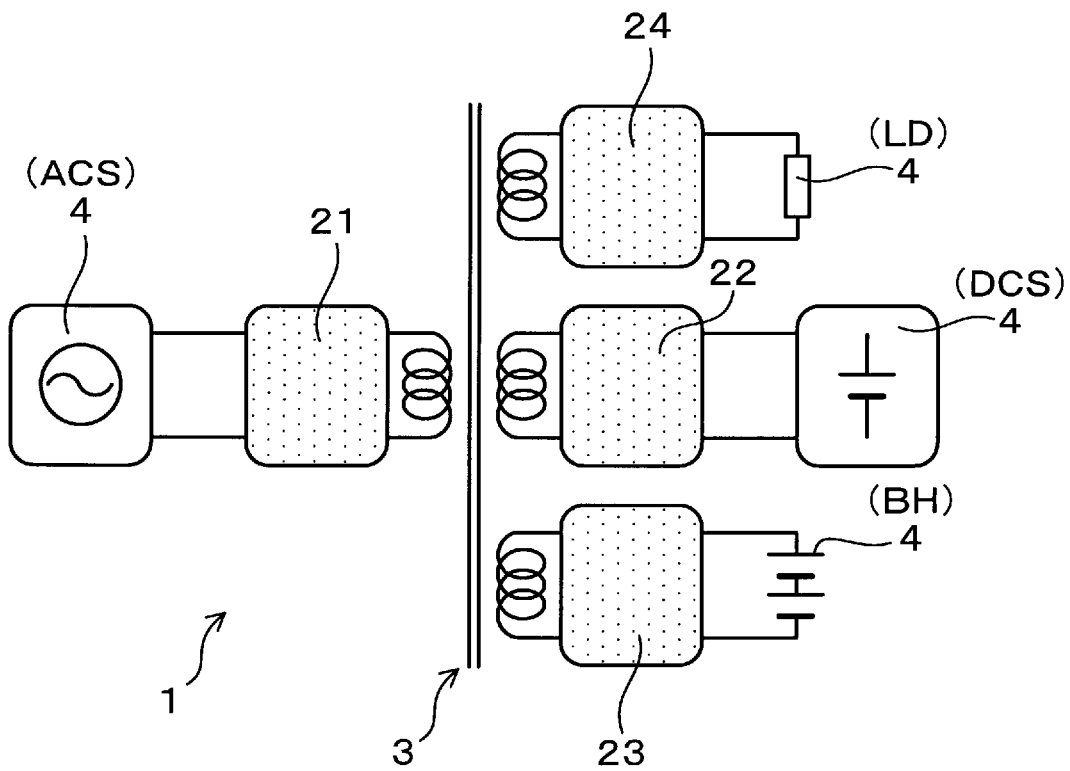
FIG. 31 is a circuit configuration of a power conversion apparatus according to a twenty-third embodiment.

As shown in FIG. 31, a power conversion apparatus 1 according to the twenty-third embodiment is connected to four voltage units 4 including an AC power source ACS, a load LD, a DC power source DCS and a high voltage battery BH. According to the present embodiment, both of the AC power source ACS and the DC power source DCS are able to charge the high voltage battery BH and supply power to the load LD. The twenty-third embodiment has similar configuration and advantages to those in the ninth embodiment.

Twenty-Fourth Embodiment

Figure 32:
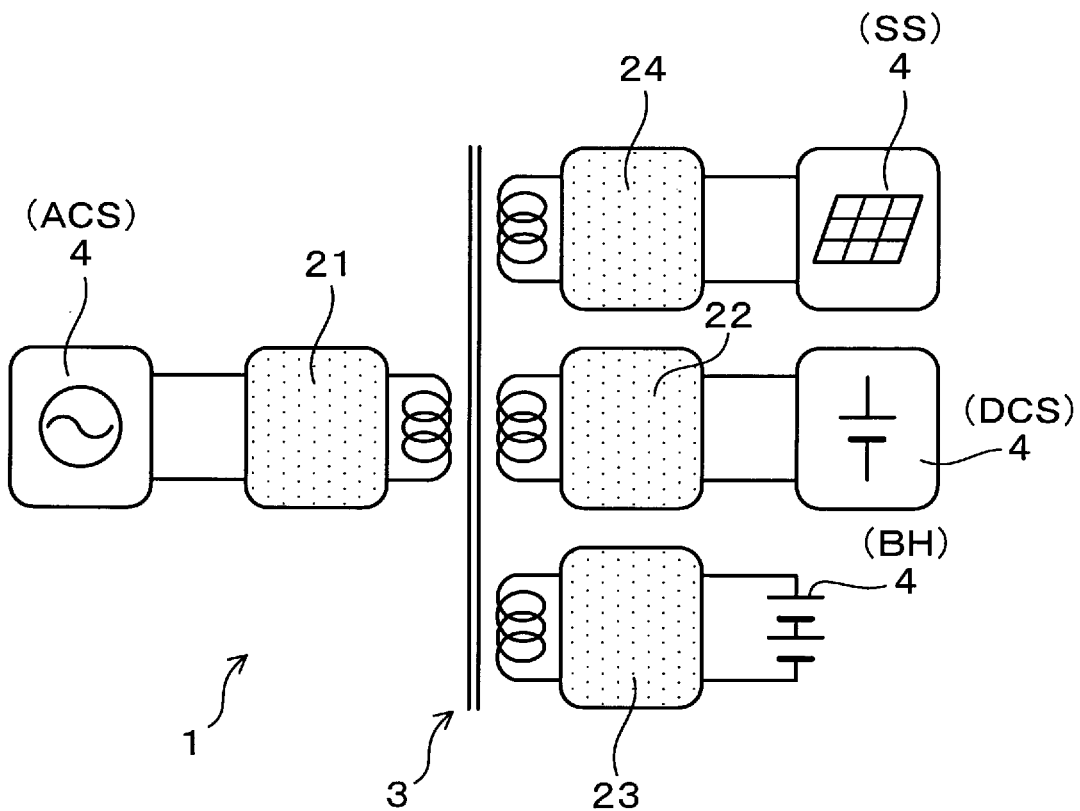
FIG. 32 is a circuit configuration of a power conversion apparatus according to a twenty-fourth embodiment.

As shown in FIG. 32, a power conversion apparatus 1 according to the twenty-fourth embodiment is connected to four voltage units 4 including an AC power source ACS, a solar power source SS, a DC power source DCS and a high voltage battery BH. According to the present embodiment, the high voltage battery BH can be charged by the AC power source ACS, the DC power source DCS and the solar power source SS. The twenty-fourth embodiment has similar configuration and advantages to those in the ninth embodiment.

Twenty-Fifth Embodiment

Figure 33:
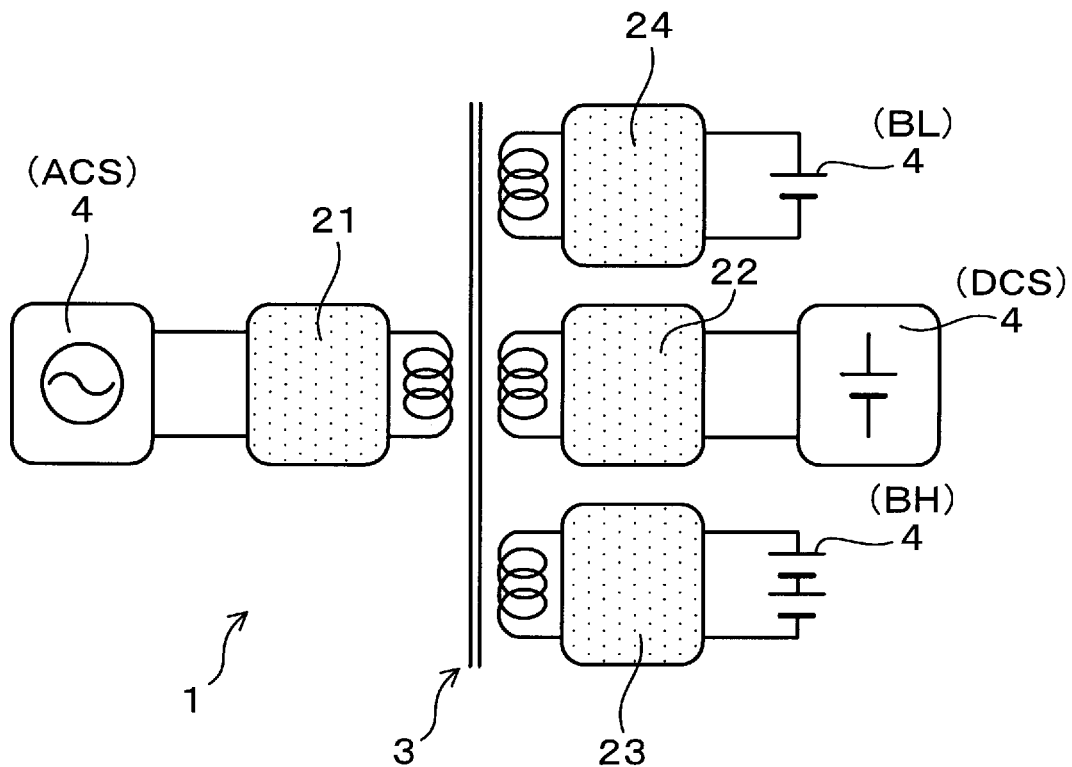
FIG. 33 is a circuit configuration of a power conversion apparatus according to a twenty-fifth embodiment.

As shown in FIG. 33, a power conversion apparatus 1 according to the twenty-fifth embodiment is connected to four voltage units 4 including an AC power source ACS, a storage battery BL, a DC power source DCS and a high voltage battery BH. According to the present embodiment, the storage battery BL can be a storage battery using a voltage system other than 12V system. According to the present embodiment, both of the AC power source ACS and the DC power source DCS are able to charge the high voltage battery BH and the storage battery BL. Also, the AC power source ACS, the DC power source DCS and the storage battery BL are able to charge the high voltage battery BH. The twenty-fifth embodiment has similar configuration and advantages to those in the ninth embodiment.

Twenty-Sixth Embodiment

Figure 34:
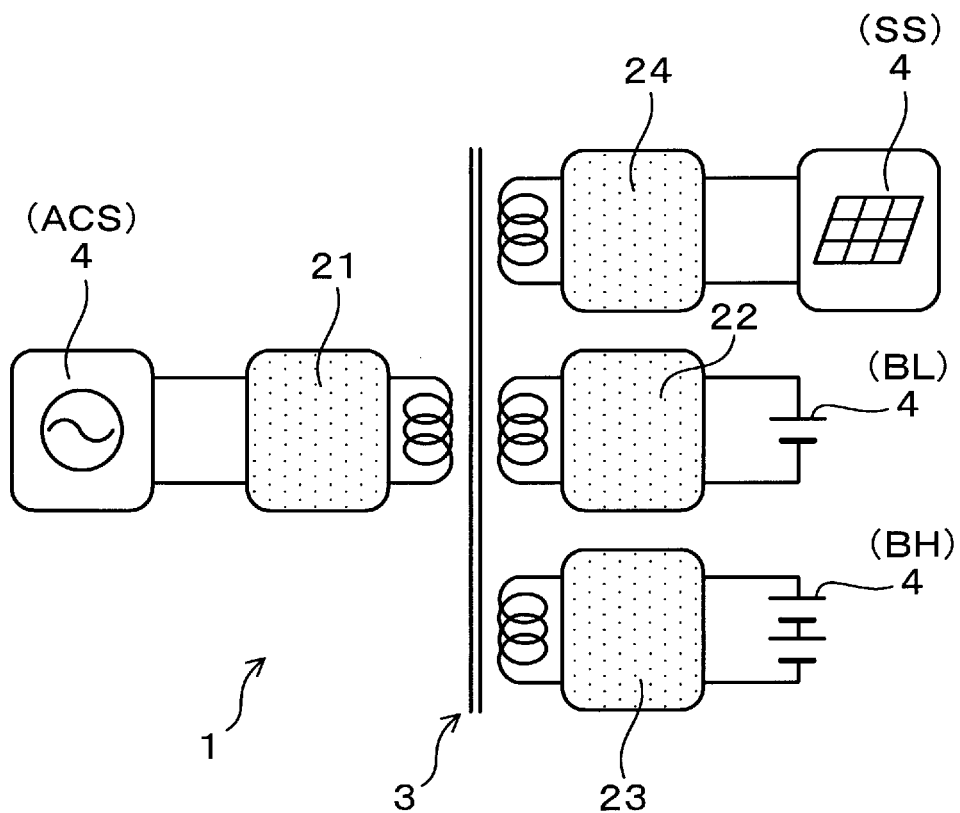
FIG. 34 is a circuit configuration of a power conversion apparatus according to a twenty-sixth embodiment.

As shown in FIG. 34, a power conversion apparatus 1 according to the twenty-sixth embodiment is connected to four voltage units 4 including an AC power source ACS, a solar power source SS, a storage battery BL, and a high voltage battery BH. According to the present embodiment, the high voltage battery BH can be charged from the solar power source SS, while charging the high voltage battery BH from the AC power source ACS. Further, at least one of the AC power source ACS, the solar power source SS and the high voltage battery BH are able to charge the storage battery BL. The twenty-sixth embodiment has similar configuration and advantages to those in the ninth embodiment.

Twenty-Seventh Embodiment

Figure 35:
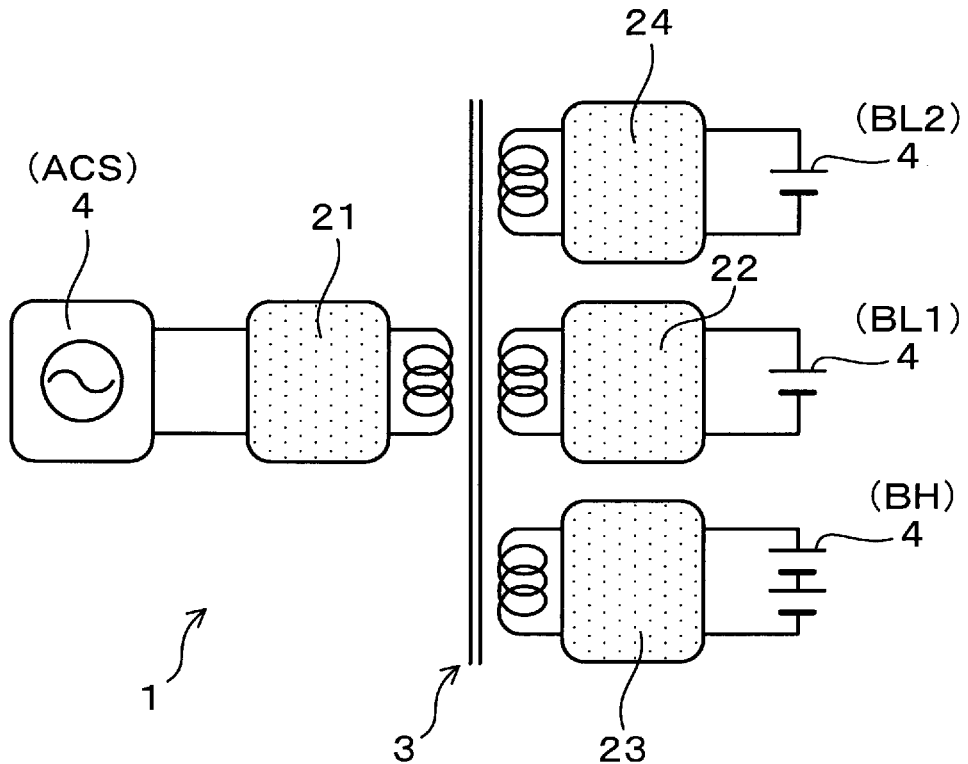
FIG. 35 is a circuit configuration of a power conversion apparatus according to a twenty-seventh embodiment.

As shown in FIG. 35, a power conversion apparatus 1 according to the twenty-seventh embodiment is connected to four voltage units 4 including an AC power source ACS, a storage batteries BL1 and BL2, and a high voltage battery BH. According to the present embodiment, at least one of two storage batteries BL1 and BL2 are able to supply power to the high voltage battery BH, while charging the high voltage battery BH from the AC power source ACS. Thus, the high voltage battery BH can be charged in a short period of time. Further, instead of the charging from the AC power source ACS to the high voltage battery BH, a charging may be performed from at least one of the two storage batteries BL1 and BL2 to the high voltage battery BH. In other words, redundant power source units can be configured. Further, in addition to the charging of the high voltage battery BH from the AC power source ACS, at least one of the storage batteries BL1 and BL2 can be charged. The twenty-seventh embodiment has similar configuration and advantages to those in the ninth embodiment.

Twenty-Eighth Embodiment

Figure 36:
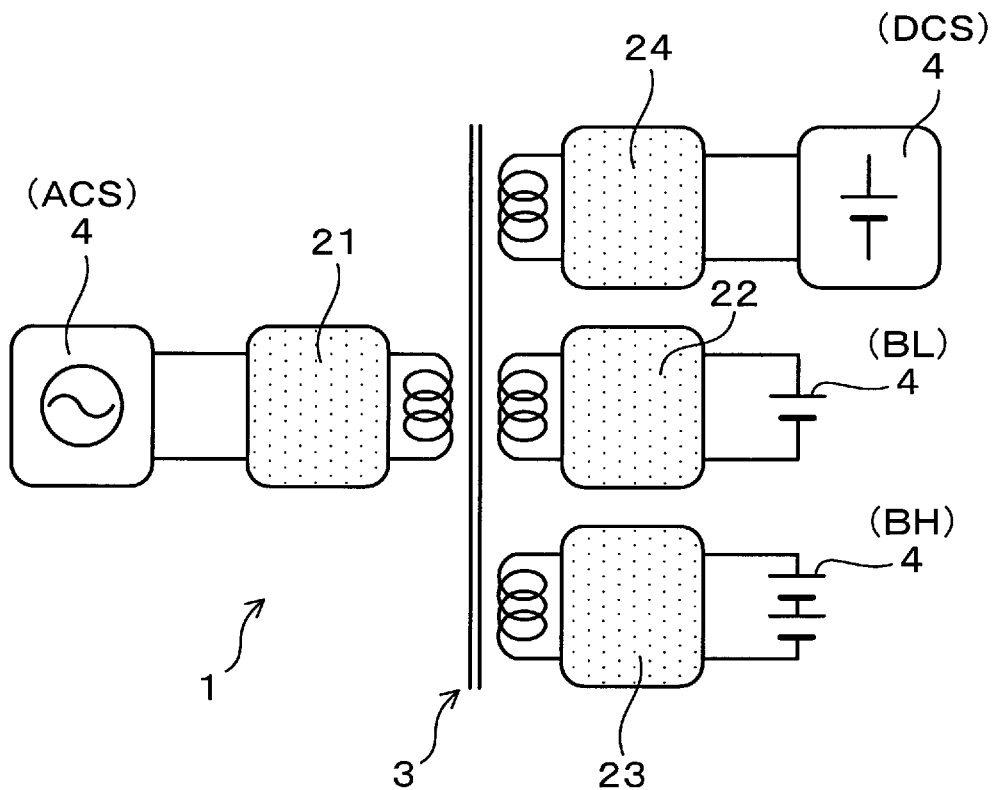
FIG. 36 is a circuit configuration of a power conversion apparatus according to a twenty-eighth embodiment.

As shown in FIG. 36, a power conversion apparatus 1 according to the twenty-eighth embodiment is connected to four voltage units 4 including an AC power source ACS, a storage battery BL, a DC power source DCS and a high voltage battery BH. According to the present embodiment, the storage battery BL can be a storage battery for 12V system. According to the present embodiment, the high voltage battery BH and the storage battery BL can be charged from both of the AC power source ACS and the DC power source DCS. Further, the high voltage battery BH can be charged from the AC power source ACS, the DC power source DCS and the storage battery BL. The twenty-eighth embodiment has similar configuration and advantages to those in the ninth embodiment.

Twenty-Ninth Embodiment

Figure 37:
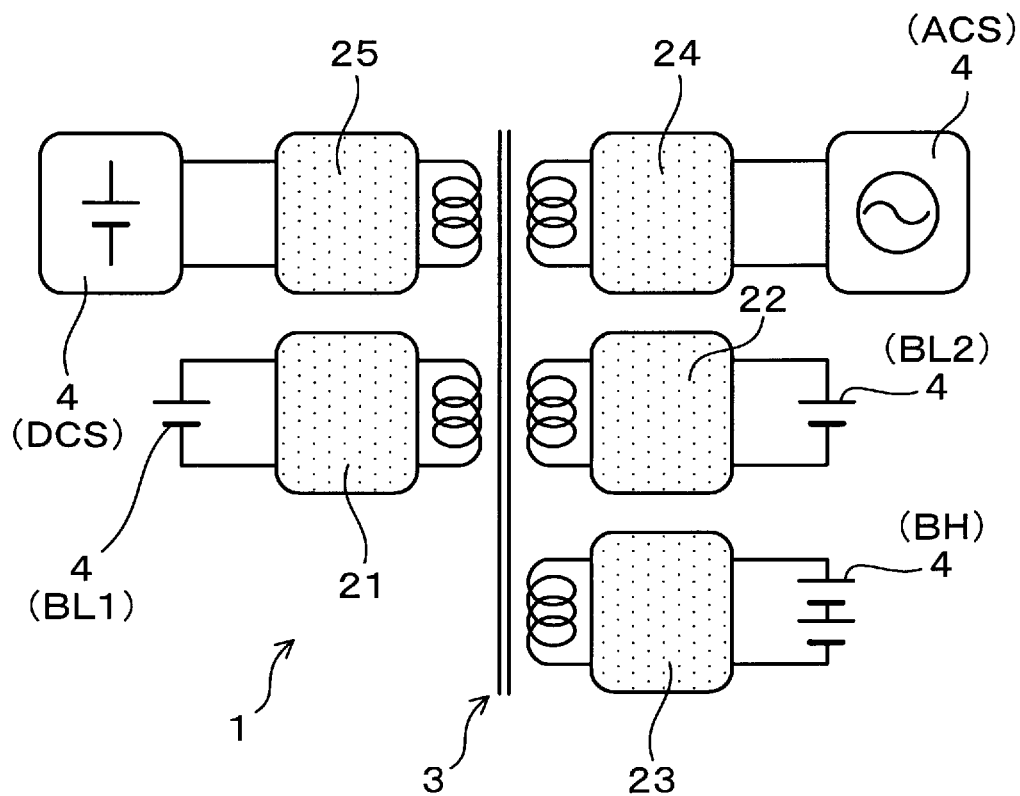
FIG. 37 is a circuit configuration of a power conversion apparatus according to a twenty-ninth embodiment.

As shown in FIG. 37, a power conversion apparatus 1 according to the twenty-ninth embodiment is connected to five voltage units 4. The power conversion unit 1 includes five power conversion circuits (i.e. switching circuits 21, 22, 23, 24 and 25) connected to respective five voltage units, and a multiport transformer 3 connected to the five switching circuits 21, 22, 23, 24 and 25 at mutually different ports. According to the present embodiment, the multiport transformer 3 has five magnetically coupled coils.

According to the present embodiment, as the five voltage units 4, a DC power source DCS, an AC power source ACS, a load LD, two storage batteries BL1 and BL2, a high voltage battery BH are connected to the power conversion apparatus 1.

According to the power conversion apparatus 1 of the present embodiment, power can be exchanged between five voltage units 4 via a single multiport transformer. Hence, power conversion can be accomplished between a plurality of voltage units 4 via a single multiport transformer 3 with a number of combinations.

Specifically, in the case where five voltage units 4 are present, as a combination of a pair of two units, 10 combinations are possible. Hence, power conversion between the voltage units 4 can be performed with 10 combinations of units via the single multiport transformer 3. Therefore, power can be exchanged between the voltage units 4 having significantly large number of combinations, while suppressing an increase in the number of components and expansion of the size thereof.

In the power conversion apparatus 1 according to the present embodiment, the high voltage battery BH can be charged from the AC power source ACS, the DC power source DCS and two storage batteries BL1 and BL2. As a power for the charging control, for example, either one storage battery, e.g. storage battery BL1 (e.g. 12V system) can be used. The twenty-ninth embodiment has similar configuration and advantages to those in the ninth embodiment.

Thirtieth Embodiment

Figure 38:
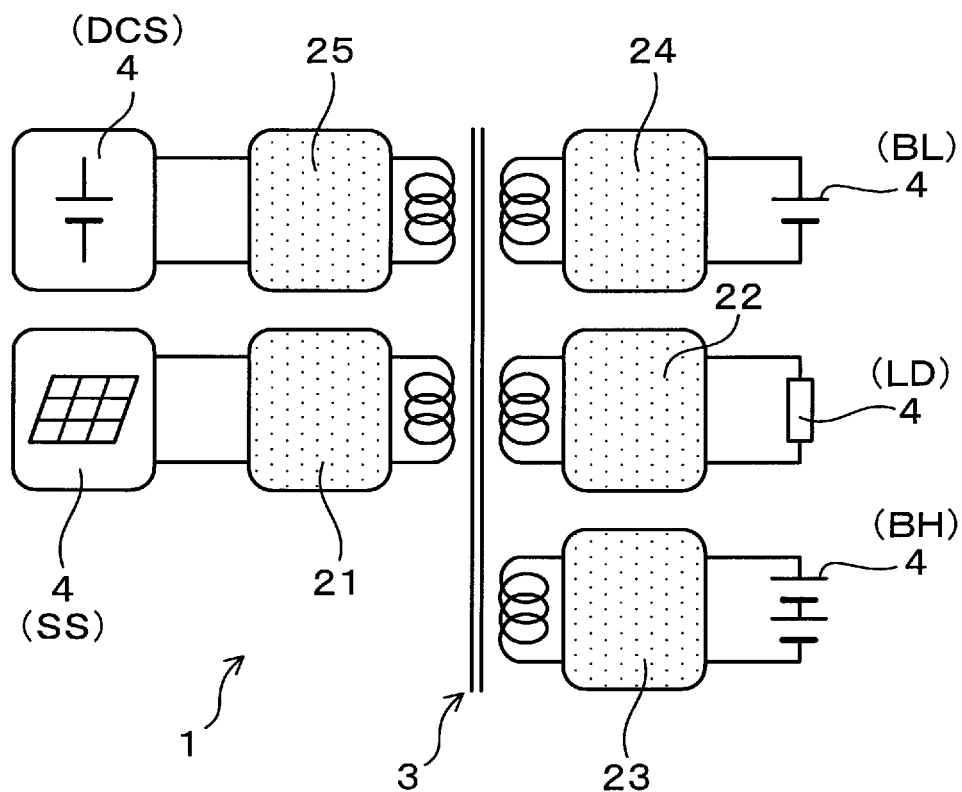
FIG. 38 is a circuit configuration of a power conversion apparatus according to a thirtieth embodiment.

As shown in FIG. 38, a power conversion apparatus 1 according to the thirtieth embodiment is connected to five voltage units 4 including a DC power source DCS, a solar power source SS, a storage battery BL, a load LD and a high voltage battery BH. According to the present embodiment, the load LD can be charged from the solar power source SS and the storage battery BL, while charging the high voltage battery BH from the DC power source DCS. Thus, in the case where the load LD is a heater for example, the heater can be heated quickly. Further, the power of the solar power source SS and the storage battery BL are able to assist the charging of the high voltage battery BH from the DC power source DCS. The thirtieth embodiment has similar configuration and advantages to those in the twenty-ninth embodiment.

Thirty-First Embodiment

Figure 39:
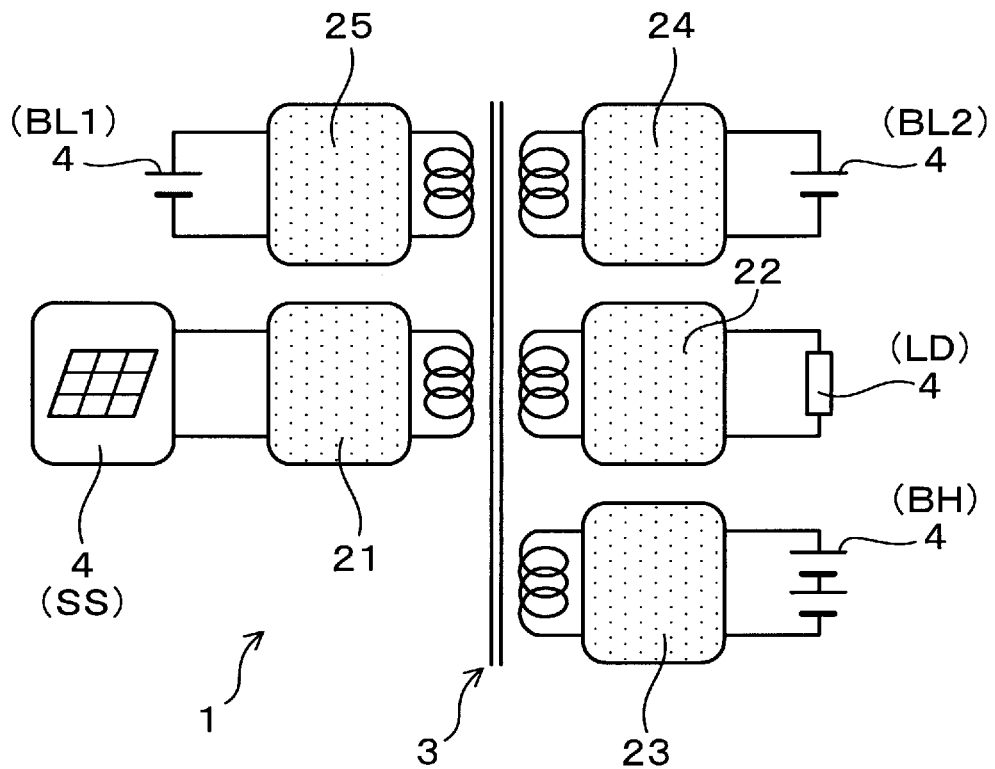
FIG. 39 is a circuit configuration of a power conversion apparatus according to a thirty-first embodiment.

As shown in FIG. 39, a power conversion apparatus 1 according to the thirty-first embodiment is connected to five voltage units 4 including two storage batteries BL1 and BL2, a solar power source SS, a load LD and a high voltage battery BH. According to the present embodiment, the solar power source SS is able to charge the two storage batteries BL1 and BL2, and the high voltage battery BH. Moreover, the solar power source SS is able to supply power to the load LD. Furthermore, the storage batteries BL1 and BL2 are able to supply power to the load LD.

Thirty-Second Embodiment

Figure 40:
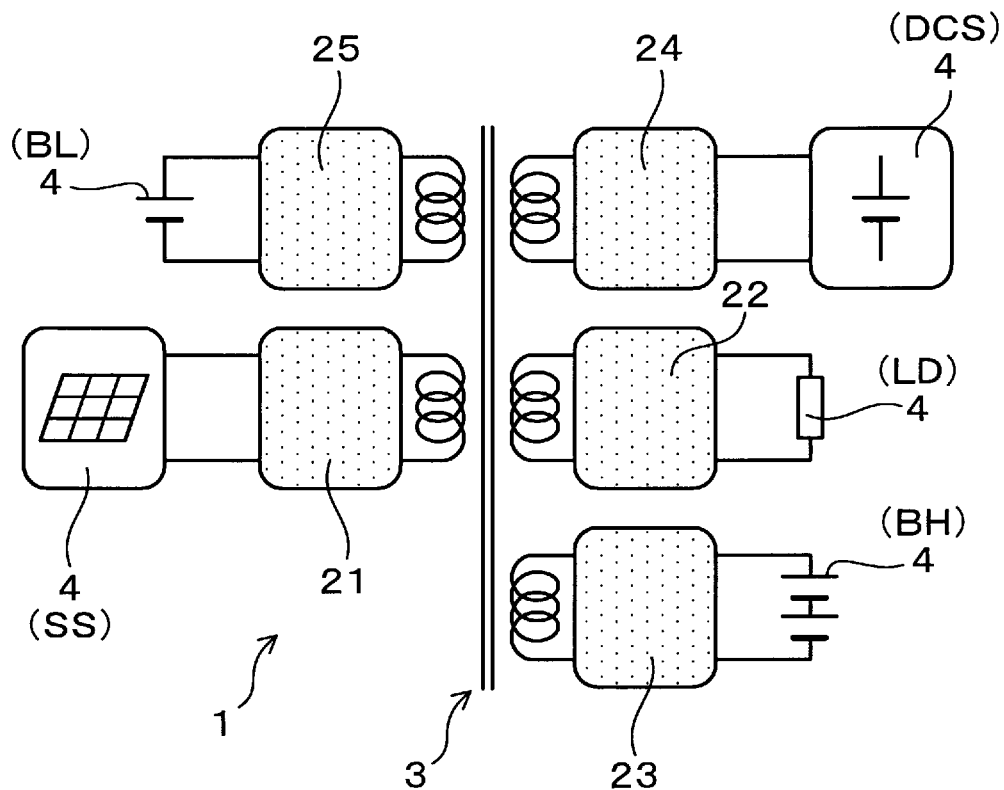
FIG. 40 is a circuit configuration of a power conversion apparatus according to a thirty second embodiment.

As shown in FIG. 40, a power conversion apparatus 1 according to the thirty-second embodiment is connected to five voltage units 4 including a storage battery BL, a solar power source SS, a DC power source DCS, a load LD and a high voltage battery BH. According to the present embodiment, the load LD can be supplied with power from the solar power source SS, while charging the high voltage battery BH from the DC power source DCS. Thus, in the case where the load LD is a heater, the heating time of the heater can be shortened. Further, the storage battery BL can be charged from the DC power source DCS and the solar power source SS. The thirty-second embodiment has similar configuration and advantages to those in the twenty-ninth embodiment.

Thirty-Third Embodiment

Figure 41:
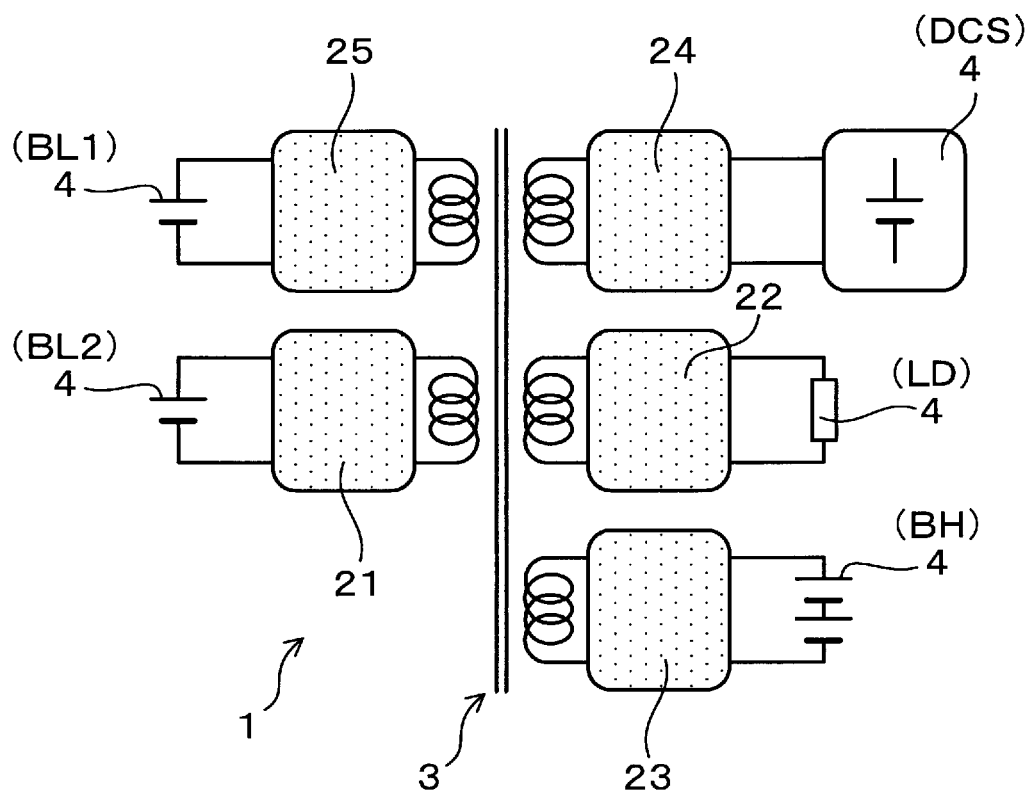
FIG. 41 is a circuit configuration of a power conversion apparatus according to a thirty-third embodiment.

As shown in FIG. 41, a power conversion apparatus 1 according to the thirty-third embodiment is connected to five voltage units 4 including two storage batteries BL1 and BL2, a DC power source DCS, a load LD, and a high voltage battery BH. According to the present embodiment, the load LD can be supplied with power from the storage batteries BL1 and BL2, while charging the high voltage battery BH from the DC power source DCS. Further, the load LD can be supplied with power from the DC power source DCS. The thirty-third embodiment has similar configuration and advantages to those in the twenty-ninth embodiment.

Thirty-Fourth Embodiment

Figure 42:
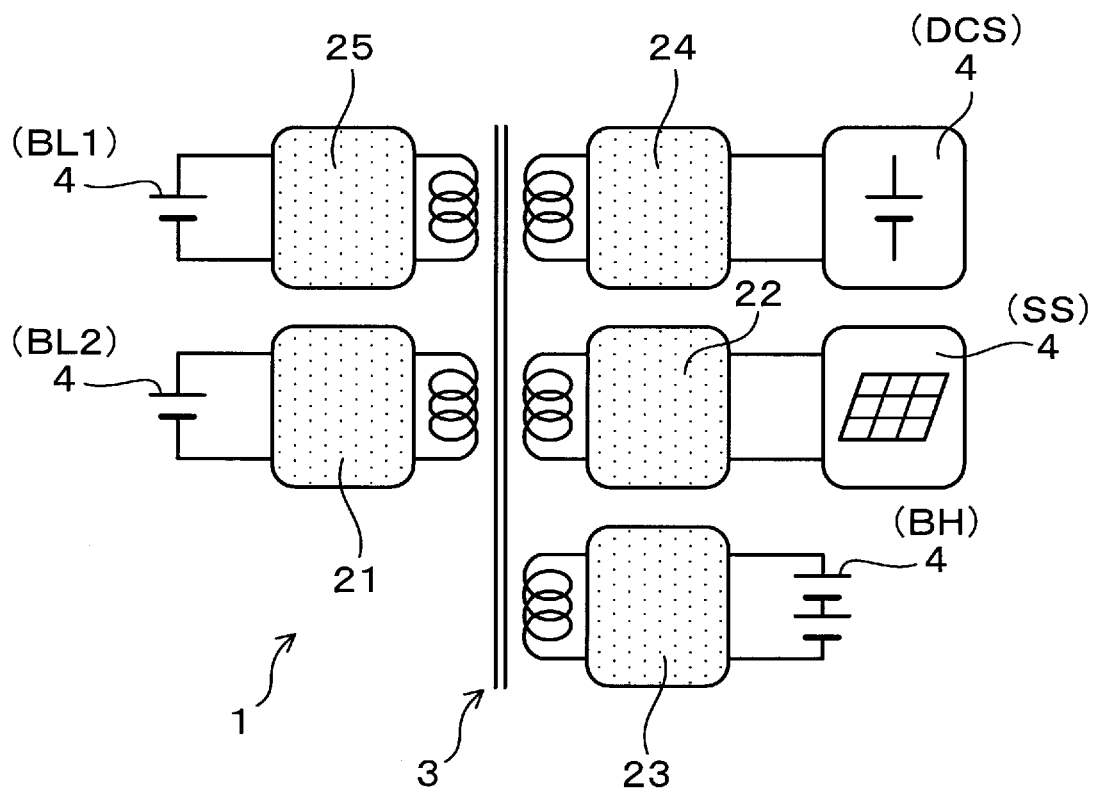
FIG. 42 is a circuit configuration of a power conversion apparatus according to a thirty-fourth embodiment.

As shown in FIG. 42, a power conversion apparatus 1 according to the thirty-fourth embodiment is connected to five voltage units 4 including two storage batteries BL1 and BL2, a DC power source DCS, a solar power source SS, and a high voltage battery BH. According to the present embodiment, the high voltage battery BH can be charged from the solar power source SS, while charging the high voltage battery BH from the DC power source DCS. At this moment, further, the storage batteries BL1 and BL2 are able to charge the high voltage battery BH. Instead of the charging from the DC power source DCS and the solar power source SS, a charging may be performed from at least one of the two storage batteries BL1 and BL2 to the high voltage battery BH. In other words, redundant power source units can be configured. The thirty-fourth embodiment has similar configuration and advantages to those in the twenty-ninth embodiment.

Thirty-Fifth Embodiment

Figure 43:
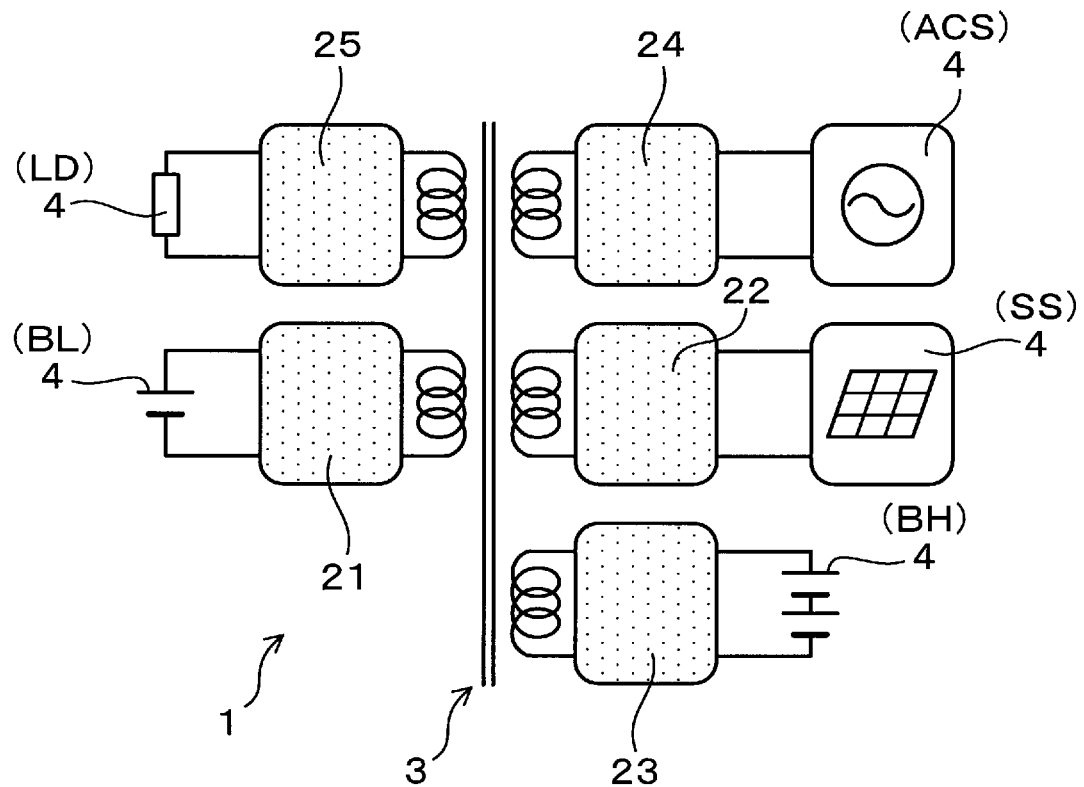
FIG. 43 is a circuit configuration of a power conversion apparatus according to a thirty-fifth embodiment.

As shown in FIG. 43, a power conversion apparatus 1 according to the thirty-fifth embodiment is connected to five voltage units 4 including a load LD, a storage battery BL, an AC power source ACS, a solar power source SS and a high voltage battery BH. According to the present embodiment, the load LD can be supplied with power from the solar power source SS, while charging the high voltage battery BH from the AC power source ACS. Thus, in the case where the load LD is a heater, the heating time of the heater can be shortened. Further, the storage battery BL can be charged from the AC power source ACS and the solar power source SS. Also, the high voltage battery BH can be charged by the power of the storage battery BL. The thirty-fifth embodiment has similar configuration and advantages to those in the twenty-ninth embodiment.

Thirty-Sixth Embodiment

Figure 44:
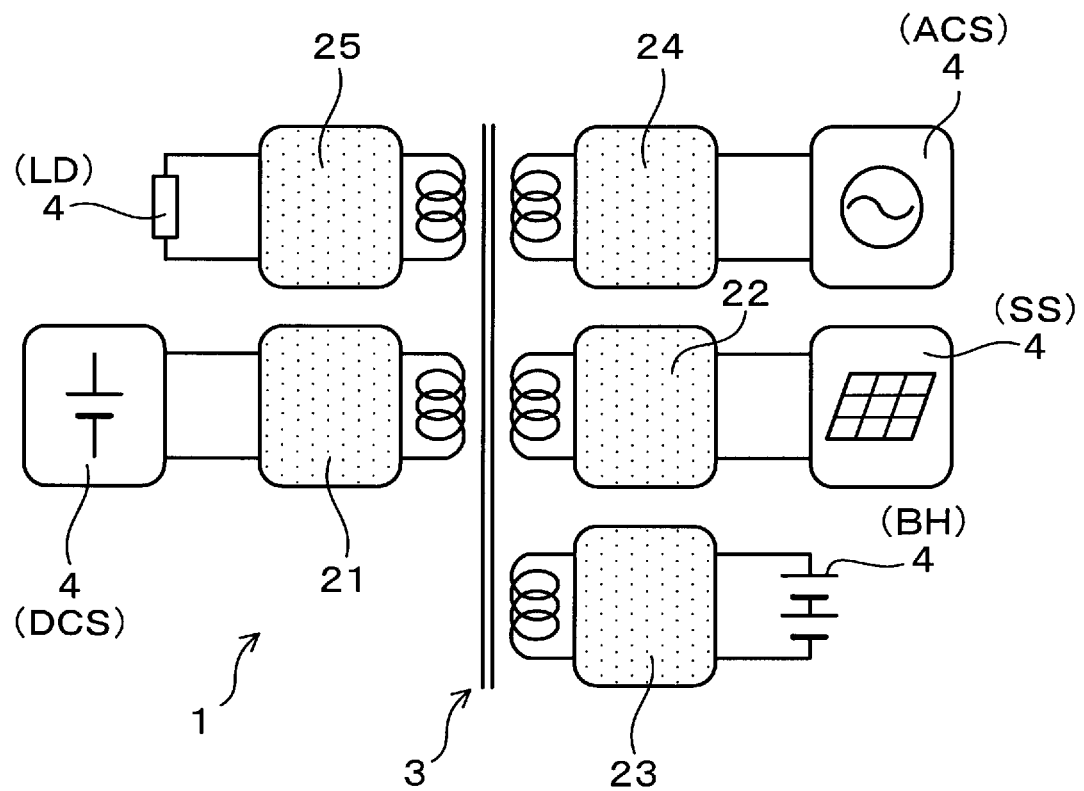
FIG. 44 is a circuit configuration of a power conversion apparatus according to a thirty-sixth embodiment.

As shown in FIG. 44, a power conversion apparatus 1 according to the thirty-sixth embodiment is connected to five voltage units 4 including a load LD, a DC power source DCS, an AC power source ACS, a solar power source SS and a high voltage battery BH. According to the present embodiment, the high voltage battery BH can be charged from the DC power source DCS and the solar power source SS, while charging the high voltage battery BH from the AC power source ACS. Alternatively, the load LD can be supplied with power from the solar power source SS, while charging the high voltage battery BH from the AC power source ACS or the like. The thirty-sixth embodiment has similar configuration and advantages to those in the twenty-ninth embodiment.

Thirty-Seventh Embodiment

Figure 45:
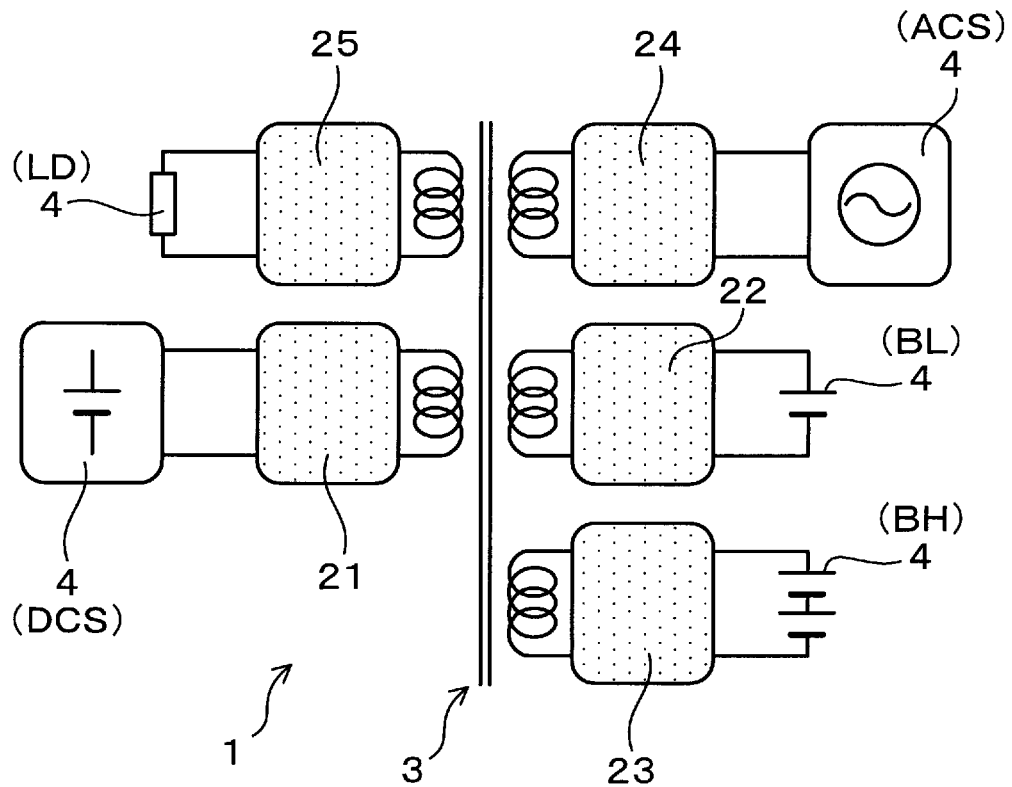
FIG. 45 is a circuit configuration of a power conversion apparatus according to a thirty-seventh embodiment.

As shown in FIG. 45, a power conversion apparatus 1 according to the thirty-seventh embodiment is connected to five voltage units 4 including a load LD, a DC power source DCS, an AC power source ACS, a storage battery BL and a high voltage battery BH. According to the present embodiment, the storage battery BL can be a storage battery using a voltage system other than 12V system. Also, according to the present embodiment, the AC power source ACS and the DC power source DCS are able to charge the high voltage battery BH. In this case, the load LD can be supplied with power from the storage battery BL. Further, the power from at least one of the AC power source ACS and the DC power source DCS can be supplied to the load LD. The thirty-seventh embodiment has similar configuration and advantages to those in the ninth embodiment.

Thirty-Eighth Embodiment

Figure 46:
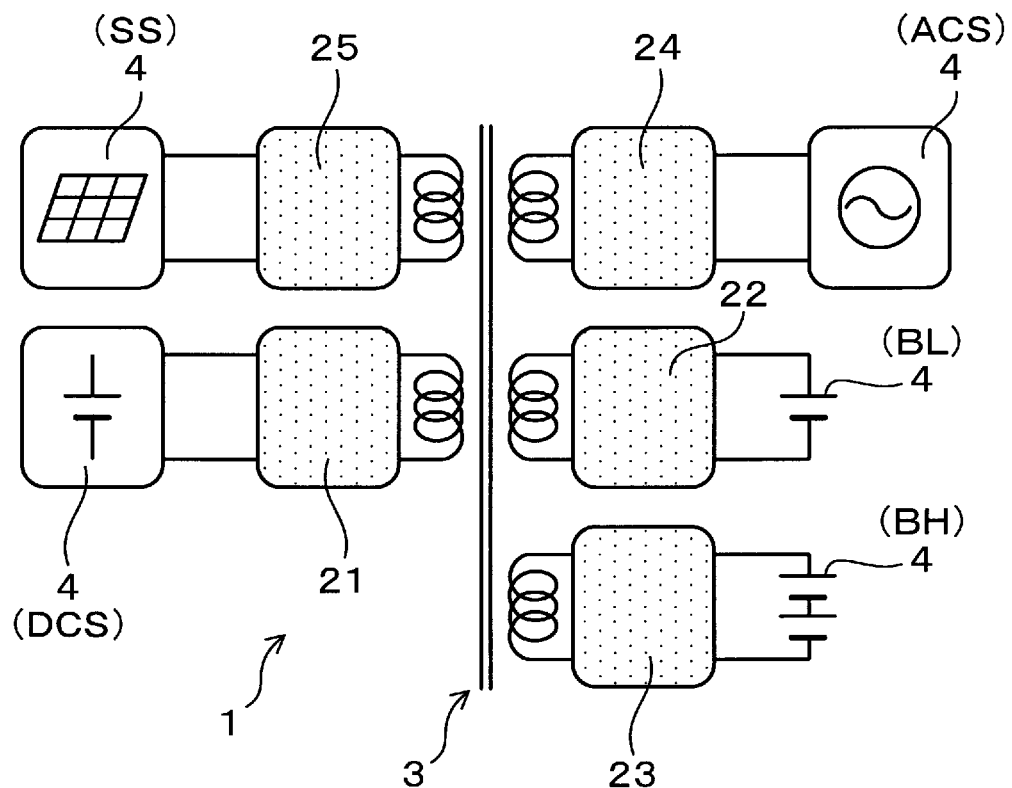
FIG. 46 is a circuit configuration of a power conversion apparatus according to a thirty-eighth embodiment.

As shown in FIG. 46, a power conversion apparatus 1 according to the thirty-eighth embodiment is connected to five voltage units 4 including a load LD, a DC power source DCS, an AC power source ACS, a storage battery BL and a high voltage battery BH. According to the present embodiment, the high voltage battery BH can be charged from the AC power source ACS, the DC power source DCS and the solar power source SS. Further, at least one of the AC power source ACS, the DC power source DCS and the solar power source SS is able to charge the storage battery BL. The thirty-eighth embodiment has similar configuration and advantages to those in the ninth embodiment.

Thirty-Ninth Embodiment

Figure 47:
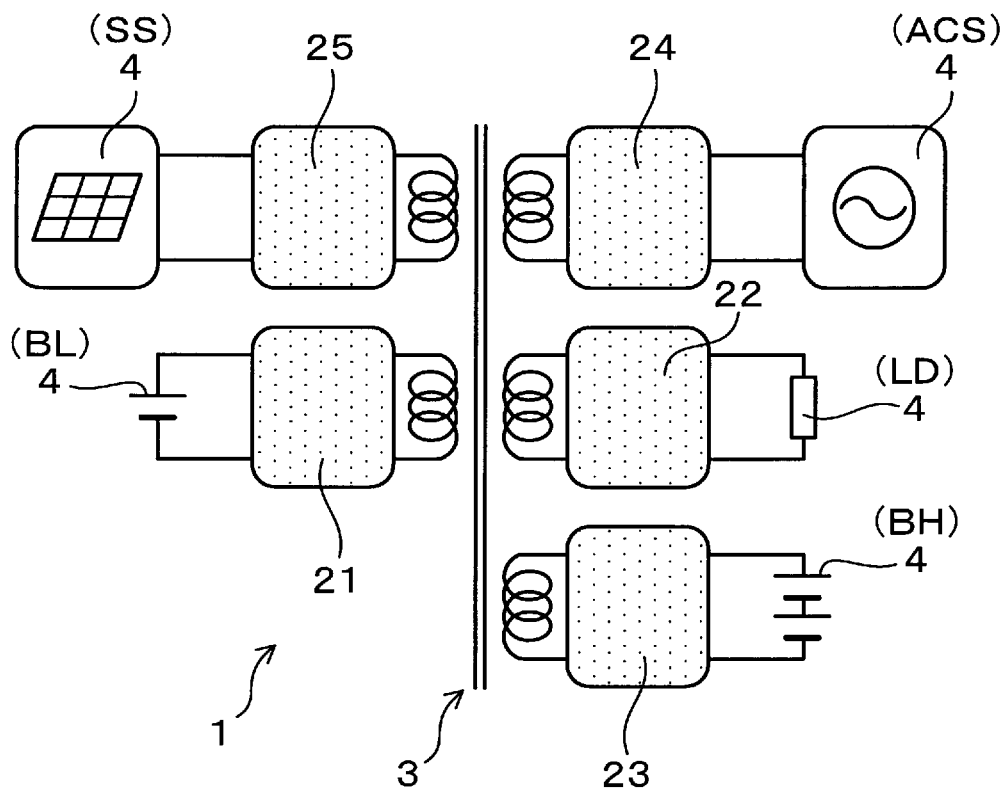
FIG. 47 is a circuit configuration of a power conversion apparatus according to a thirty-ninth embodiment.

As shown in FIG. 47, a power conversion apparatus 1 according to the thirty-ninth embodiment is connected to five voltage units 4 including a solar power source SS, a storage battery BL, an AC power source ACS, a load LD, and a high voltage battery BH. According to the present embodiment, the high voltage battery BH can be charged from the solar power source SS, while charging the high voltage battery BH from the AC power source ACS. Also, at least one of the AC power source ACS and the solar power source SS is able to supply power to the load LD. Further, at least one of the AC power source ACS and the solar power source SS is able to charge the storage battery BL. The thirty-ninth embodiment has similar configuration and advantages to those in the twenty-ninth embodiment.

Fortieth Embodiment

Figure 48:
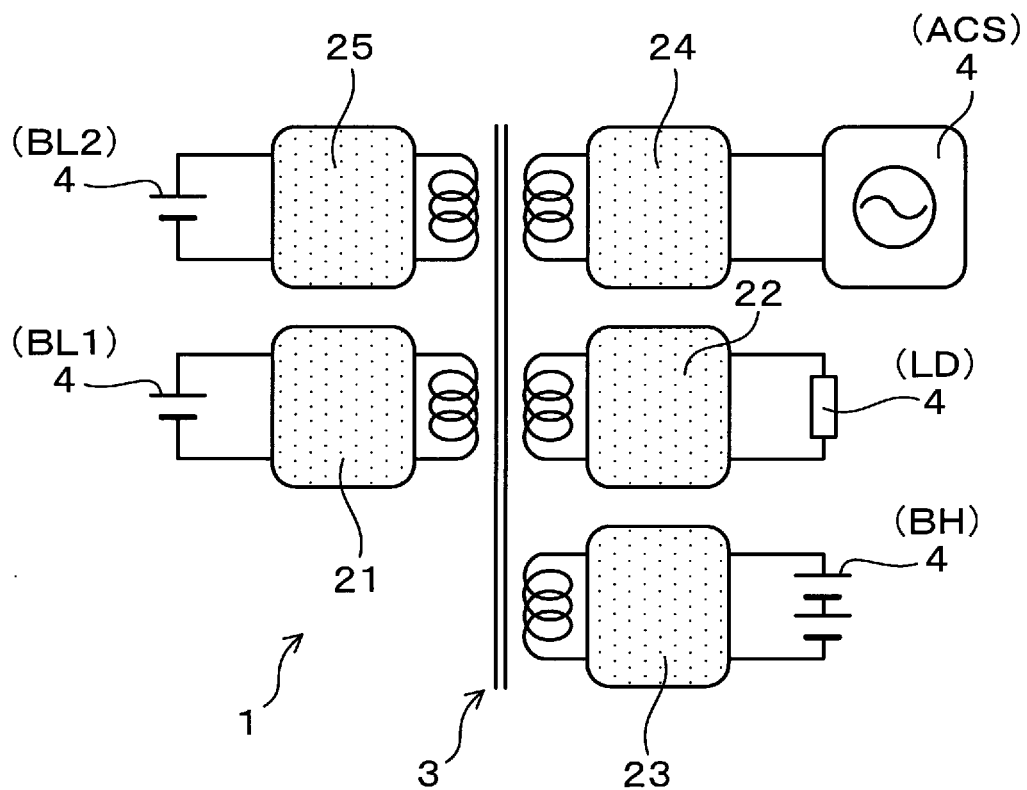
FIG. 48 is a circuit configuration of a power conversion apparatus according to a fortieth embodiment.

As shown in FIG. 48, a power conversion apparatus 1 according to the fortieth embodiment is connected to five voltage units 4 including two storage batteries BL1 and BL2, an AC power source ACS, a load LD, and a high voltage battery BH. According to the present embodiment, the load LD can be supplied with power from the storage batteries BL1 and BL2, while charging the high voltage battery BH from the AC power source ACS. Further, the power from the storage battery BL1 can be used as a control power for controlling the load LD. The thirty-seventh embodiment has similar configuration and advantages to those in the ninth embodiment.

Forty-First Embodiment

Figure 49:
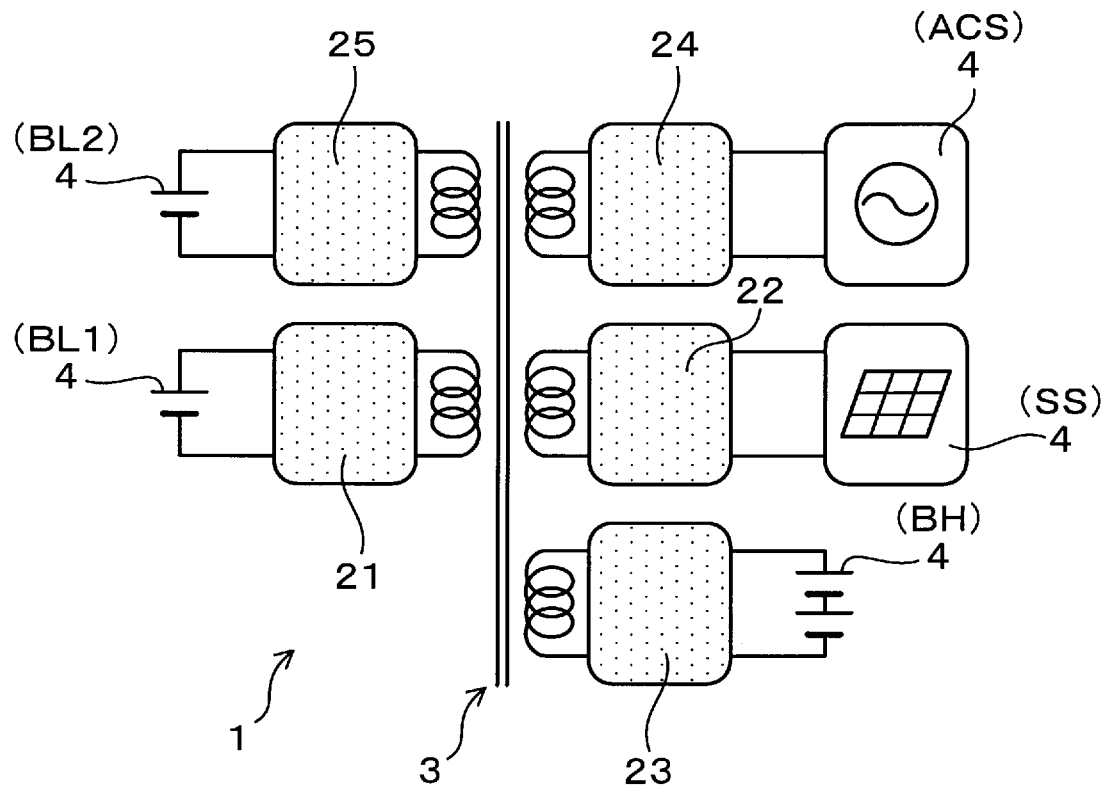
FIG. 49 is a circuit configuration of a power conversion apparatus according to a forty-first embodiment.

As shown in FIG. 49, a power conversion apparatus 1 according to the forty-first embodiment is connected to five voltage units 4 including two storage batteries BL1 and BL2, an AC power source ACS, a solar power source SS and a high voltage battery BH.

According to the present embodiment, the high voltage battery BH can be charged also from the solar power source SS, while charging the high voltage battery BH from the AC power source ACS. Also, at least one of the AC power source ACS and the solar power source SS is able to charge the storage batteries BL1 and BL2. Further, any one of the AC power source ACS, the solar power source SS, two storage batteries BL1 and BL2 may charge the high voltage battery BH. In other words, redundant power source units can be configured. The forty-first embodiment has similar configuration and advantages to those in the twenty-ninth embodiment.

Forty-Second Embodiment

Figure 50:
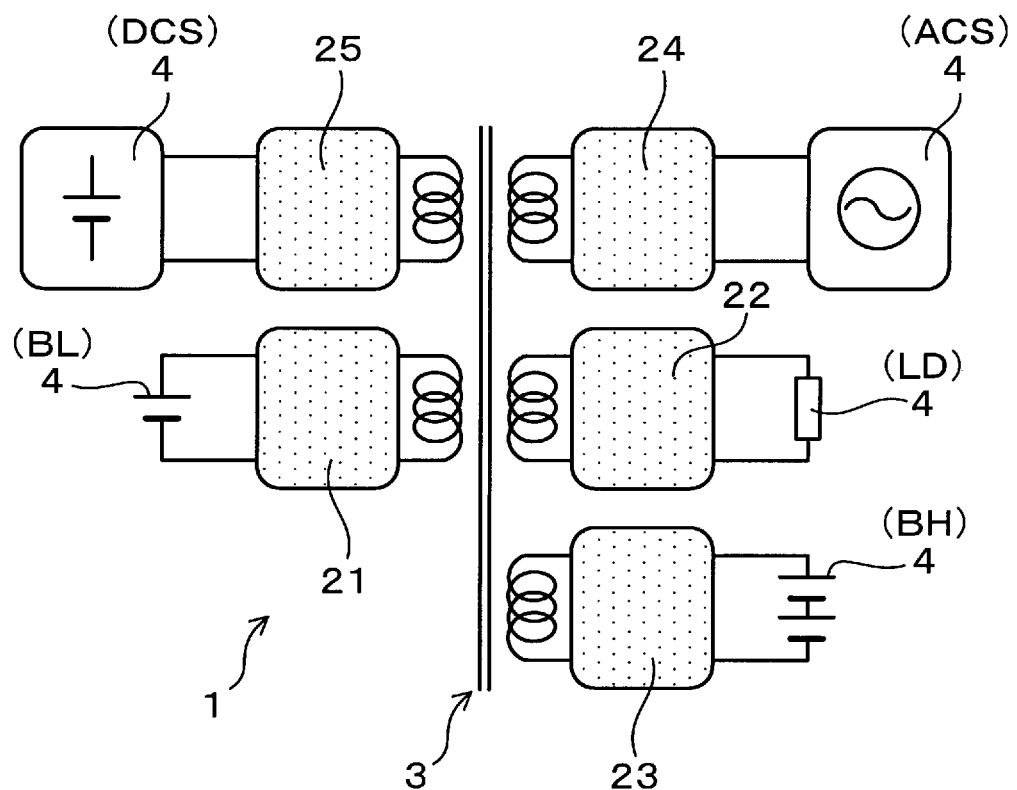
FIG. 50 is a circuit configuration of a power conversion apparatus according to a forty-second embodiment.

As shown in FIG. 50, a power conversion apparatus 1 according to the forty-second embodiment is connected to five voltage units 4 including a DC power source DCS, a storage battery BL, an AC power source ACS, a load LD and a high voltage battery BH. According to the present embodiment, the storage battery BL can be a storage battery for 12V system.

According to the present embodiment, the AC power source ACS and the DC power source DCS are able to charge the high voltage battery BH. In this case, the load LD can be supplied with power from at least one of the AC power source ACS and the DC power source DCS. Also, the power of the storage battery BL can be used as an output for controlling the operation of the load LD. The forty-second embodiment has similar configuration and advantages to those in the twenty-ninth embodiment.

Forty-Third Embodiment

Figure 51:
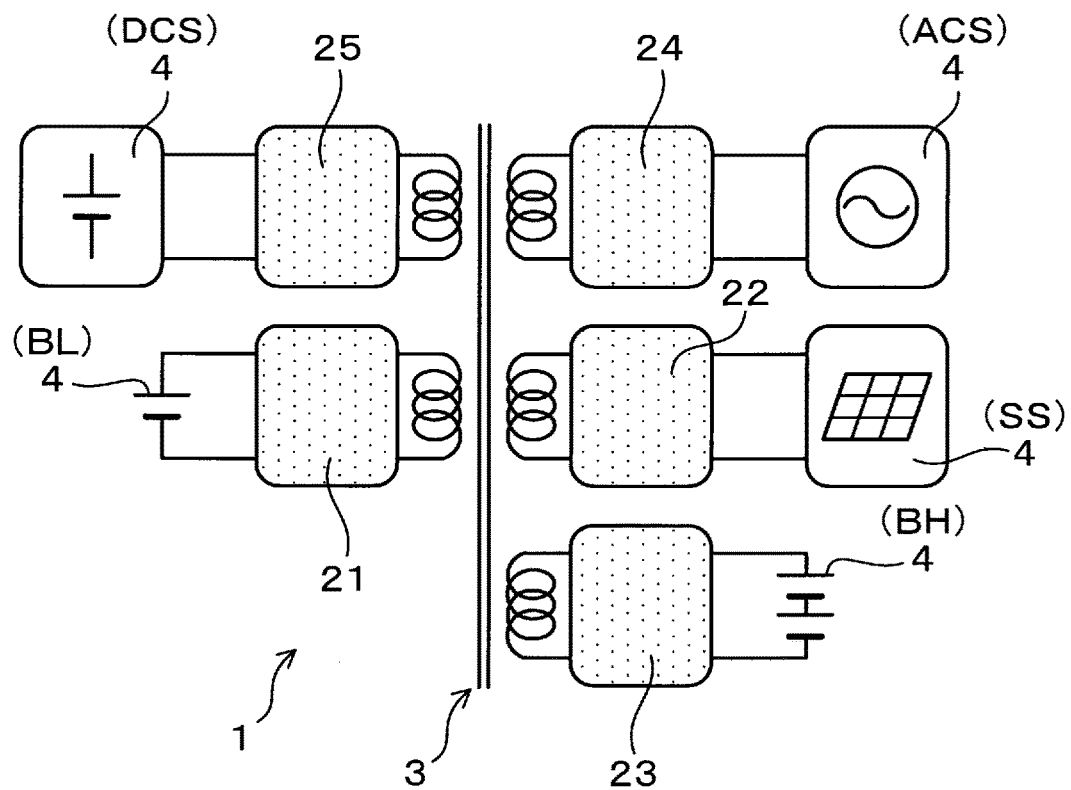
FIG. 51 is a circuit configuration of a power conversion apparatus according to a forty-third embodiment.

As shown in FIG. 51, a power conversion apparatus 1 according to the forty-third embodiment is connected to five voltage units 4 including a DC power source DCS, a storage battery BL, an AC power source ACS, a solar power source SS and a high voltage battery BH.

According to the present embodiment, the high voltage battery BH can be charged from the AC power source ACS, the DC power source DCS and the solar power source SS. In other words, at least one of three power sources are able to charge the high voltage battery BH. Also, at least one of three power sources are able to charge the storage battery BL. The power of the storage battery BL can be used as power for a charging control of the high voltage battery BH from the AC power source ACS. The forty-third embodiment has similar configuration and advantages to those in the twenty-ninth embodiment.

Forty-Fourth Embodiment

Figure 52:
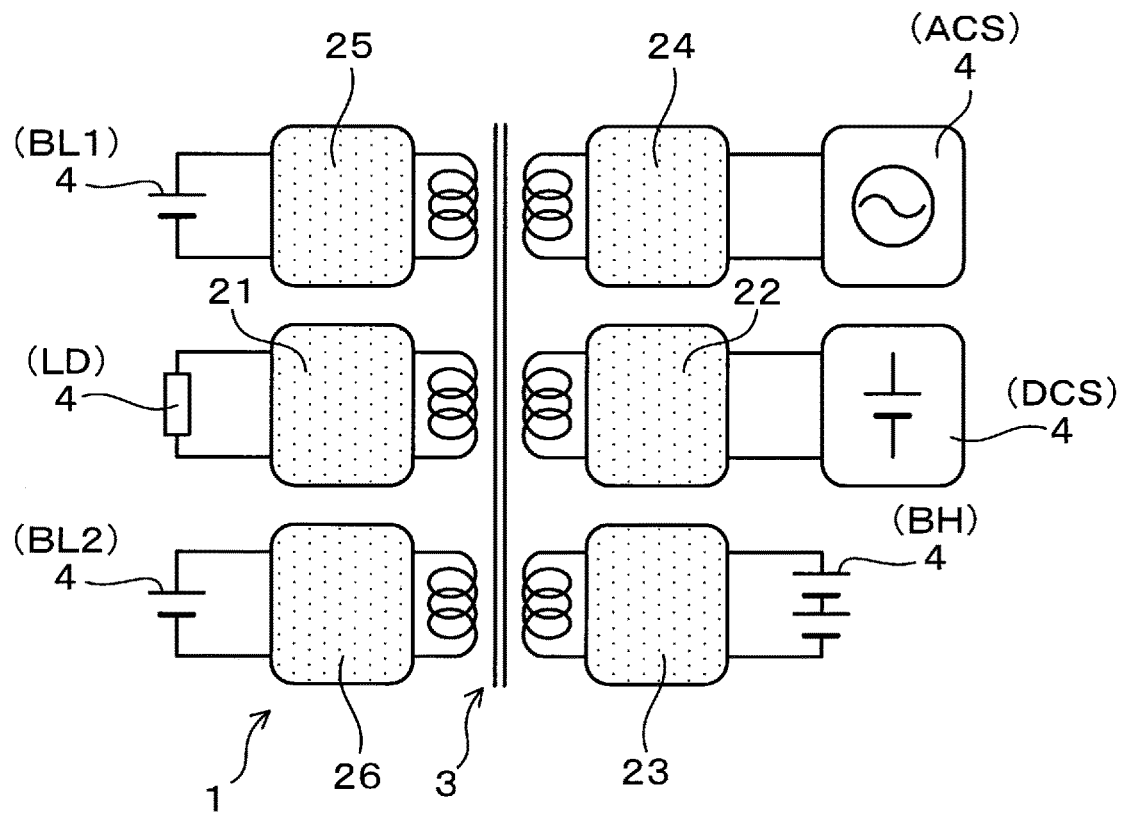
FIG. 52 is a circuit configuration of a power conversion apparatus according to a forty-fourth embodiment.

As shown in FIG. 52, a power conversion apparatus 1 according to the forty-fourth embodiment is connected to six voltage units 4. The power conversion apparatus 1 includes six power conversion circuits (i.e. switching circuits 21, 22, 23, 24, 25 and 26) which are connected to respective six voltage units 4, and a multiport transformer 3 connected to the six switching circuits 21, 22, 23, 24, 25 and 26 at mutually different ports thereof. According to the present embodiment, the multiport transformer 3 includes mutually and magnetically coupled six coils.

According to the present embodiment, as the six voltage units 4, two storage batteries BL1 and BL2, a load LD, an AC power source ACS, a DC power source DCS and a high voltage battery BH are connected to the power conversion apparatus 1.

In the power conversion apparatus 1 according to the present embodiment, a power conversion can be performed between six power conversion units 4 from each other via a single multiport transformer 3. Hence, power conversion can be accomplished between a plurality of voltage units 4 via the single multiport transformer 3 with a number of combinations.

Specifically, in the case where six voltage units 4 are present, as a combination of a pair of two units, 15 combinations are possible. Hence, power conversion between the voltage units 4 can be performed with 15 combinations of units via the single multiport transformer 3. Therefore, power can be exchanged between the voltage units 4 having significantly large number of combinations, while suppressing an increase in the number of components and expansion of the size thereof.

According to the present embodiment, the high voltage battery BH can be charged by the AC power source ACS, the DC power source DCS and the two storage batteries BL1 and BL2. Also, the load LD can be charged from the AC power source ACS, the DC power source DCS, and two storage batteries BL1 and BL2. Also, as the power for controlling the charging, or the power for controlling the operation of the load LD, one storage battery, for example, the storage battery BL1 (e.g. 12V system) can be used. The forty-fourth embodiment has similar configuration and advantages to those in the twenty-ninth embodiment.

Forty-Fifth Embodiment

Figure 53:
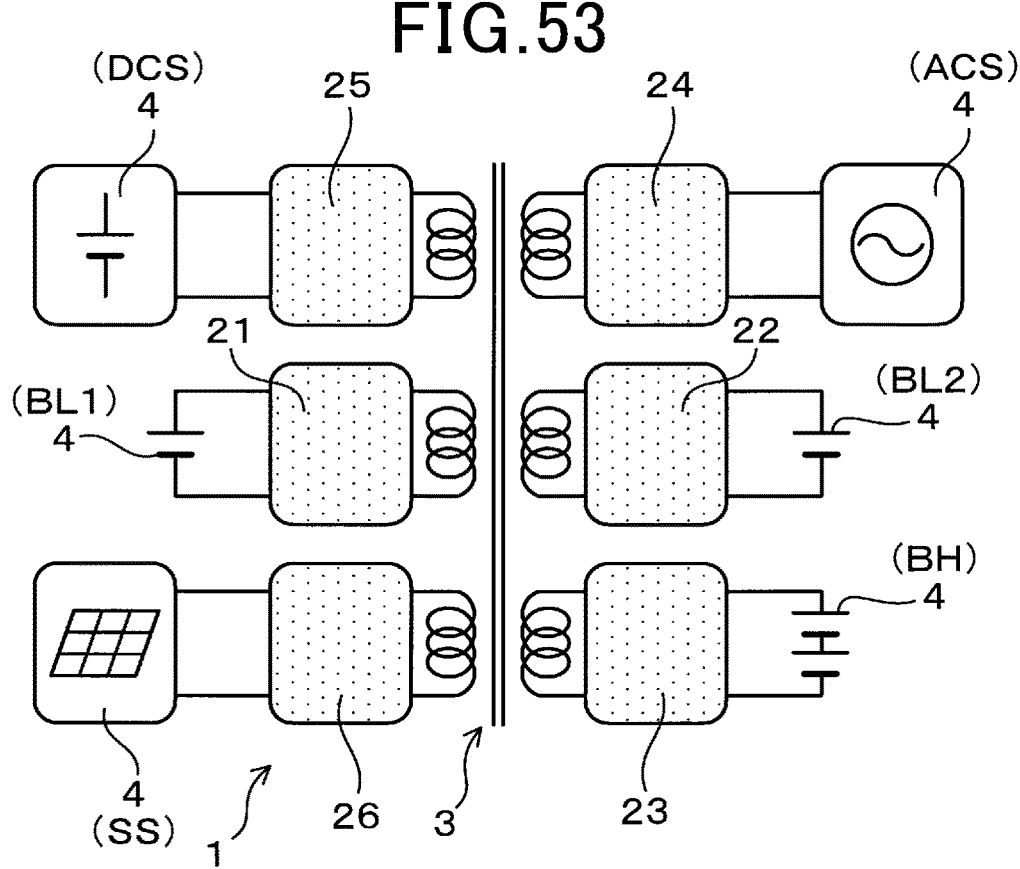
FIG. 53 is a circuit configuration of a power conversion apparatus according to a forty-fourth embodiment.

As shown in FIG. 53, a power conversion apparatus 1 according to the forty-fifth embodiment is connected to six voltage units 4 including a DC power source DCS, two storage batteries BL1 and BL2, a solar power source SS, a load LD and a high voltage battery BH.

According to the present embodiment, the high voltage battery BH can be charged from at least one of the solar power source SS, the storage batteries BL1 and BL2, while charging the high voltage battery BH from the DC power source DCS. Also, the load LD can be supplied with power from the DC power source DCS, the solar power source SS, the storage batteries BL1 and BL2. Further, as the power for the charging control or the power for controlling the operation of the load LD, power of one of storage batteries, for example, the storage battery BL1 can be used. The forty-fifth embodiment has similar configuration and advantages to those in the forty-fourth embodiment.

Forty-Sixth Embodiment

Figure 54:
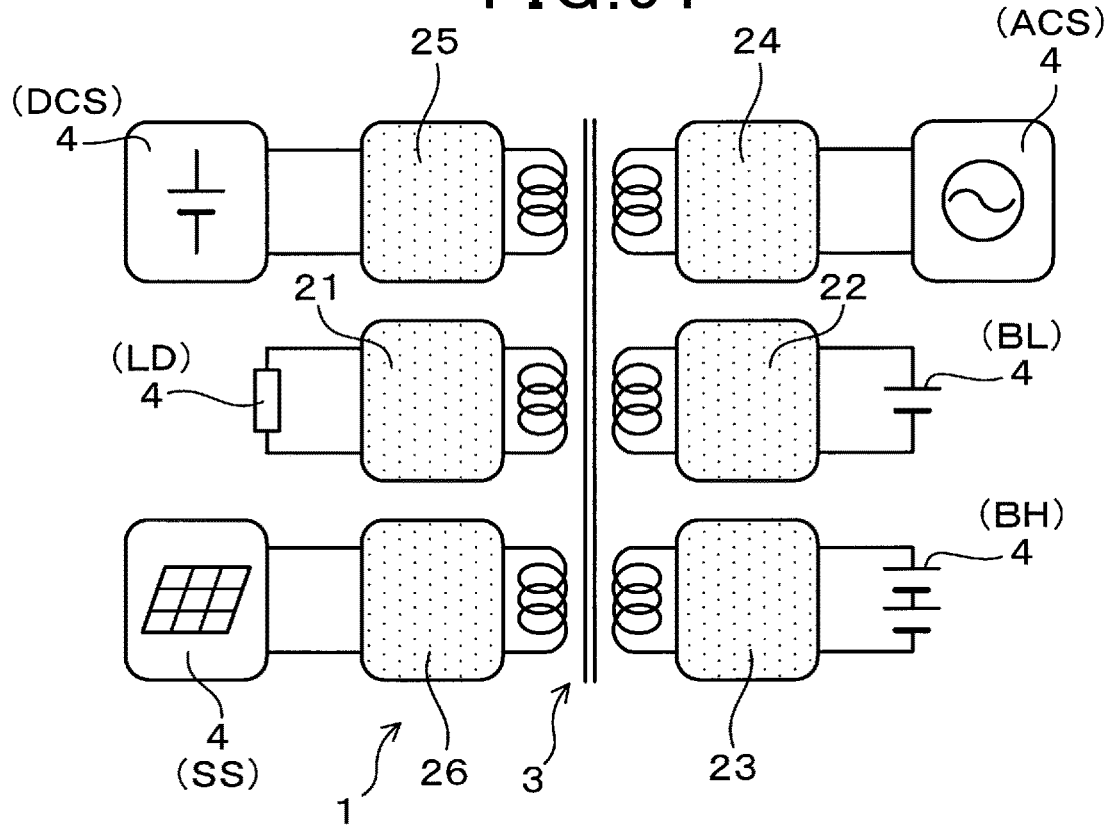
FIG. 54 is a circuit configuration of a power conversion apparatus according to a forty-sixth embodiment.

As shown in FIG. 54, a power conversion apparatus 1 according to the forty-sixth embodiment is connected to six voltage units 4 including a DC power source DCS, a load LD, a solar power source SS, a storage battery BL, an AC power source ACS and a high voltage battery BH.

According to the present embodiment, the high voltage battery BH can be charged from the DC power source DCS, the AC power source ACS, and the solar power source SS. Further, the storage battery BL can also charge the high voltage battery BH. Furthermore, the load LD can be supplied with power from the DC power source DCS, the AC power source ACS, the solar power source SS and the storage battery BL. The forty-sixth embodiment has similar configuration and advantages to those in the forty-fourth embodiment.

Forty-Seventh Embodiment

Figure 55:
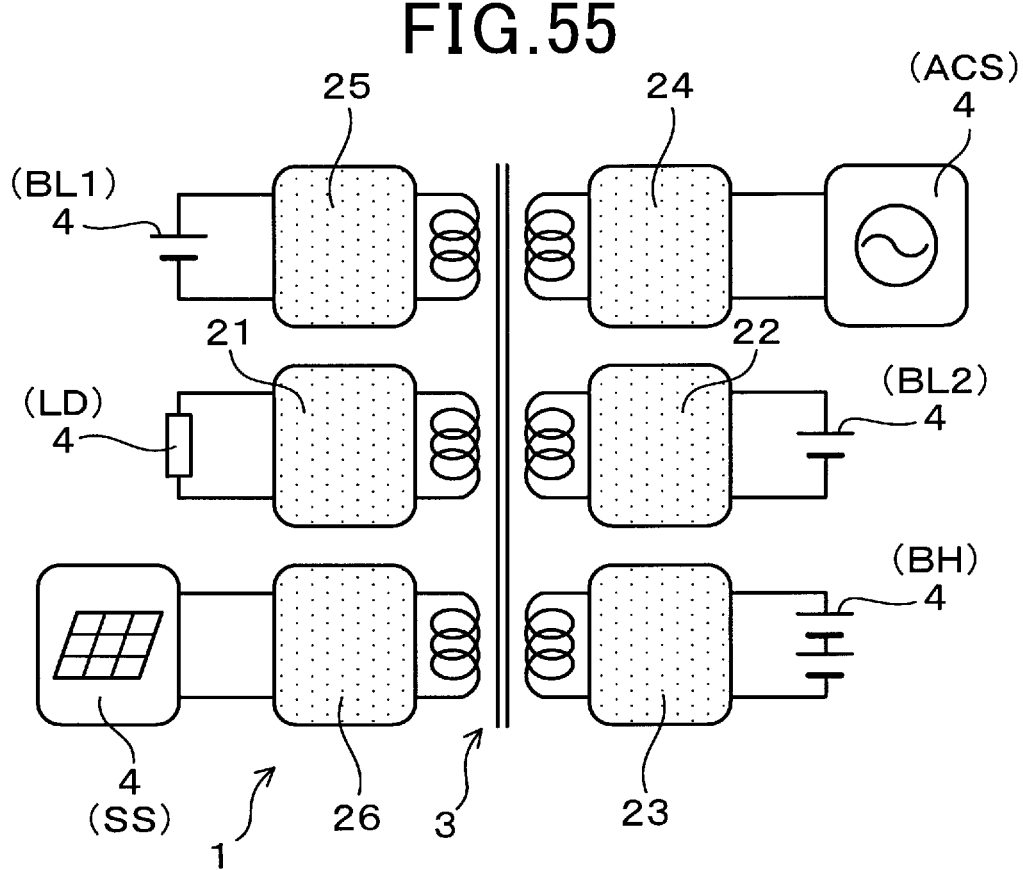
FIG. 55 is a circuit configuration of a power conversion apparatus according to a forty-seventh embodiment.

As shown in FIG. 55, a power conversion apparatus 1 according to the forty-seventh embodiment is connected to six voltage units 4 including two storage batteries BL1 and BL2, a load LD, a solar power source SS, an AC power source ACS and a high voltage battery BH.

According to the present embodiment, the high voltage battery BH can be charged from the AC power source ACS and the solar power source SS. Further, the storage batteries BL1 and BL2 are able to charge the high voltage battery BH. Also, the load LD can be supplied with power from the AC power source ACS and the solar power source SS, and the storage batteries BL1 and BL2. The forty-seventh embodiment has similar configuration and advantages to those in the forty-fourth embodiment.

Forty-Eighth Embodiment

Figure 56:
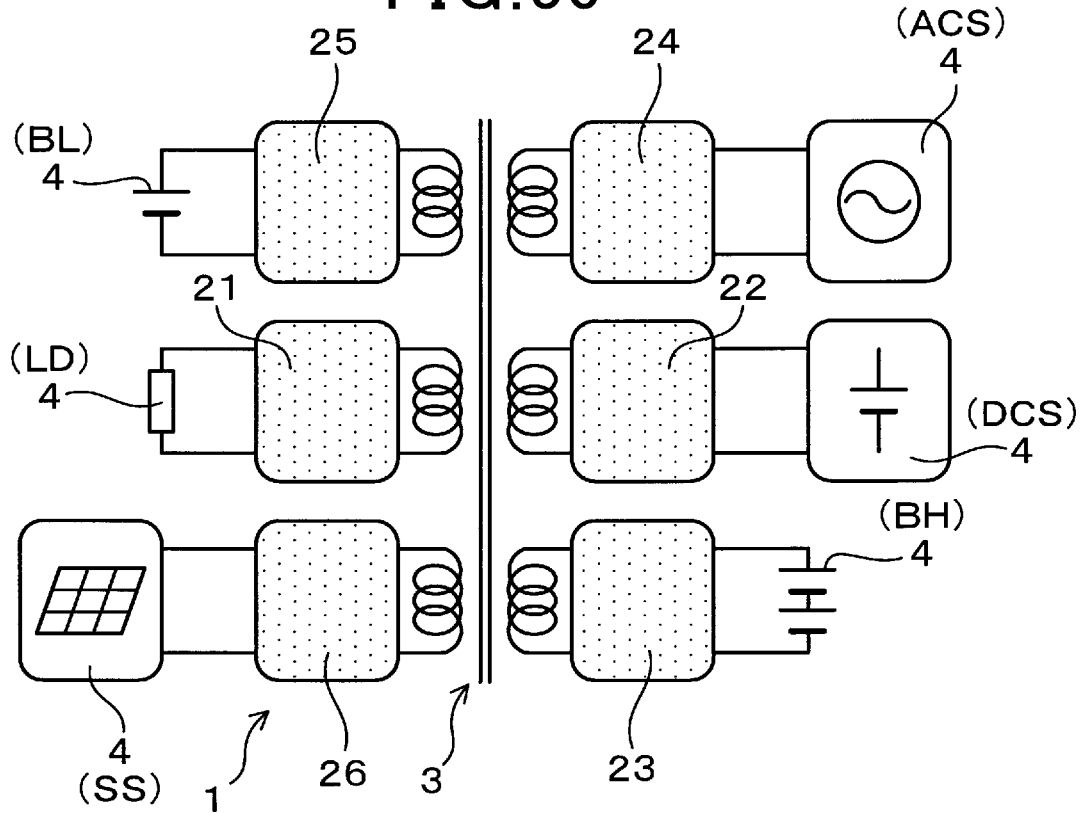
FIG. 56 is a circuit configuration of a power conversion apparatus according to a forty-eighth embodiment.

As shown in FIG. 56, a power conversion apparatus 1 according to the forty-eighth embodiment is connected to six voltage units 4 including a storage battery BL, a load LD, a solar power source SS, an AC power source ACS, a DC power source DCS and a high voltage battery BH.

According to the present embodiment, the high voltage battery BH can be charged from the DC power source DCS, the AC power source ACS and the solar power source SS. Further, the DC power source DCS, the AC power source ACS, the solar power source SS and the storage battery BL are also able to supply power to the load LD. Further, as the power for the charging control or the power for controlling the operation of the load LD, power of the storage battery BL (e.g. 12V system) can be used. The forty-eighth embodiment has similar configuration and advantages to those in the forty-fourth embodiment.

Forty-Ninth Embodiment

Figure 57:
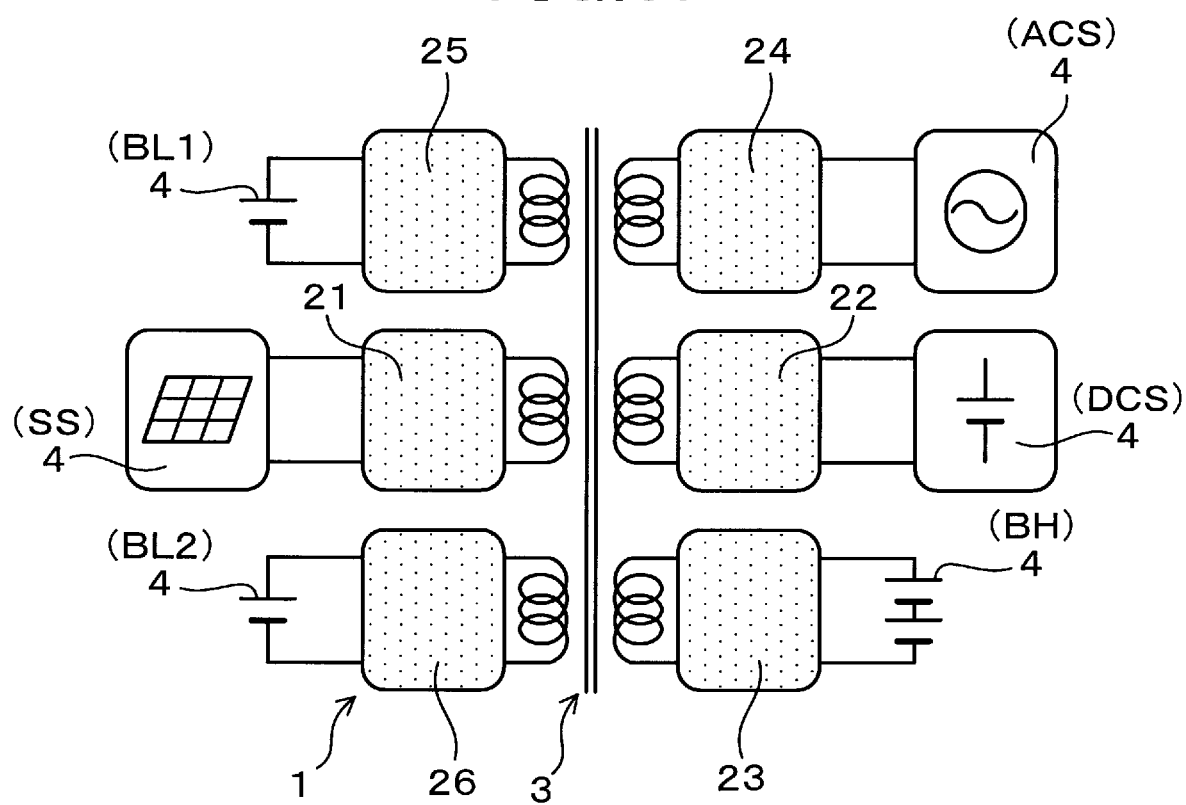
FIG. 57 is a circuit configuration of a power conversion apparatus according to a forty-ninth embodiment.

As shown in FIG. 57, a power conversion apparatus 1 according to the forty-ninth embodiment is connected to six voltage units 4 including two storage batteries BL1 and BL2, a solar power source SS, an AC power source ACS, a DC power source DCS and a high voltage battery BH.

According to the present embodiment, the high voltage battery BH can be charged from the DC power source DCS, the AC power source ACS and the solar power source SS. Also, the power of controlling the charging, power of one of storage batteries BL1 and BL2, for example, power of the storage battery BL1 (e.g. 12V system) can be used. Further, the storage batteries BL1 and BL2 can be charged from the DC power source DCS, the AC power source ACS, and the solar power source SS. The forty-ninth embodiment has similar configuration and advantages to those in the forty-fourth embodiment.

Fiftieth Embodiment

Figure 58:
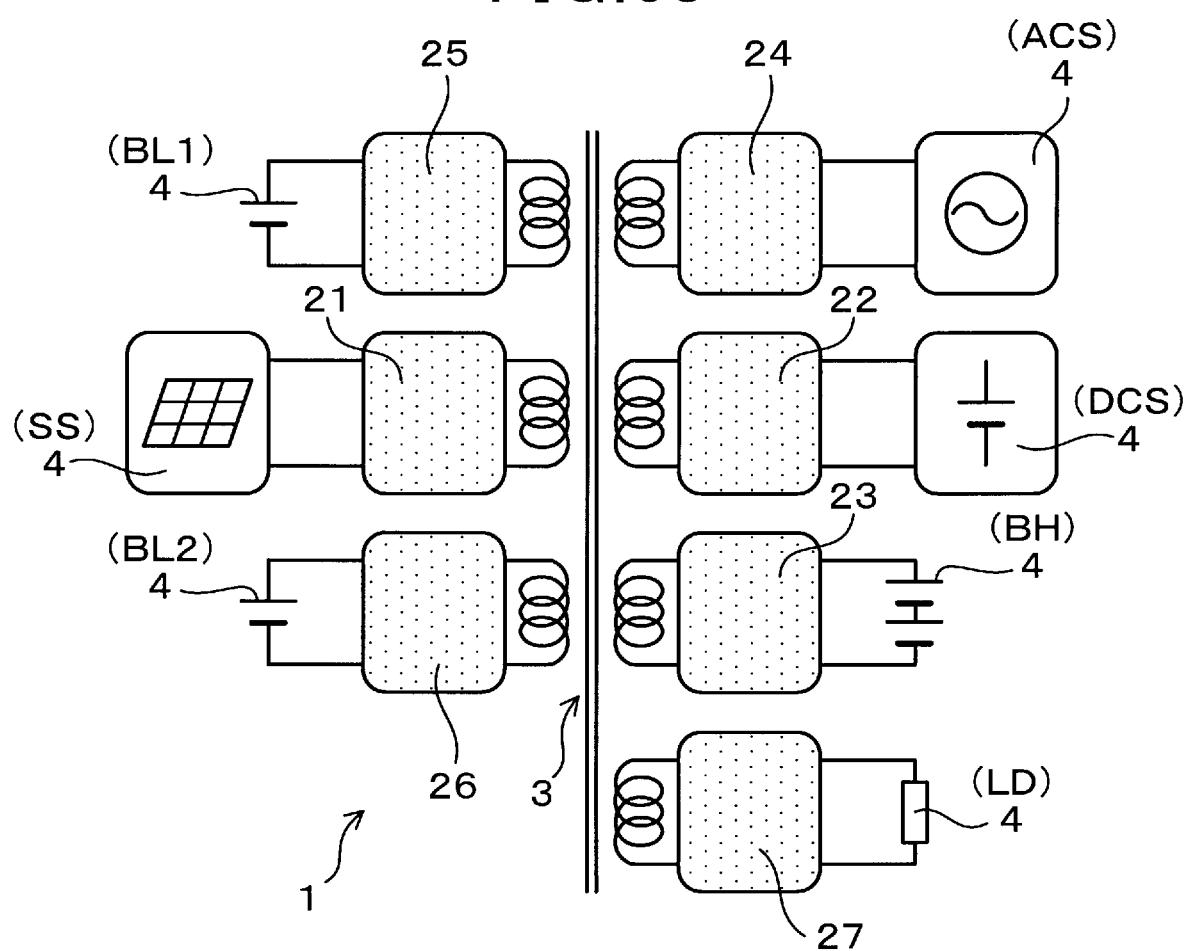
FIG. 58 is a circuit configuration of a power conversion apparatus according to a fiftieth embodiment.

As shown in FIG. 58, a power conversion apparatus 1 according to the fiftieth embodiment is connected to seven voltage units 4. The power conversion apparatus 1 includes seven power conversion circuits (i.e. switching circuits 21, 22, 23, 24, 25, 26 and 27) which are connected to respective seven voltage units 4, and a multiport transformer 3 connected to the seven switching circuits 21, 22, 23, 24, 25, 26 and 27 at mutually different ports thereof. According to the present embodiment, the multiport transformer 3 includes mutually and magnetically coupled seven coils.

According to the present embodiment, as the seven voltage units 4, two storage batteries BL1 and BL2, a solar power source SS, an AC power source ACS, a DC power source DCS, a load LD and a high voltage battery BH are connected to the power conversion apparatus 1.

In the power conversion apparatus 1 according to the present embodiment, a power conversion can be performed between seven power conversion units 4 from each other via a single multiport transformer 3. Hence, power conversion can be accomplished between a plurality of voltage units 4 via the single multiport transformer 3 with a number of combinations.

Specifically, in the case where seven voltage units 4 are present, as a combination of a pair of two units, 21 combinations are possible. Hence, power conversion between the voltage units 4 can be performed with 21 combinations of units via the single multiport transformer 3. Therefore, power can be exchanged between the voltage units 4 having a significantly large number of combinations, while suppressing an increase in the number of components and expansion of the size thereof.

According to the power conversion apparatus 1 of the present embodiment, the high voltage battery BH can be charged from the AC power source ACS, the DC power source DCS, the solar power source SS and two storage batteries BL1 and BL2. Also, the load LD can be supplied with power from the AC power source ACS, the DC power source DCS, the solar power source SS, and two storage batteries BL1 and BL2. Further, as the power for the charging control or the power for controlling the operation of the load LD, power of one storage battery BL1, for example (e.g. 12V system) can be used. The fiftieth embodiment has similar configuration and advantages to those in the forty-fourth embodiment.

Fifty-First Embodiment

Figure 59:
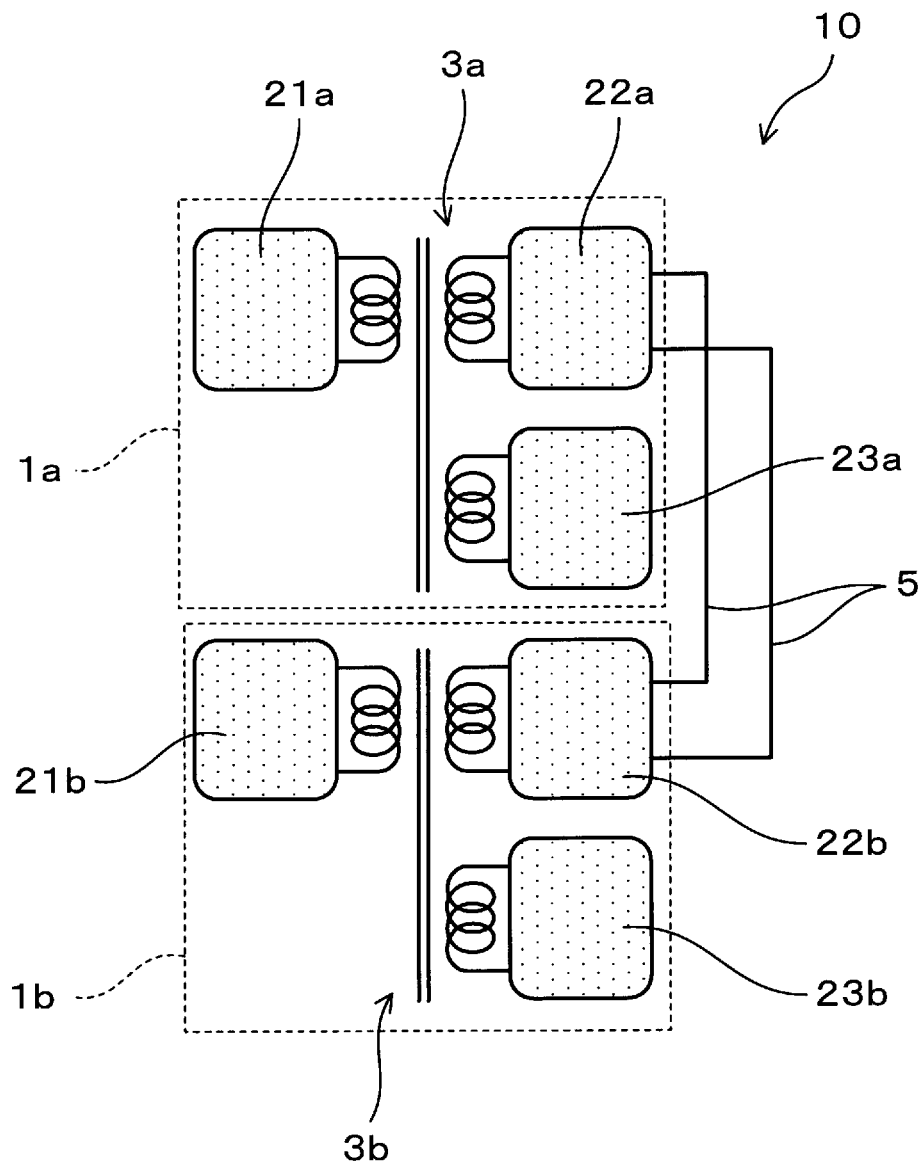
FIG. 59 is a circuit configuration of a power conversion apparatus according to a fifty-first embodiment.

As shown in FIG. 59, a power conversion apparatus 10 according to the fifty-first embodiment includes a plurality of power conversion units 1a and 1b, and a connection wiring 5. The power conversion units 1a and 1b each includes a multiport transformer 3a and 3b and three or more power conversion circuits 21a, 22a, 23a, 21b, 22b, and 23b. The three more power conversion units 21a, 22a, 23a, 21b, 22b, and 23b are each connected to three or more ports in the multiport transformer 3a and 3b. The connection wiring 5 electrically connects at least one pair of power conversion circuits 21a, 22a, 23a, 21b, 22b, and 23b in the respective power conversion units 1a and 1b to be in parallel.

According to the power conversion apparatus 10 shown in FIG. 59, the connection wiring 5 electrically connects a single power conversion circuit 22a in one power conversion unit 1a and a single power conversion circuit 22b in the other power conversion unit 1b to be in parallel.

Further, in the power conversion unit 10 according to the present embodiment, the connection wiring 5 is disposed at terminals to be opposite to the multiport transformers 3a and 3b in the respective power conversion circuits 21a and 22b. For example, the respective power conversion units 1a and 1b can be configured as same as that of the power conversion apparatus 1 of the first embodiment.

Figure 60:
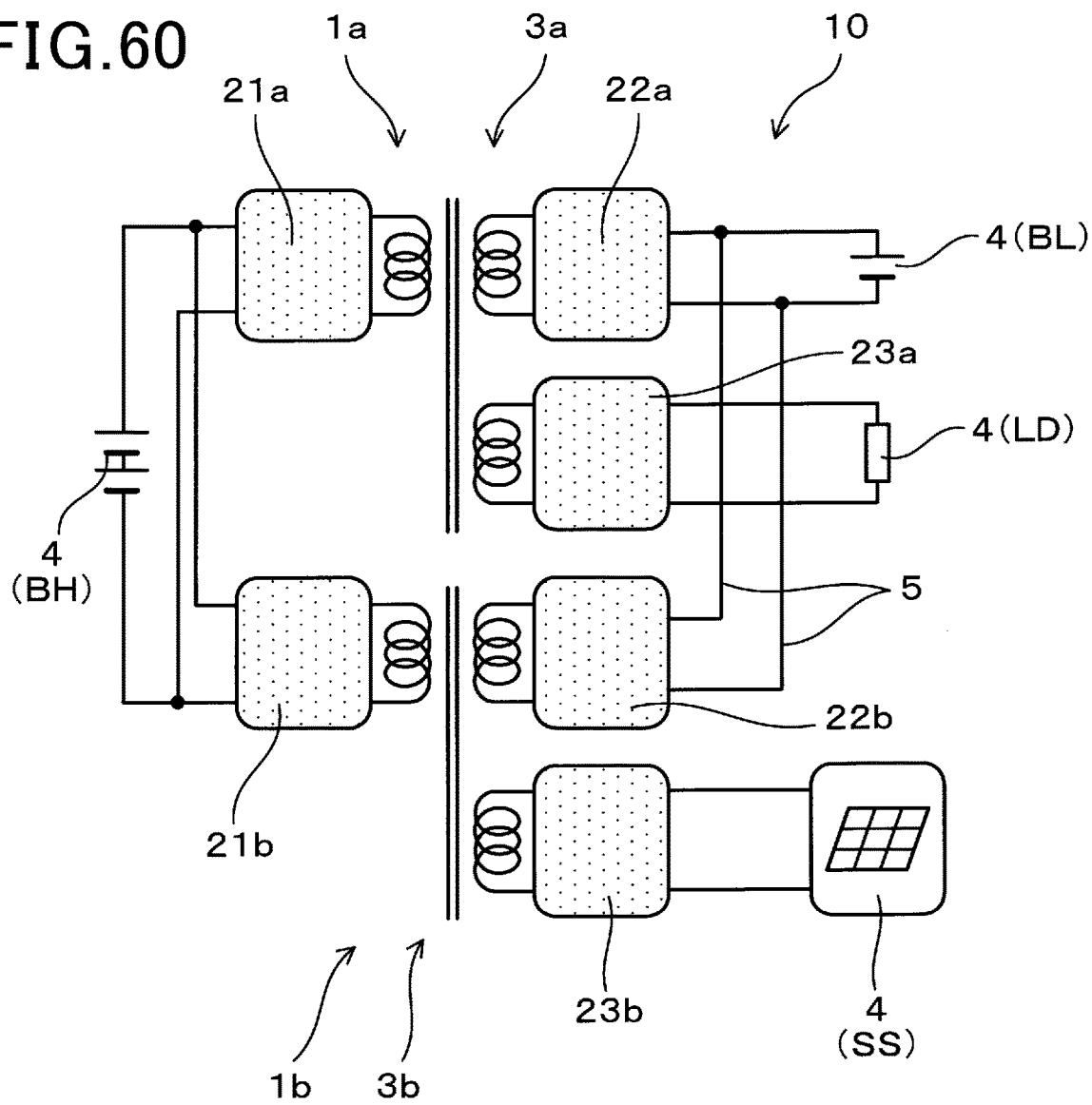
FIG. 60 is a circuit configuration of a power conversion apparatus to which a voltage unit is connected according to the fifty-first embodiment.

As shown in FIG. 60, for example, as the power conversion units 4, a high voltage battery BH, a storage battery BL, a load LD and a solar power source SS may be connected to respective power conversion circuits 21a, 22a, 23a, 21b, 22b and 23b in the power conversion unit 1a and 1b. Specifically, the power conversion circuits 21a and 21b of the two power conversion units 1a and 1b are connected in parallel to the high voltage battery BH. The power conversion circuit 22a of the power conversion unit 1a is connected to the storage battery BL, and the power conversion circuit 23a is connected the load LD. Moreover, the power conversion circuit 23b of the power conversion unit 1b is connected to the solar power source SS. Since the power conversion circuit 22b of the power conversion unit 1b is connected to the power conversion circuits 22a of the power conversion unit 1a via the connection wiring 5, these power conversion circuits 22a and 22b are also connected to the storage battery BL. In other words, two power conversion circuits 22a and 22b are parallel-connected to the storage battery BL.

The power conversion apparatus 10 according to the present embodiment includes a plurality of power conversion units 1a and 1b, and the connection wiring 5. The connection wiring 5 electrically connects the power conversion circuits 22a and 22b in the respective power conversion units 1a and 1b to be in parallel. Hence, power can be exchanged between the power conversion circuits 22a and 22b in the plurality of power conversion units 1a and 1b. As a result, even in the case where fault has occurred in a part of power conversion circuits (e.g. power conversion circuit 21a) of a part of the power conversion unit (e.g. power conversion unit 1a), other power conversion circuit (e.g. power conversion circuit 21b) is able to substitute the function of the fault circuit. As a result, level of redundancy of the power conversion apparatus 10 can be higher.

In more detail, for example, as shown in FIG. 60, in the power conversion apparatus 10 including a plurality of voltage units 4, when a fault has occurred in the power conversion circuit 21a of the power conversion unit 1a, power cannot be supplied to the storage battery BL from the high voltage battery BH via the multiport transformer 3a. However, even in this case, power can be supplied to the storage battery BL through the power conversion circuits 21b and 22b of the multiport transformer 3b in the power conversion unit 1b. Thus, power of the ECU (i.e. electronic control unit) required for travelling the vehicle can be secured, thereby continuing the travelling.

In the above-described case, the high voltage battery is unable to supply power to the load LD via the power conversion circuit 21a of the power conversion unit 1a. However, it is possible to supply power to the load LD via the power conversion unit 1b, the connection wiring 5, and the power conversion circuits 22a and 23a of the power conversion unit 1a. Thus, level of redundancy of the power conversion apparatus can be higher.

Comparative Example 1

Figure 61:
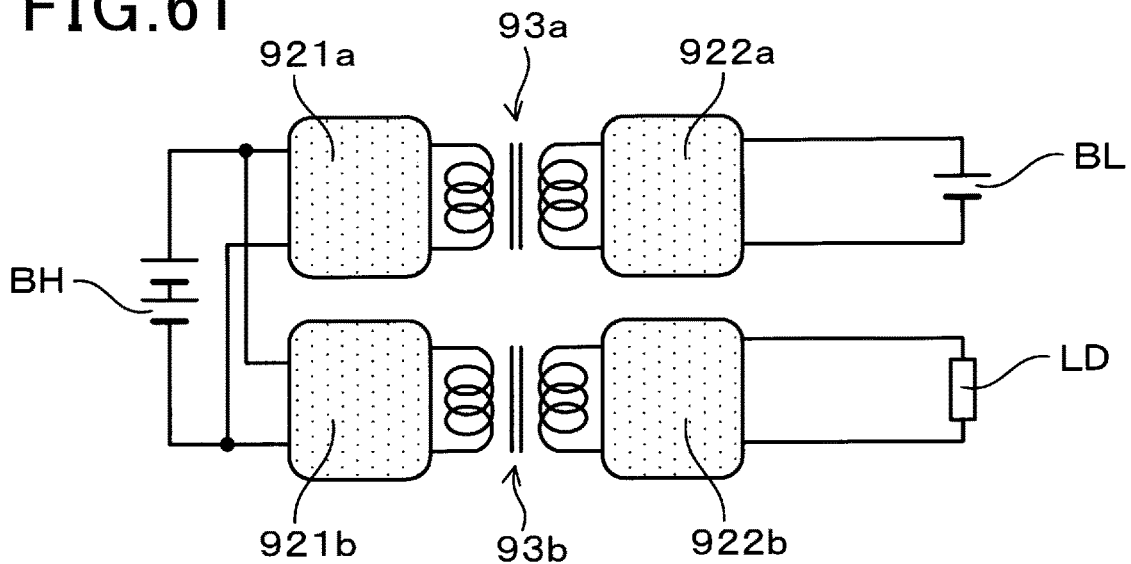
FIG. 61 is a circuit configuration of a power conversion apparatus according to a first comparative embodiment.

As shown in FIG. 61, a comparative example is illustrated in which two regular transformers having two ports are provided. In this power conversion apparatus 9, power conversion circuits 921a and 922a are connected to two ports of one transformer 93a, and power conversion circuits 921b and 922b are connected to two ports of the other transformer 93b. A high voltage battery BH is connected to the power conversion circuits 921a and 921b, a storage battery BL is connected to a power conversion circuit 922a, and a load LD is connected to a power conversion circuit 922b. According to the comparative example, when a fault occurs in the power conversion circuit 921a, the high voltage battery BH is unable to supply power to the storage battery BL.

In contrast, as described above, according to the power conversion apparatus 10 of the fifty-first embodiment, even if a fault occurs in the power conversion circuit 21a, the high voltage battery BH is able to continue to supply power to the storage battery BL (See FIG. 60). Therefore, compared to a comparative example 1, according to the power conversion apparatus 10 of the fifty-first embodiment, the level of redundancy can be higher.

Eighth Reference

Figure 62:
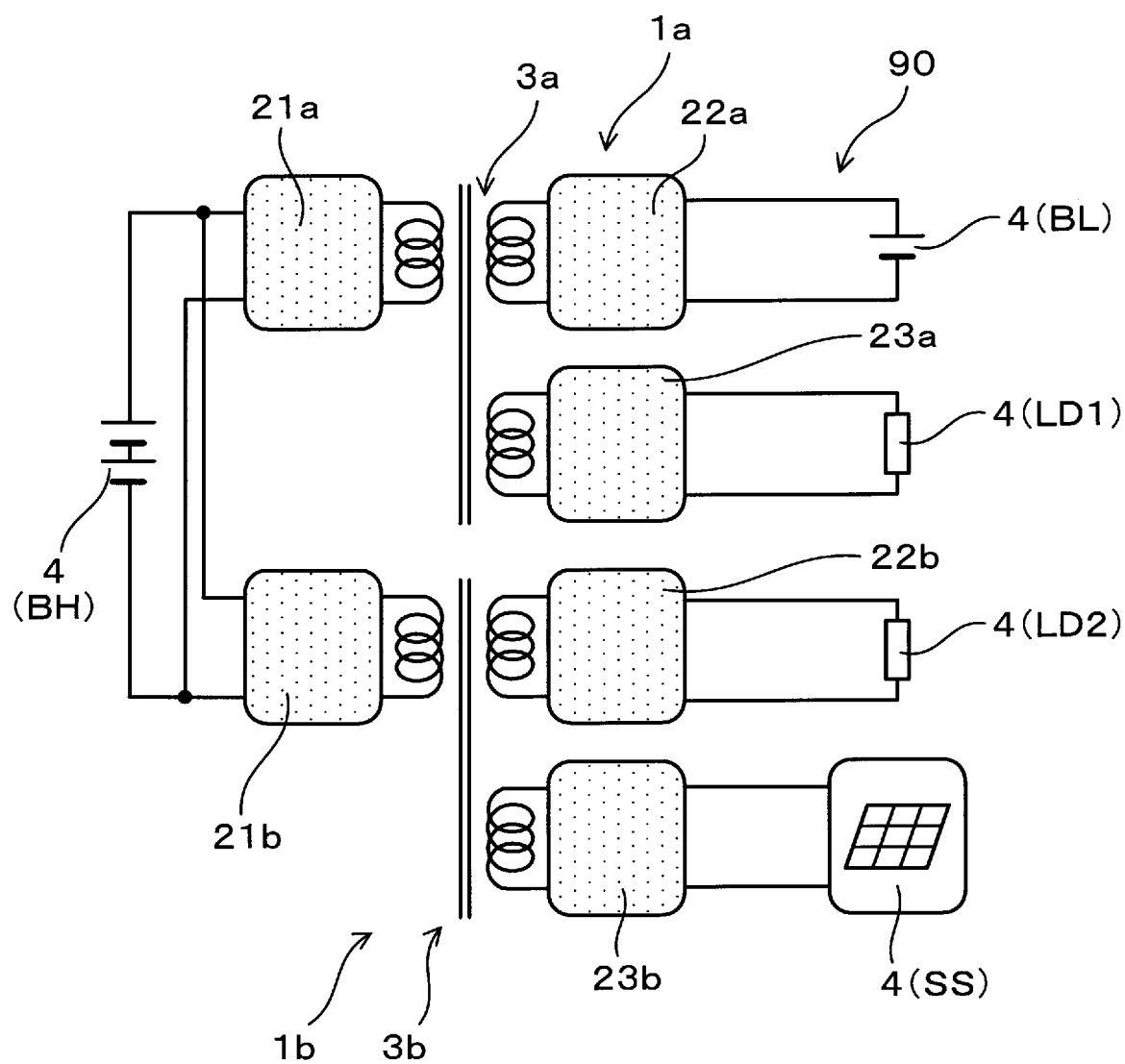
FIG. 62 is a circuit configuration of a power conversion apparatus according to an eighth reference.

As shown in FIG. 62, as a reference embodiment, a case will be described in which a multiport transformers 3a and 3b are arranged to be in parallel, and no connection wiring 5 is disposed in a power conversion apparatus 90. Also, according to a power conversion apparatus 90 of the eighth reference, if a fault occurs in the power conversion circuit 21a, power cannot be supplied to the storage battery BL from the high voltage battery BH. Therefore, even with the power conversion apparatus 90 of the eighth reference, the redundancy level can be higher.

Further, as shown in FIG. 60, according to the power conversion apparatus 10 of the fifty-first embodiment, the storage battery BL is connected to the connection wiring 5. In other words, the power conversion circuits 22a and 22b connected in parallel by the connection wiring 5, is connected to the storage battery BL. Thus, even if a fault occurs in the power conversion circuit 21a or the like, causing a momentary power failure, power can be supplied to the load LD, the solar power source SS and the high voltage battery BH. Therefore, the level of redundancy of the power conversion apparatus 10 can be further enhanced.

In the power conversion apparatus 10 according to the fifty-first embodiment, power can be mutually exchanged between the power conversion circuits 22a and 22b which are mutually connected by the connection wiring 5. Accordingly, the temperature of power conversion elements in the power conversion circuits 22a and 22b can be appropriately increased so that the cooling water can be warmed in the case where the temperature of the cooling water of the power conversion circuit is like to be excessively lowered, for example, when starting in a cold region.

Although the illustration is omitted, the respective power conversion units 1a and 1b may have a multiport transformer having four or more ports, and four or more power conversion circuits. In this case, the respective power conversion units 1a and 1b may be the same as the power conversion apparatus 1 in the ninth embodiment.

Also, the connection wiring 5 may have an uncoupling mechanism. Specifically, a relay, or a semiconductor switch as the uncoupling mechanism capable of electrically switching between connection and cutoff, may be provided in a part of the connection wiring 5. Thus, power can be exchanged between the power conversion units 1a and 1b by ON/OFF switching of the uncoupling mechanism.

Fifty-Second Embodiment

Figure 63:
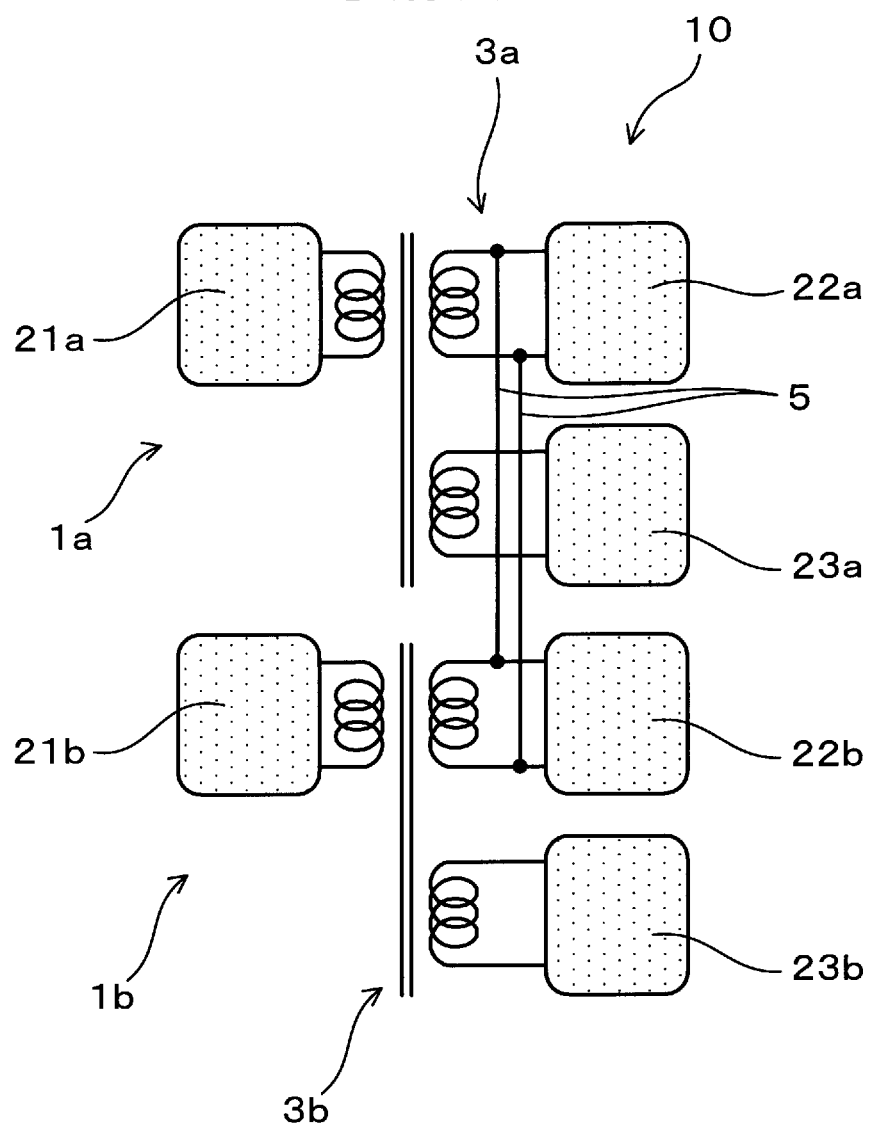
FIG. 63 is a circuit configuration of a power conversion apparatus according to a fifty-second embodiment.

As shown in FIG. 63, according to the present embodiment, the connection wiring 5 is connected to the multiport transformers 3a and 3b side. Other configurations are the same as those in the fifty-first embodiment.

Figure 64:
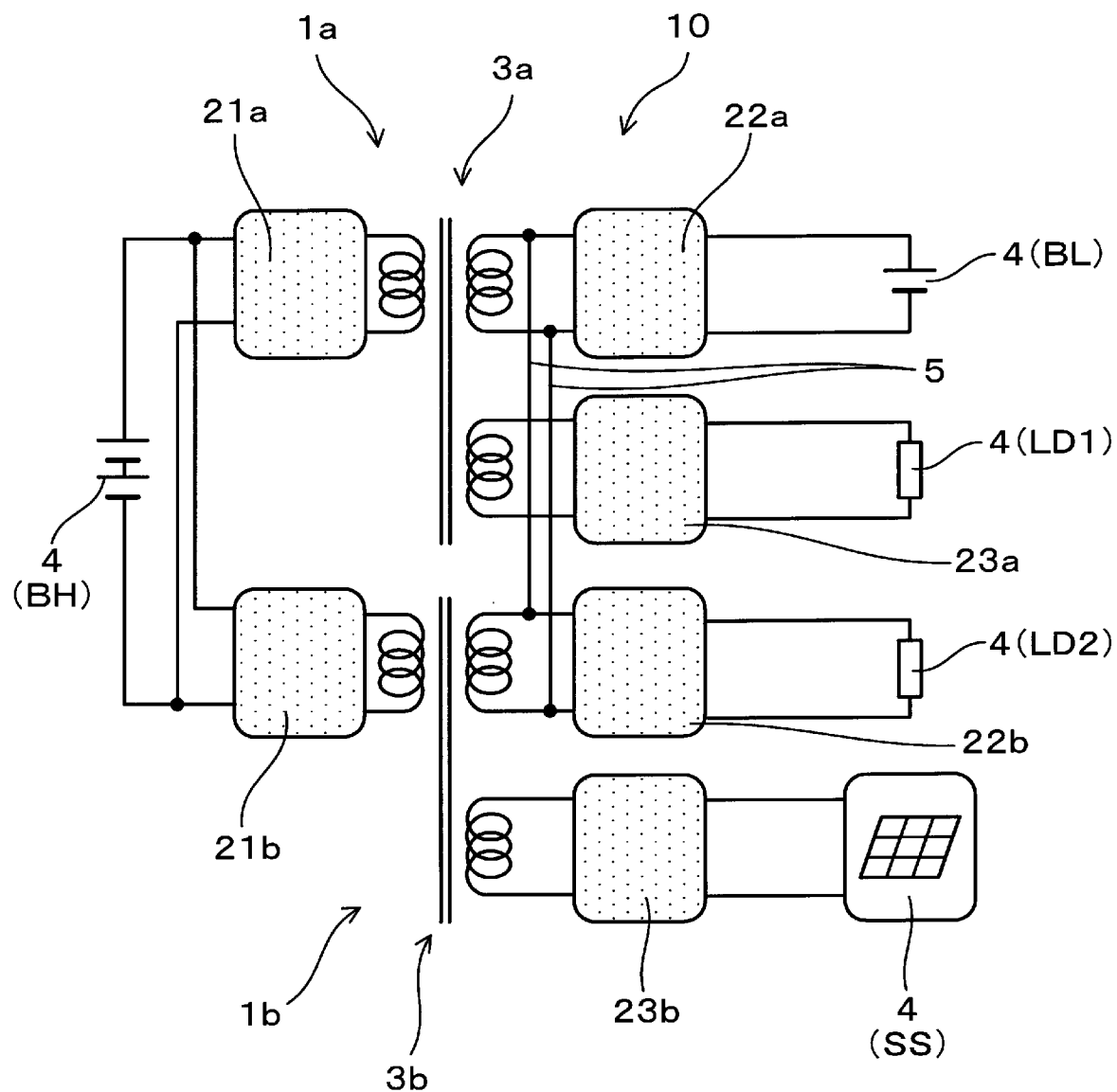
FIG. 64 is a circuit configuration of a power conversion apparatus to which a voltage unit is connected according to the fifty-second embodiment.

In this case, for example, assuming that a fault occurs in either one of the power conversion circuit 21a or the power conversion circuit 21b, the other power conversion circuit where no fault has occurred, serves the function of the failure power conversion circuit. For example, in the case where the voltage units 4 are provided as shown in FIG. 64, the following operation can be made. For example, in the case where a fault occurs in the power conversion circuit 21a, power can be supplied to the storage battery BL via the power conversion circuit 21b, the multiport transformer 3b and the power conversion circuit 22a.

Further, the power conversion circuit 23a can be supplied with power from the power conversion circuits 21b and 22b via the connection wiring 5 and the multiport transformer 3a so as to operate the load LD1. Furthermore, even when the power supplied to the storage battery BL from the high voltage battery BH is cutoff, the storage battery BL can be supplied with power from the solar power source SS via the power conversion circuit 23b, the multiport transformer 3b, the connection wiring 5 and the power conversion circuit 22a. The fifty-second embodiment has similar configuration and advantages to those in the fifty-first embodiment.

Ninth Reference

Figure 65:
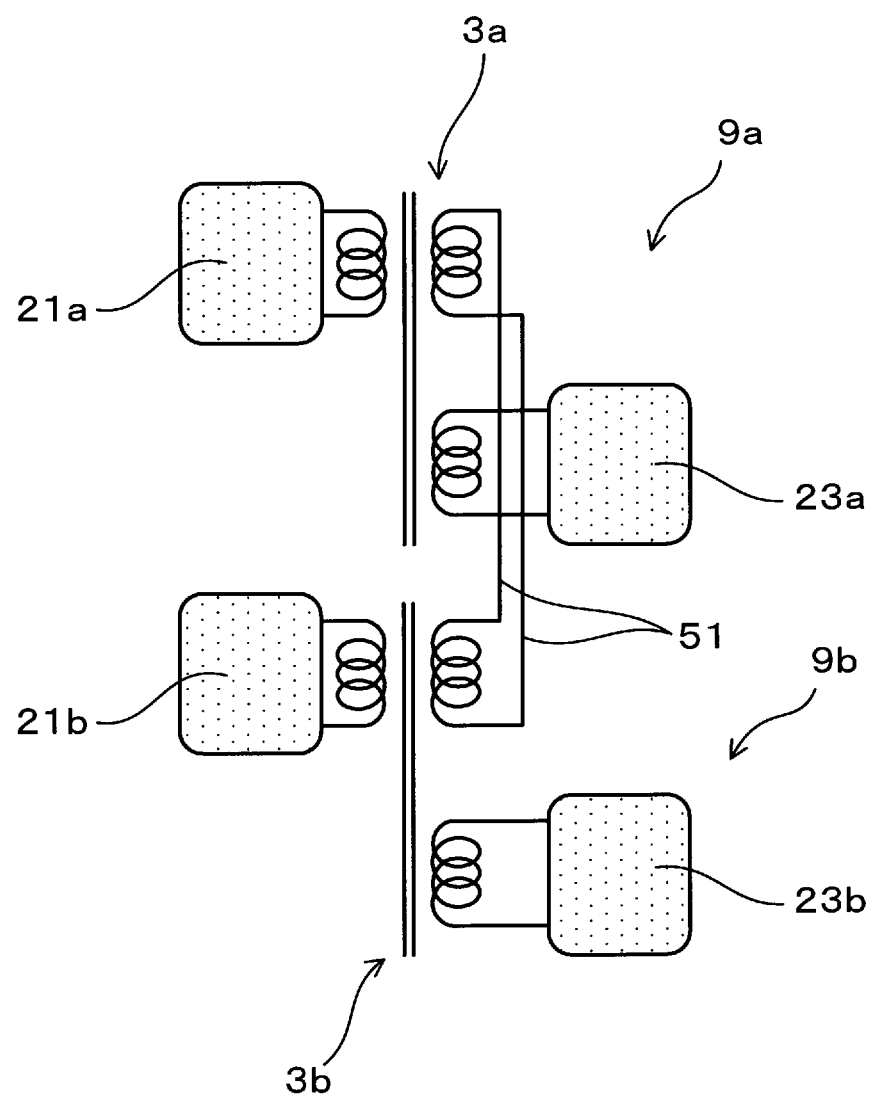
FIG. 65 is a circuit configuration of a power conversion apparatus according to a ninth reference.

As shown in FIG. 65, according to the present reference, two power conversion circuits 21a and 23a, 21b and 23b are connected to respective multiport transformers 3a and 3b each including three ports. In the multiport transformers 3a and 3b, ports having no power conversion circuits are connected by a coupling wiring 51. In other words, one wiring in one multiport transformer is electrically connected to one wiring of the other multiport transformer.

According to the present embodiment, power can be exchanged between a plurality of power conversion units 9a and 9b via the coupling wiring 51 with the ports having no power conversion circuits.

These embodiments may be modified in various manners other than the above-described embodiments. Also, in the above-described embodiments and references, only a part of effects and advantages which are obtained from respective embodiments are described. However, the effects and advantages obtained from the respective embodiments and references are not limited thereto, and further effects and advantages can be obtained. The respective embodiments and references may produce various effects and advantages which can be obtained from the specification and drawings of the present disclosure.

According to the above-described embodiments and references, the switching circuit (i.e. power conversion circuits) is directly connected to the voltage unit. However, the switching circuit and the voltage unit may include a PFC circuit (i.e. power factor improvement circuit) interposed therebetween. Also, a relay circuit may be provided on the positive/negative wirings between the switching circuit (i.e. power conversion circuit) and the load or the storage battery. As the relay circuit, for example, a mechanical relay, a semiconductor relay may be used. Alternatively, instead of using the relay circuit, a power cutoff mechanism having the same function as the relay circuit may be provided.

The present disclosure is not limited to the above-described embodiments, but may be applied to various embodiments without departing from the scope of the present disclosure.

What is claimed is:

1. A power conversion apparatus comprising: a first transformer comprising a plurality of first ports; a plurality of first power conversion circuits connected to the first transformer at mutually different ports of the first ports; a second transformer comprising a plurality of second ports; a plurality of second power conversion circuits connected to the second transformer at mutually different ports of the second ports; and a coupling wiring connects the first transformer to the second transformer, wherein the coupling wiring connects to a first port of the first transformer to which no first power conversion circuit is connected, and connects to a second port of the second transformer to which no second power conversion circuit is connected.

2. The power conversion apparatus according to claim 1, wherein power exchanged between the first plurality of power conversion circuits and the second plurality of power conversion circuits via the coupling wiring.

3. A power conversion apparatus comprising: a first transformer comprising a plurality of first ports; a plurality of first power conversion circuits connected to the first transformer at mutually different ports of the first ports; a second transformer comprising a plurality of second ports; a plurality of second power conversion circuits connected to the second transformer at mutually different ports of the of the second ports; and a coupling wiring that connects the first transformer to the second transformer, wherein power is exchanged between the first plurality of power conversion circuits and the second plurality of power conversion circuits via the coupling wiring.

4. A power conversion apparatus comprising:
a first transformer comprising three first ports;
two first power conversion circuits connected to the first transformer;
a second transformer comprising three second ports;
two second power conversion circuits connected to the second transformer; and
a coupling wiring that connects the first transformer to the second transformer, wherein
the coupling wiring and each of the two first power conversion circuits are connected to mutually different ports of the three first ports, respectively, and
the coupling wiring and each of the two second power conversion circuits are connected to mutually different ports of the three second ports, respectively.

5. The power conversion apparatus according to claim 4, wherein power is exchanged between the first power conversion circuits and the second power conversion circuits via the coupling wiring.

6. A power conversion apparatus comprising:
a first transformer comprising a plurality of first ports;
a second transformer comprising a plurality of second ports;
a plurality of first power conversion circuits, each of the plurality of first power conversion circuits being connected to a respective first port of the plurality of first ports;
a plurality of second power conversion circuits, each of the plurality of second power conversion circuits being connected to a respective second port of the plurality of second ports; and
a coupling wiring that connects a first port of the plurality of first ports having no first power conversion circuit to a second port of the plurality of second ports having no second power conversion circuit connected.

7. The power conversion apparatus according to claim 6, wherein power is exchanged between the first power conversion circuits and the second power conversion circuits via the coupling wiring.

* * * * *